United States Patent [19]
Conti

[11] Patent Number: 6,148,642
[45] Date of Patent: Nov. 21, 2000

[54] METHOD AND MACHINE FOR THE PRODUCTION OF KNITTED GARMENTS COMPRISING A BODY SECTION AND LEGS, IN A SINGLE PRODUCTION STAGE AND IN A SINGLE PIECE

[75] Inventor: Paolo Conti, Florence, Italy

[73] Assignee: Golden Lady S.p.A., Italy

[21] Appl. No.: 09/269,908

[22] PCT Filed: Oct. 30, 1997

[86] PCT No.: PCT/IT97/00269

§ 371 Date: Mar. 29, 1999

§ 102(e) Date: Mar. 29, 1999

[87] PCT Pub. No.: WO98/20192

PCT Pub. Date: May 14, 1998

[30] Foreign Application Priority Data

Nov. 6, 1996 [IT] Italy .................................. FI96A0262
Jul. 24, 1997 [IT] Italy .................................. FI97A0177

[51] Int. Cl.[7] ...................................................... D04B 9/46
[52] U.S. Cl. ............................... 66/13; 66/8; 66/7; 66/64; 66/1 R; 66/17
[58] Field of Search ............................. 66/1 R, 7, 8, 13, 66/17, 215, 56, 60 R, 62, 64, 75.1

[56] References Cited

U.S. PATENT DOCUMENTS 5,127,240 7/1992 Manini .
5,226,297 7/1993 Manini .
5,250,340 10/1993 Gariboldi et al. .

FOREIGN PATENT DOCUMENTS

| 0 552 588 | 7/1993 | European Pat. Off. . |
| WO 95 01473 | 1/1995 | WIPO . |
| WO 95/00689 | 1/1995 | WIPO . |
| WO 95/31595 | 11/1995 | WIPO . |
| WO 95/34702 | 12/1995 | WIPO . |
| PCT/IT96/00102 | 5/1996 | WIPO . |
| PCT/IT96/00139 | 7/1996 | WIPO . |

Primary Examiner—Danny Worrell
Attorney, Agent, or Firm—McGlew and Tuttle, P.C.

[57] ABSTRACT

The machine comprises in combination: two side units (1, 3) each having its own fabric forming cylinder (1C, 3C) with a plurality of needles and needle operating elements (1F, 3F, A1–A8), the cylinders being parallel with each other and close together and, in an intermediate position between said two cylinders (1C, 3C), two rectilinear beds (11A, 11B) next to each other, each with its own needles and elements (17A, 17B, A9, A17) for operating the needles of said beds.

44 Claims, 51 Drawing Sheets

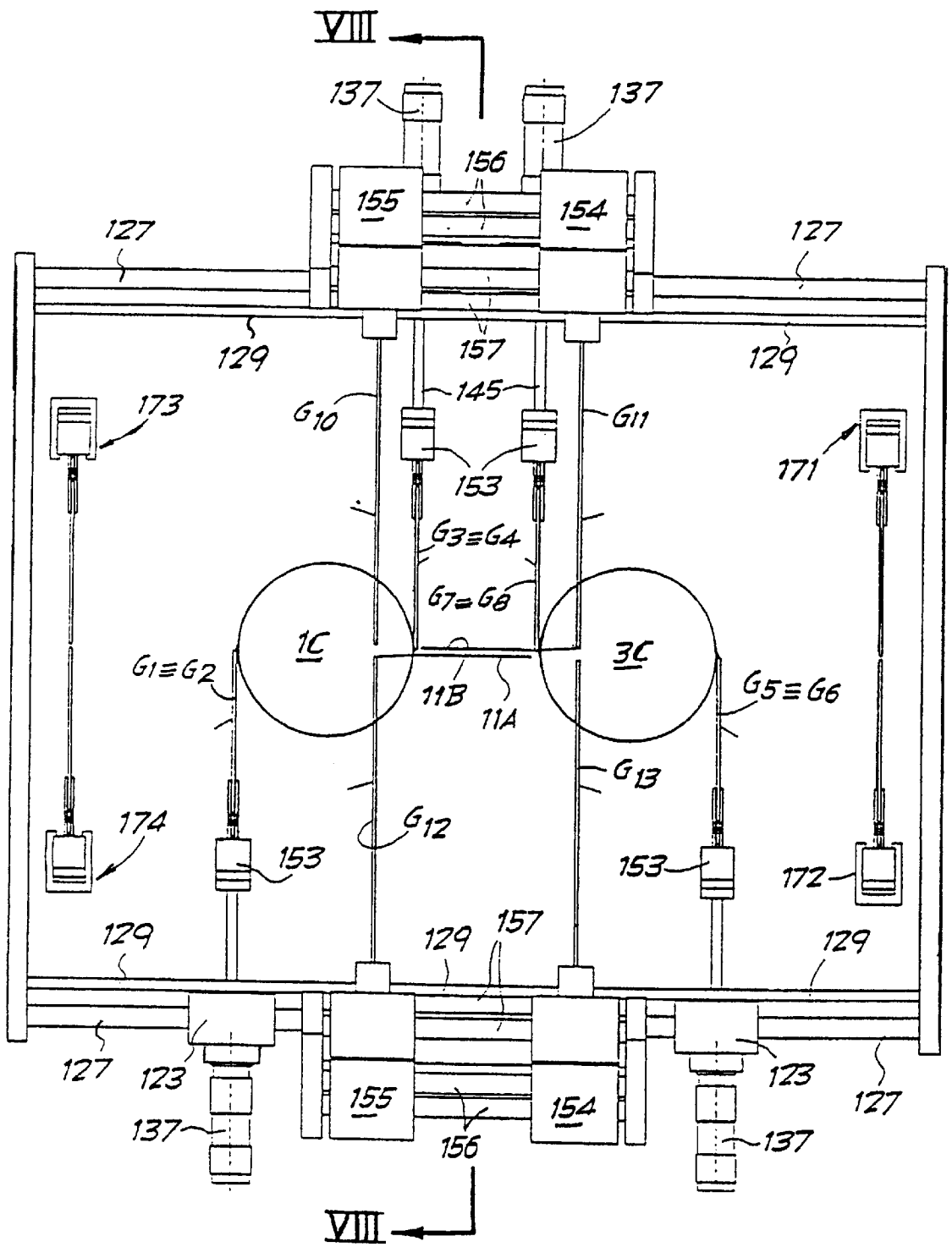

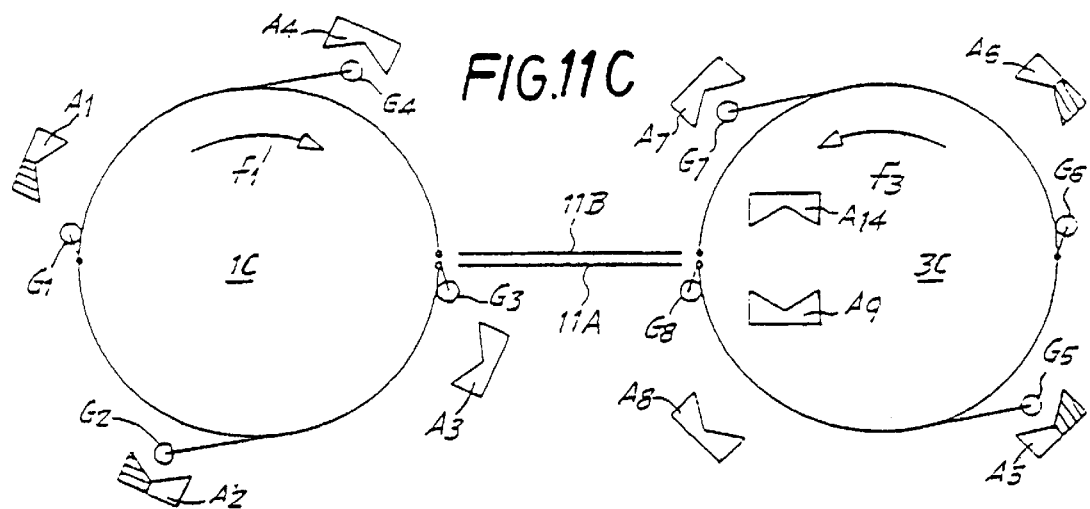
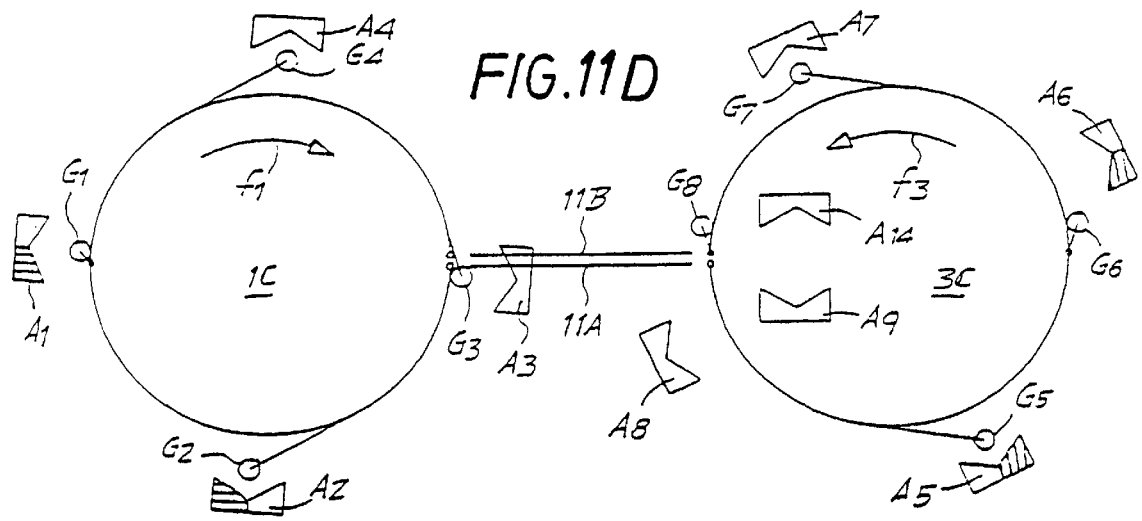
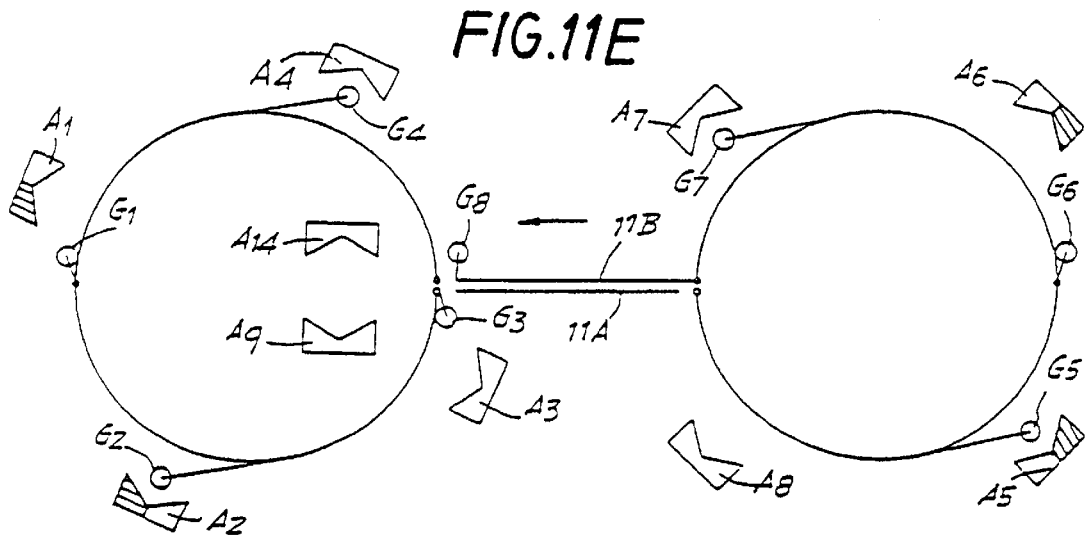

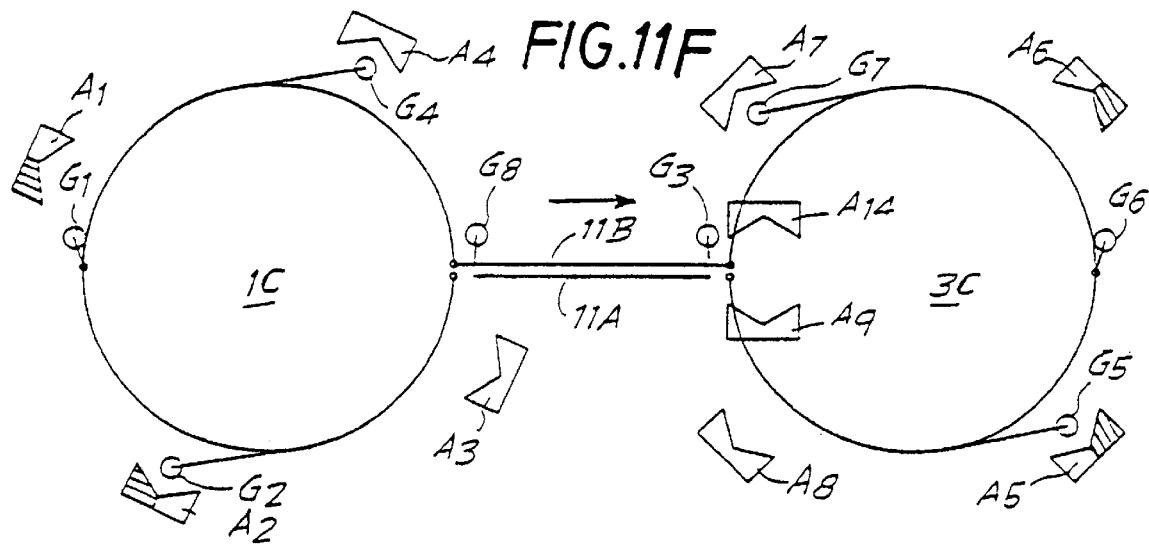
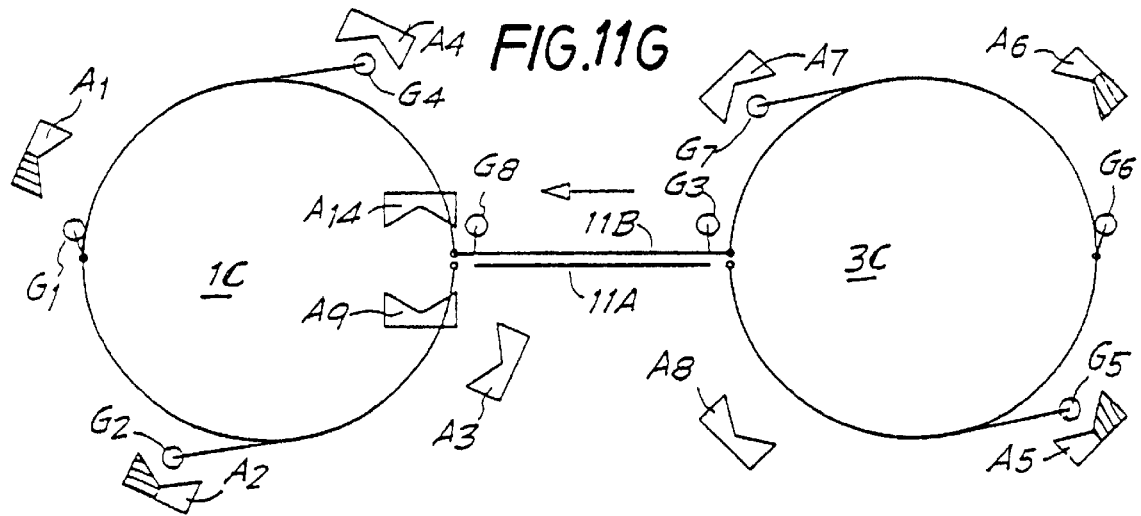
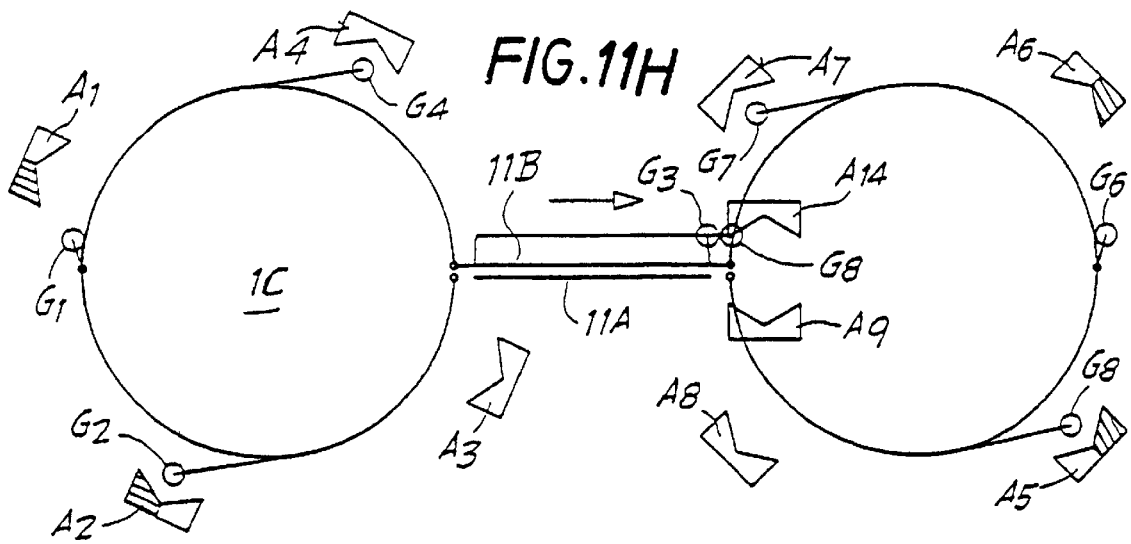

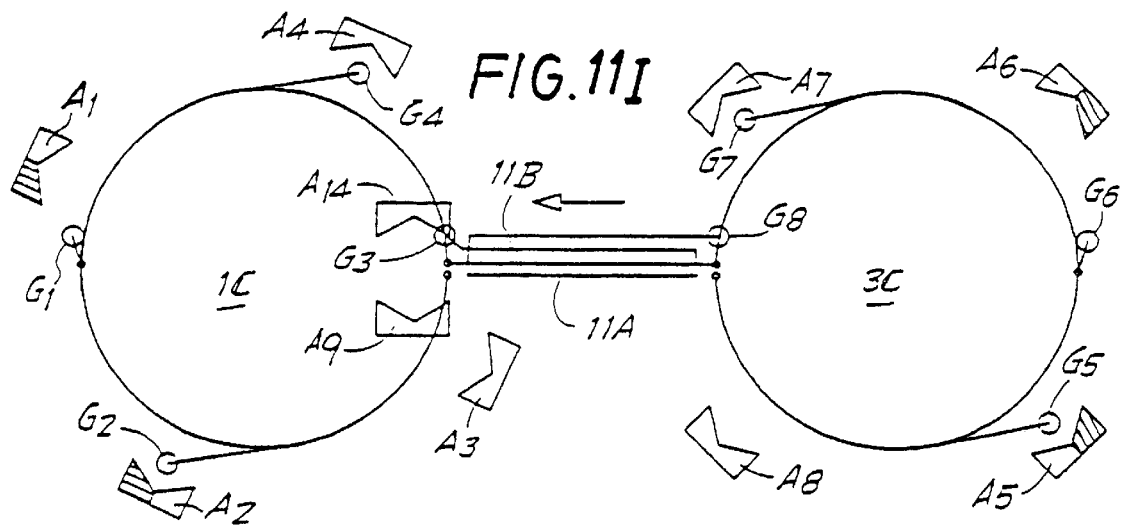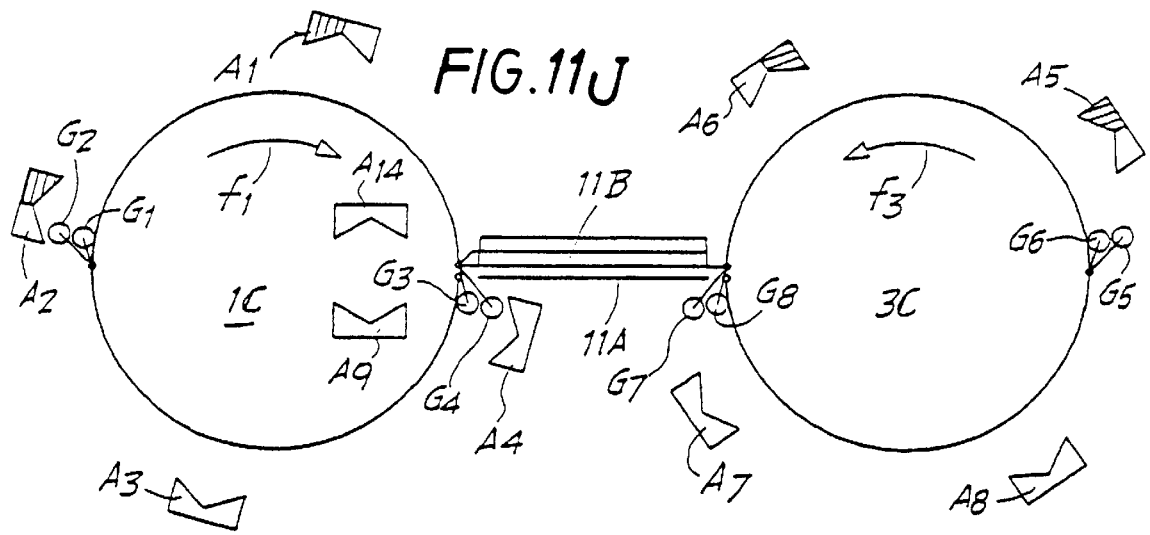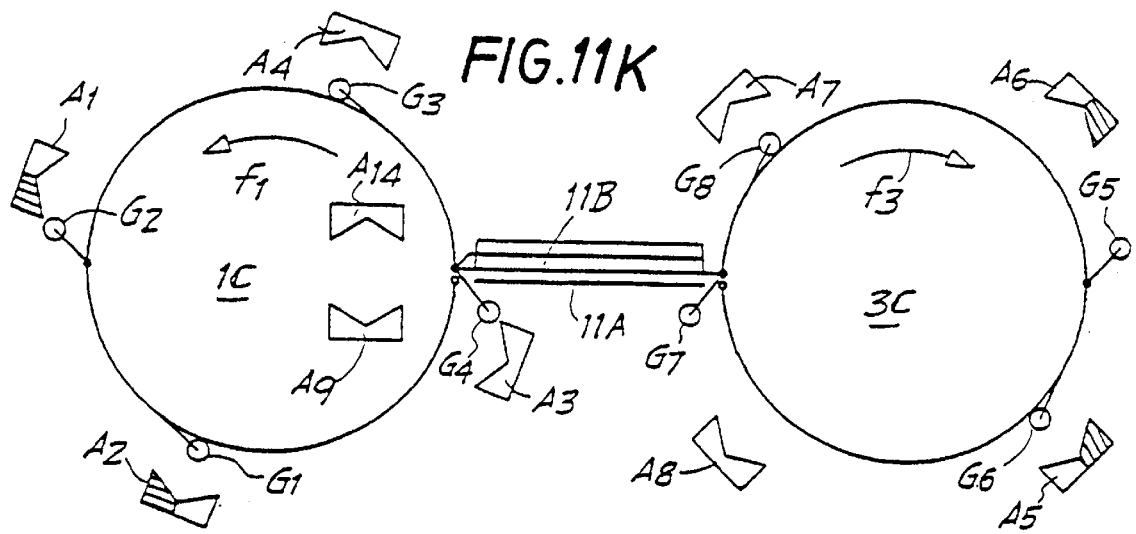

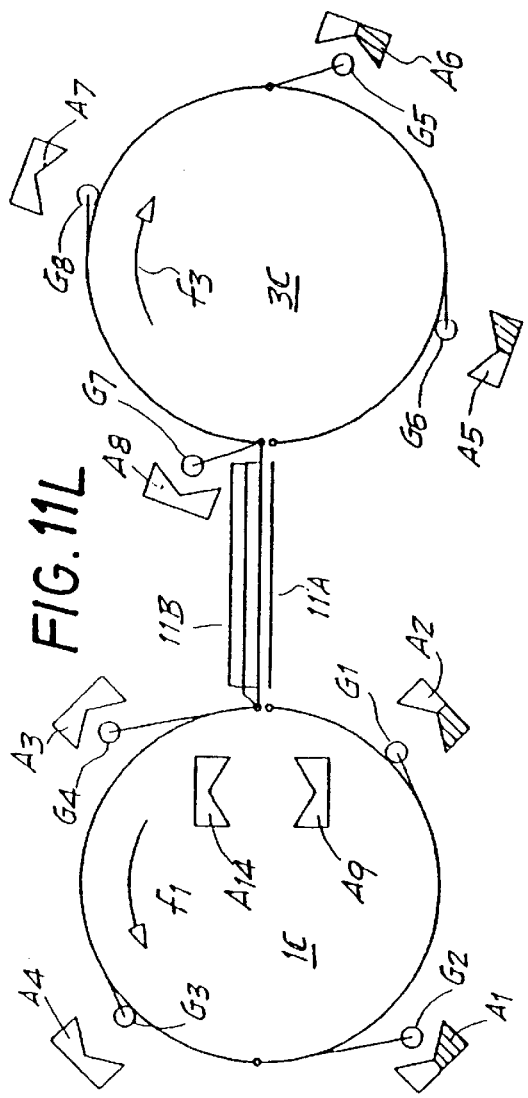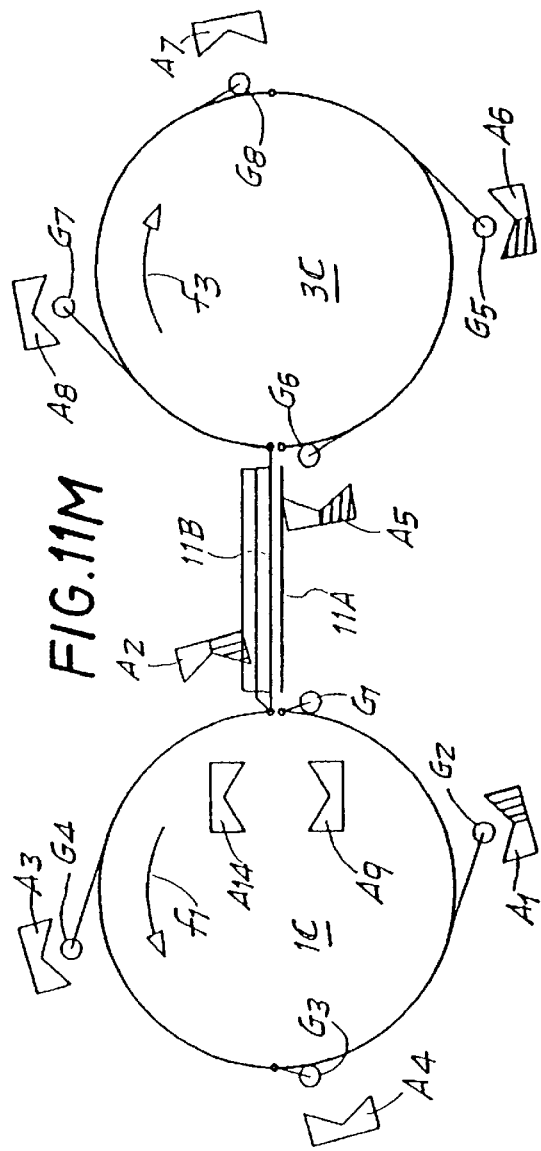

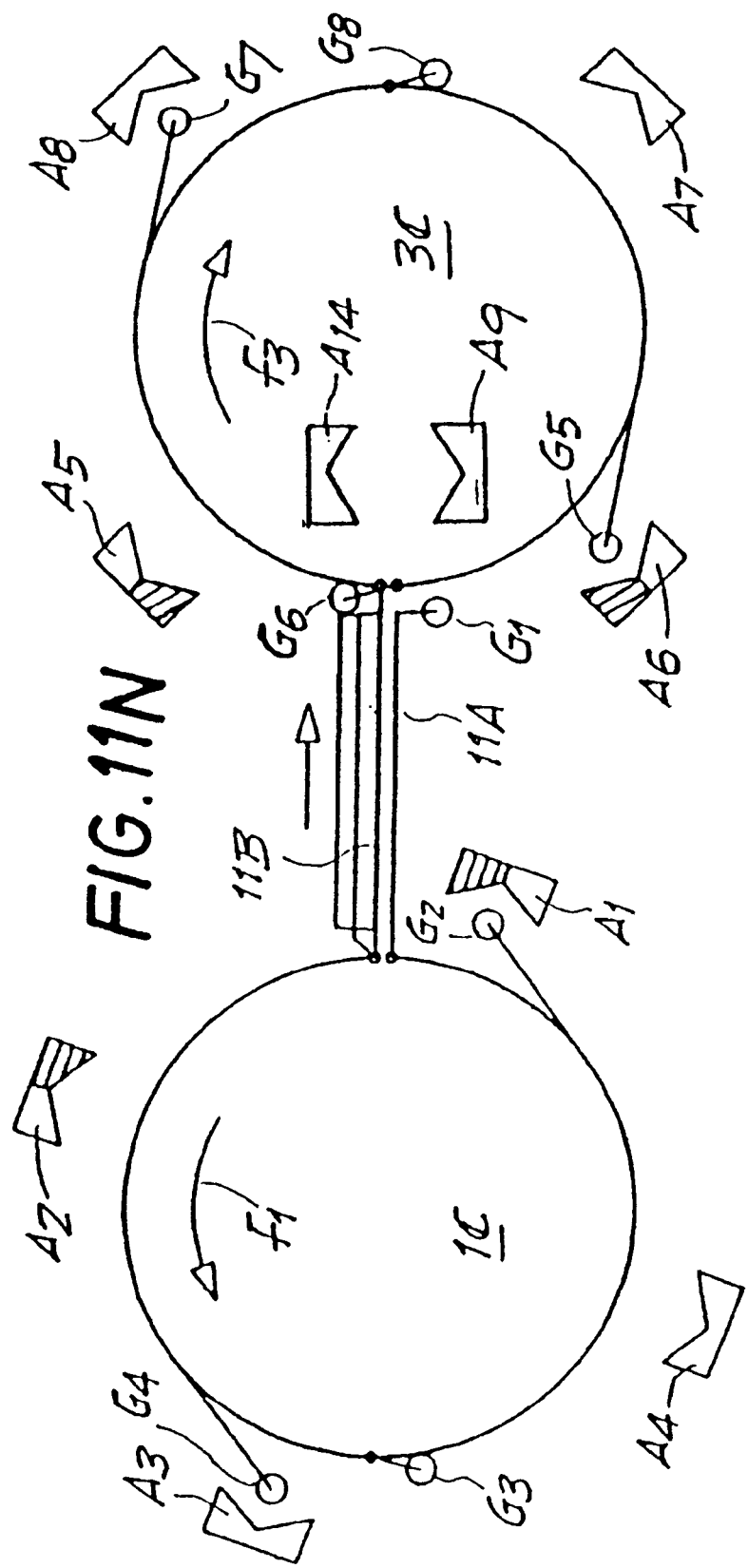

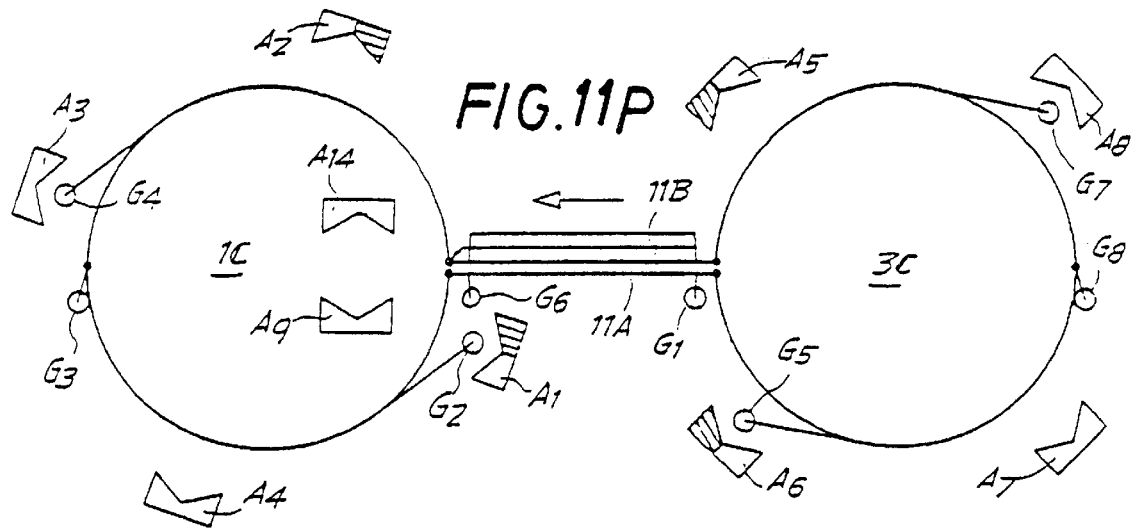
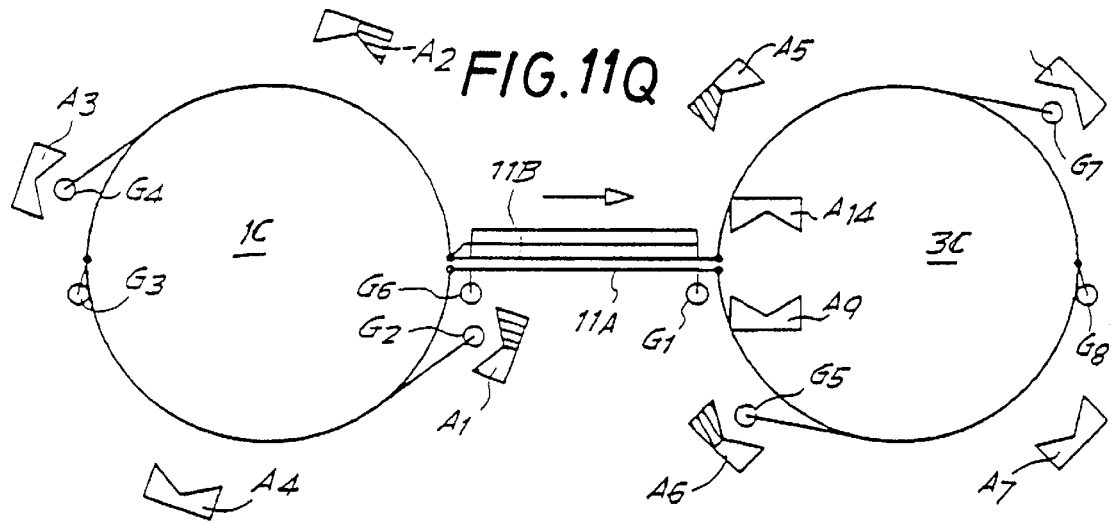
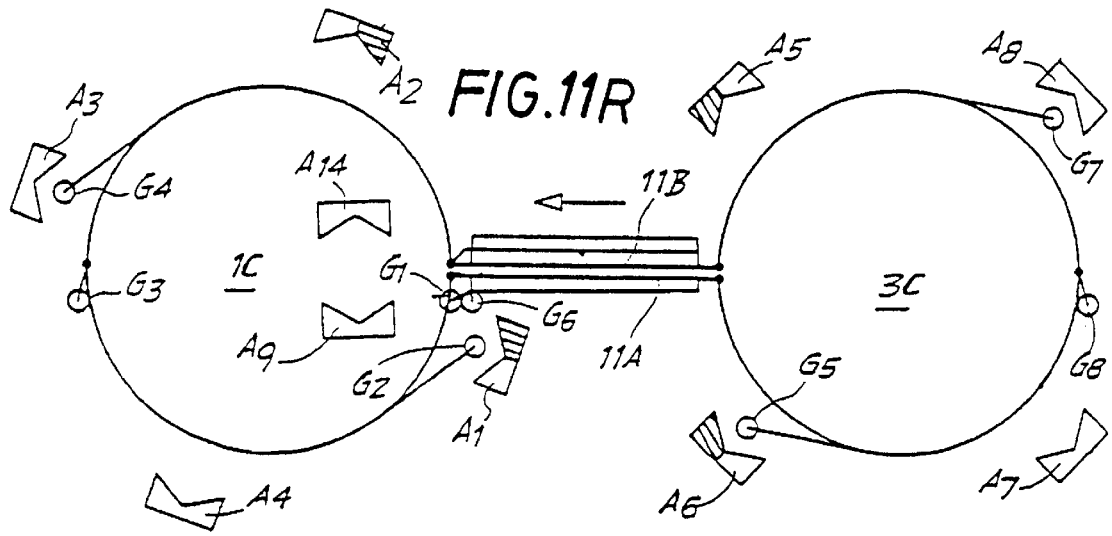

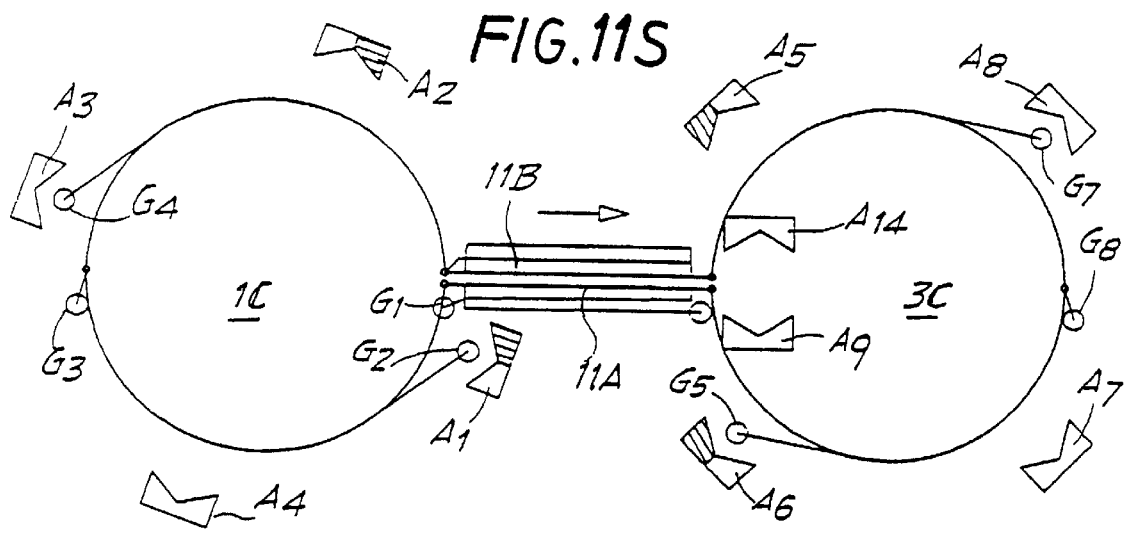
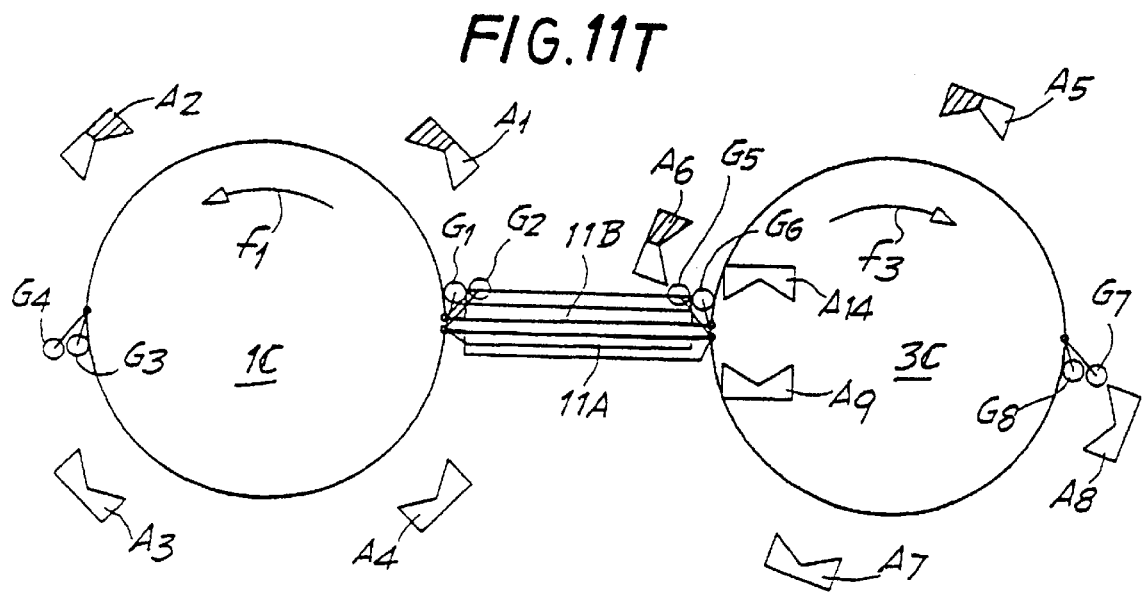

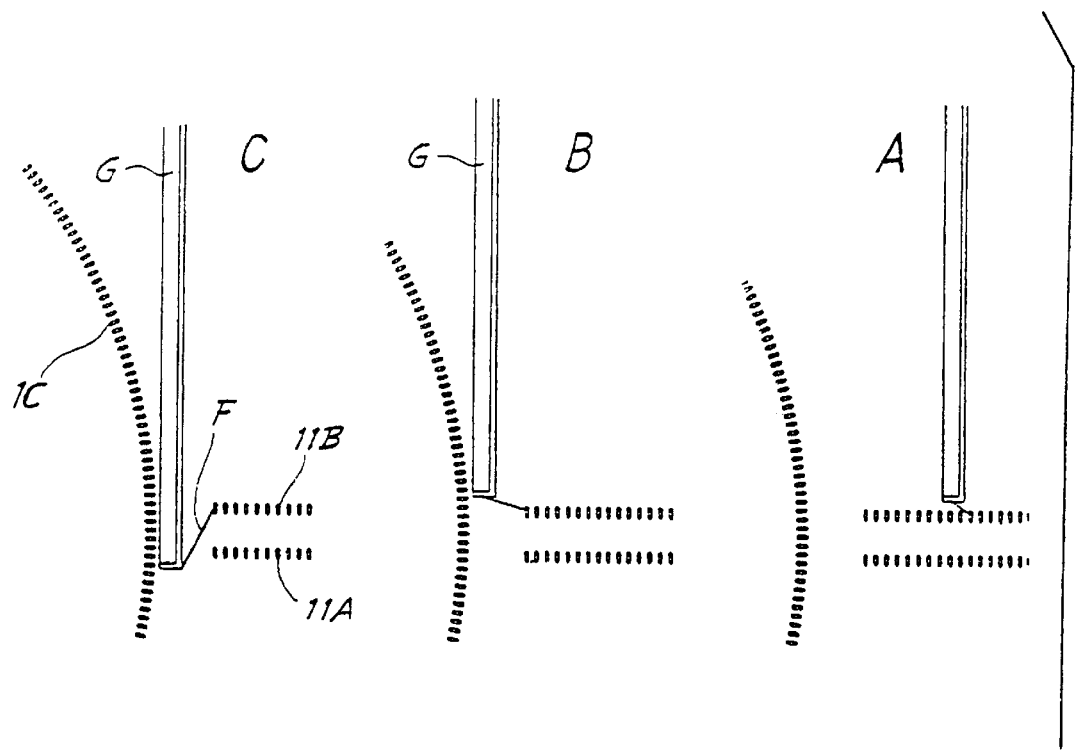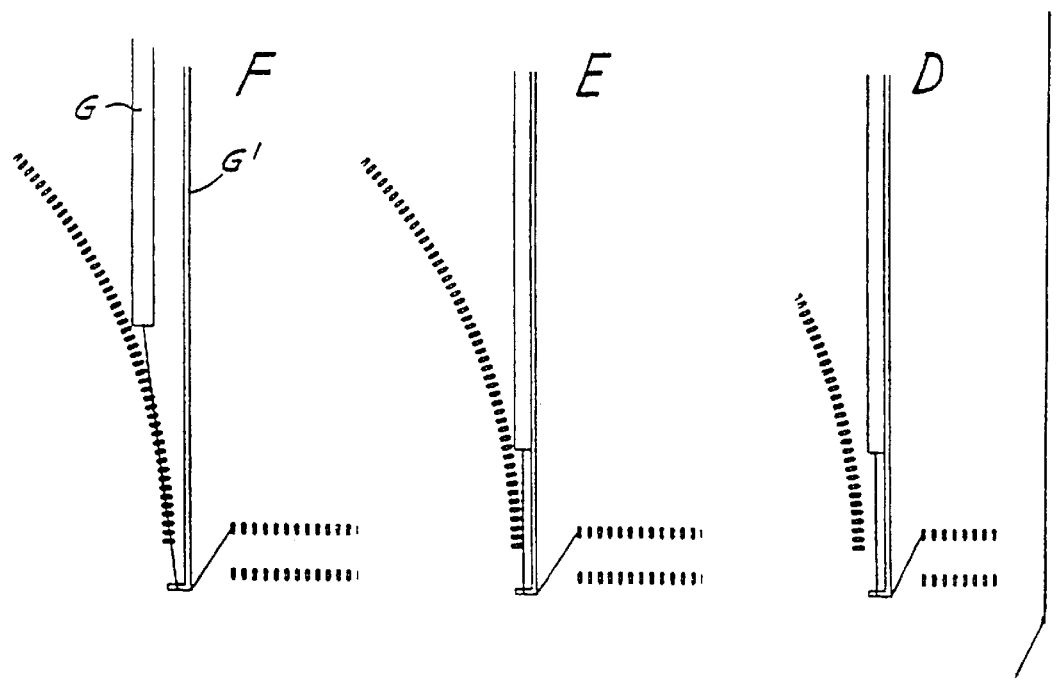
FIG.14

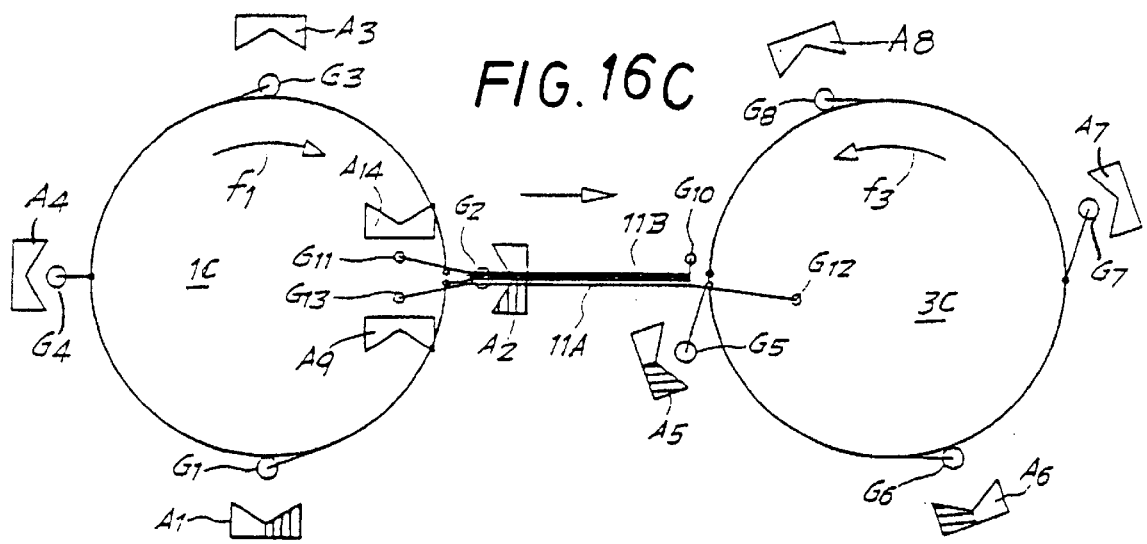
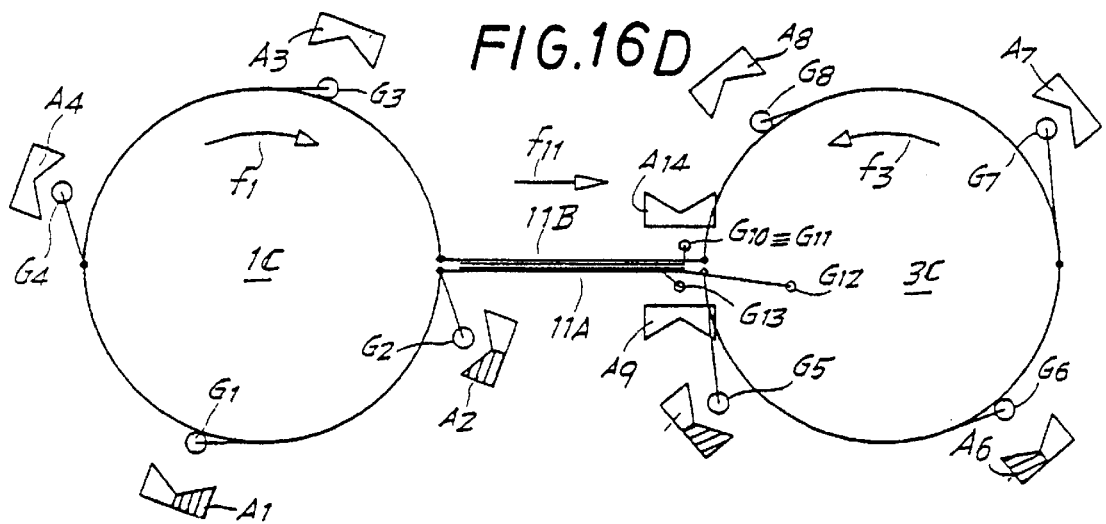
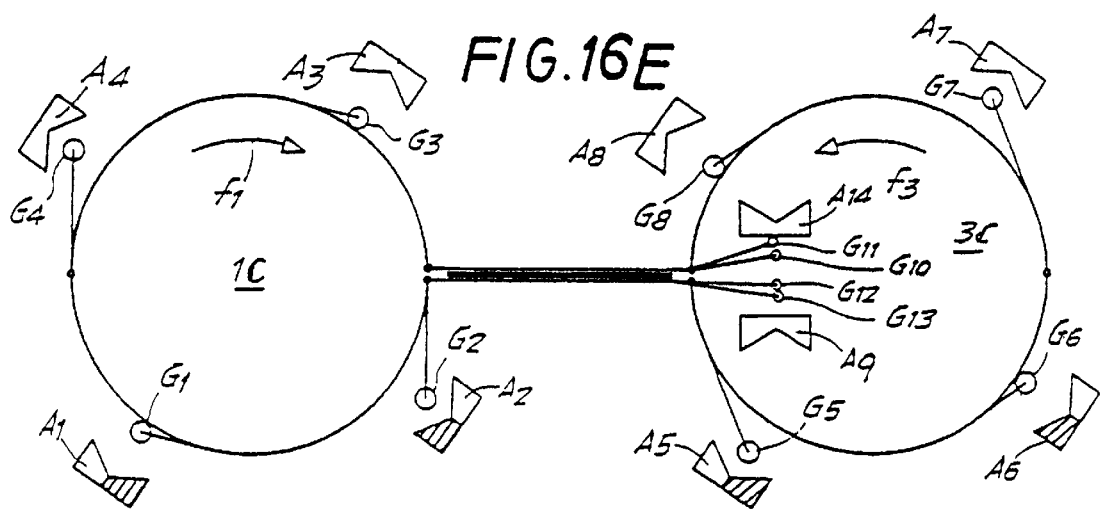

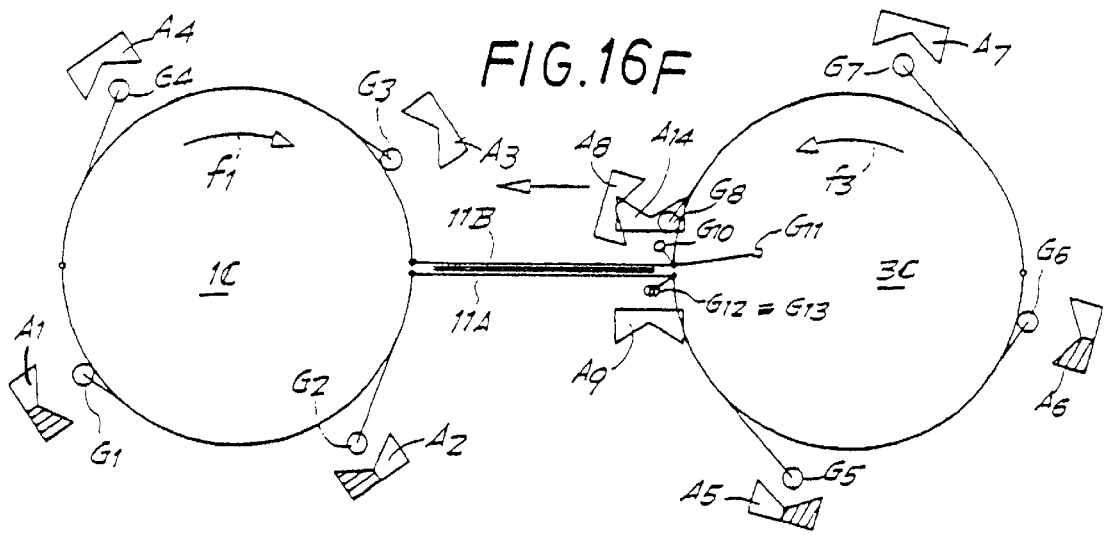
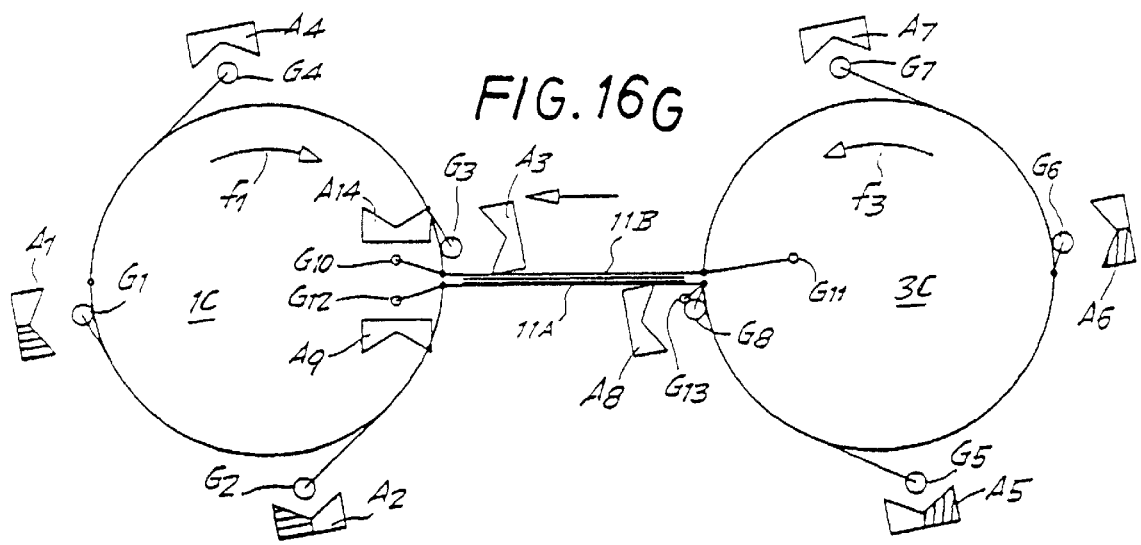
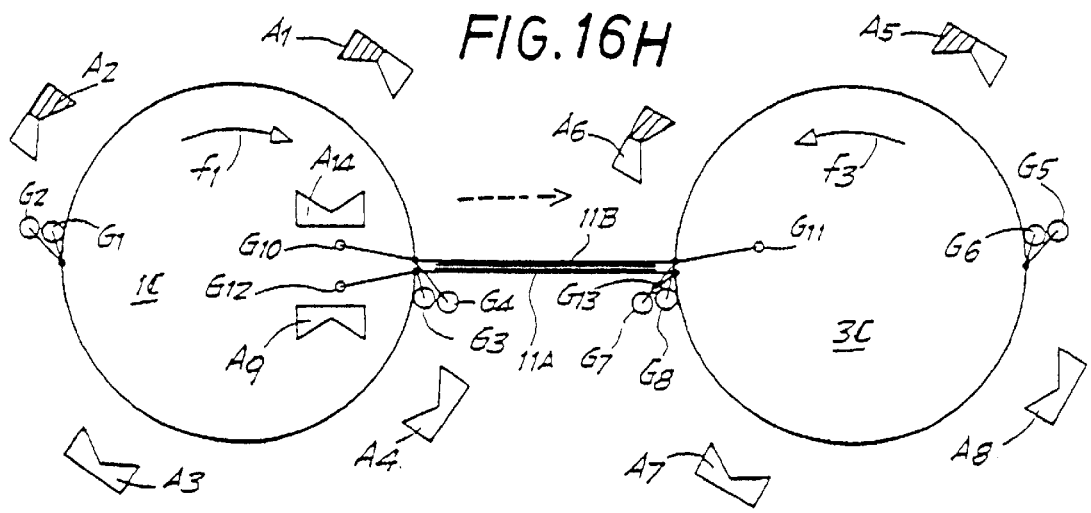

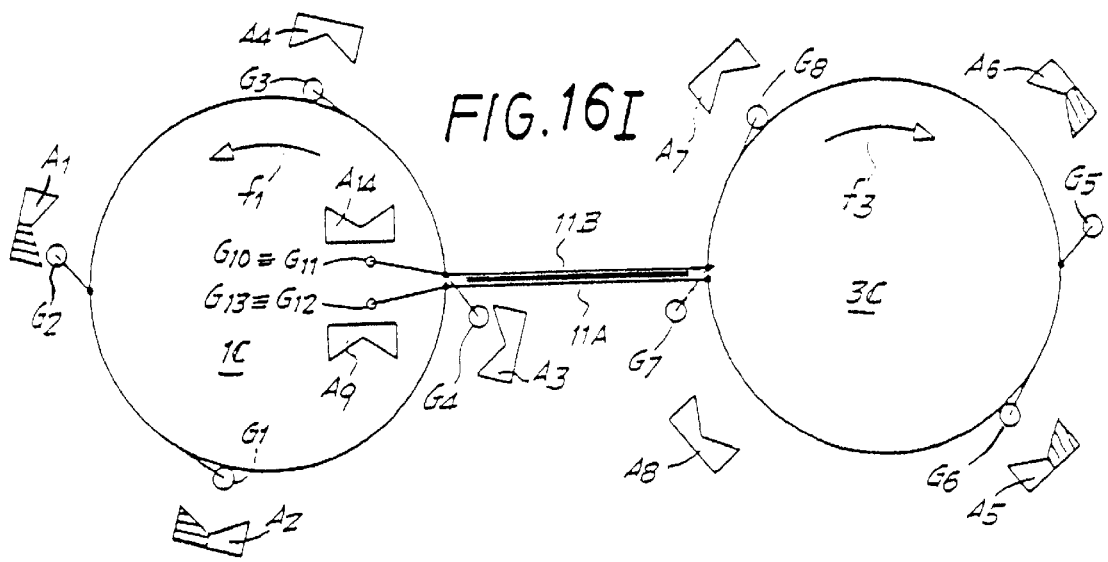
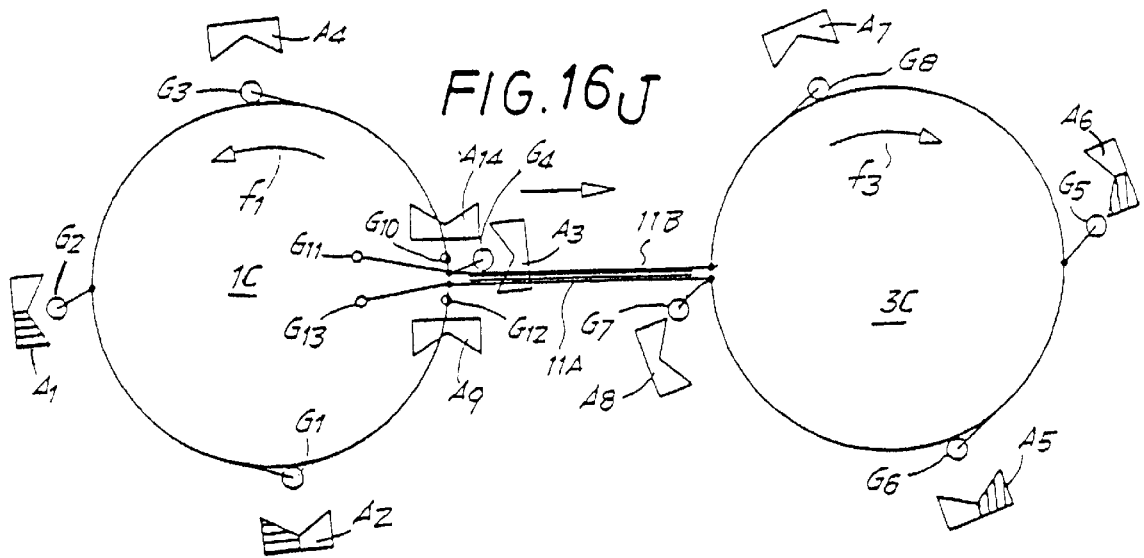
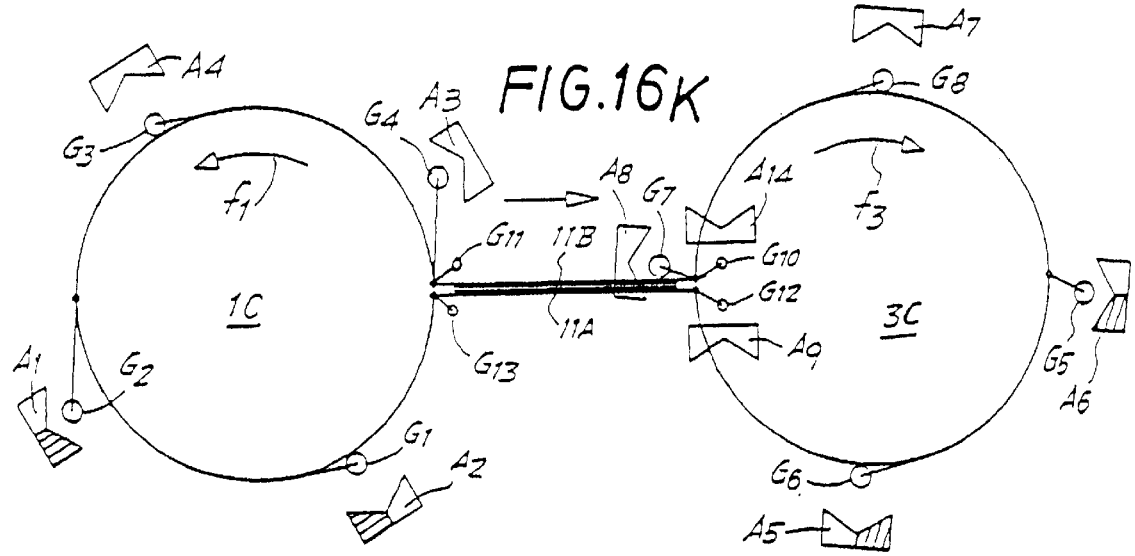

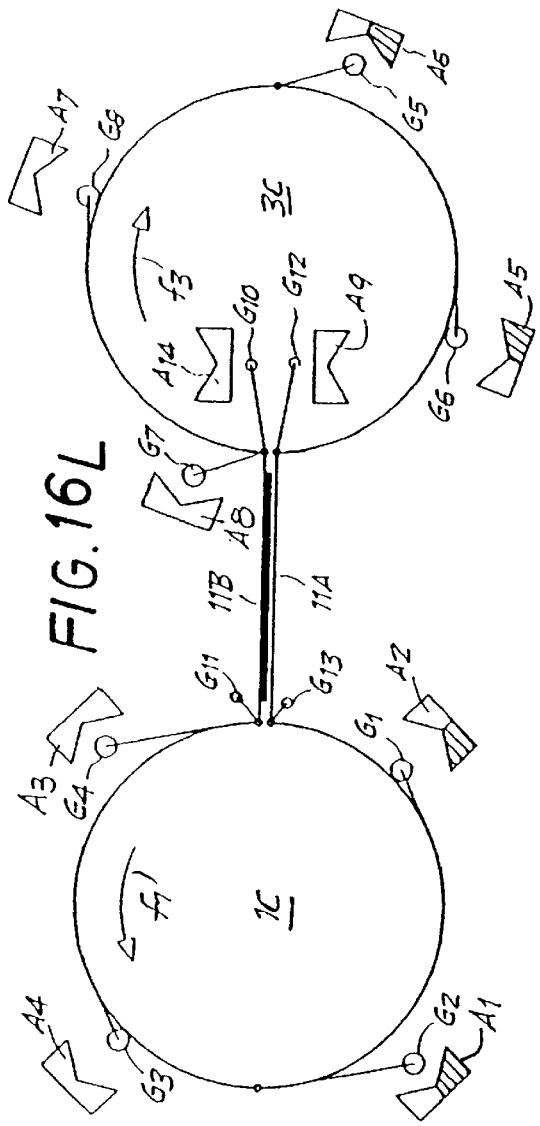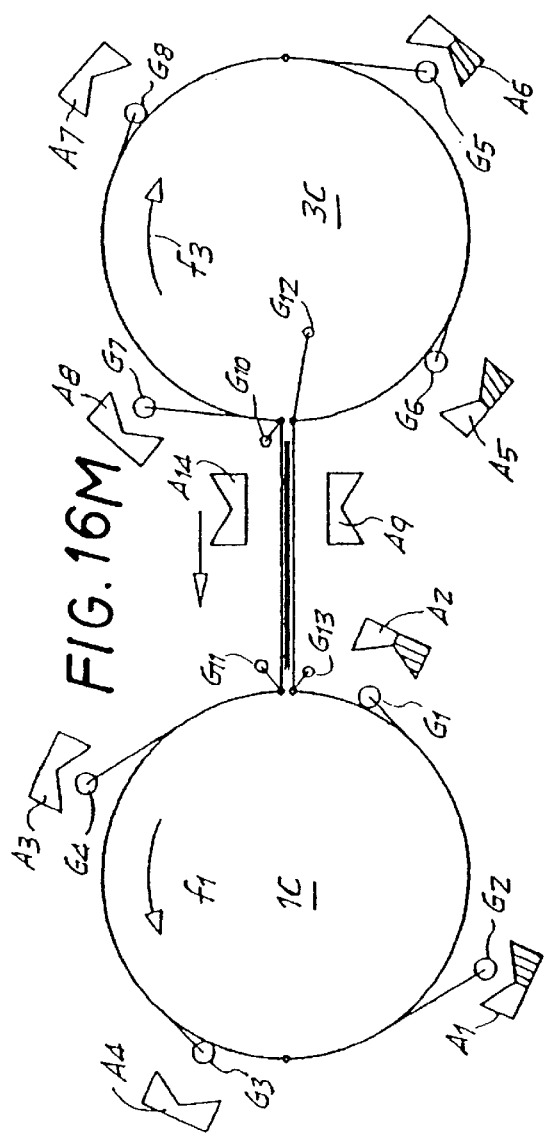

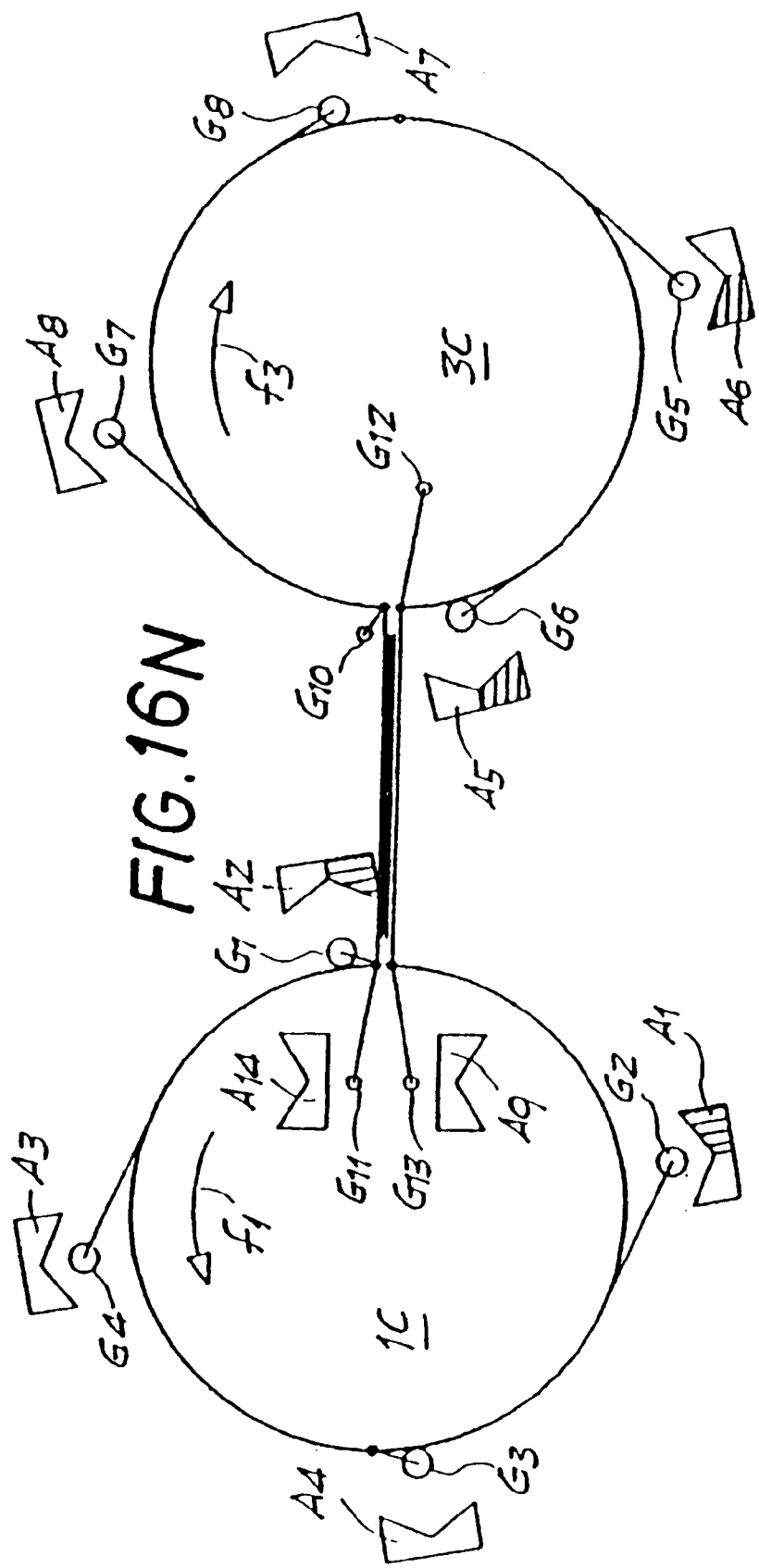

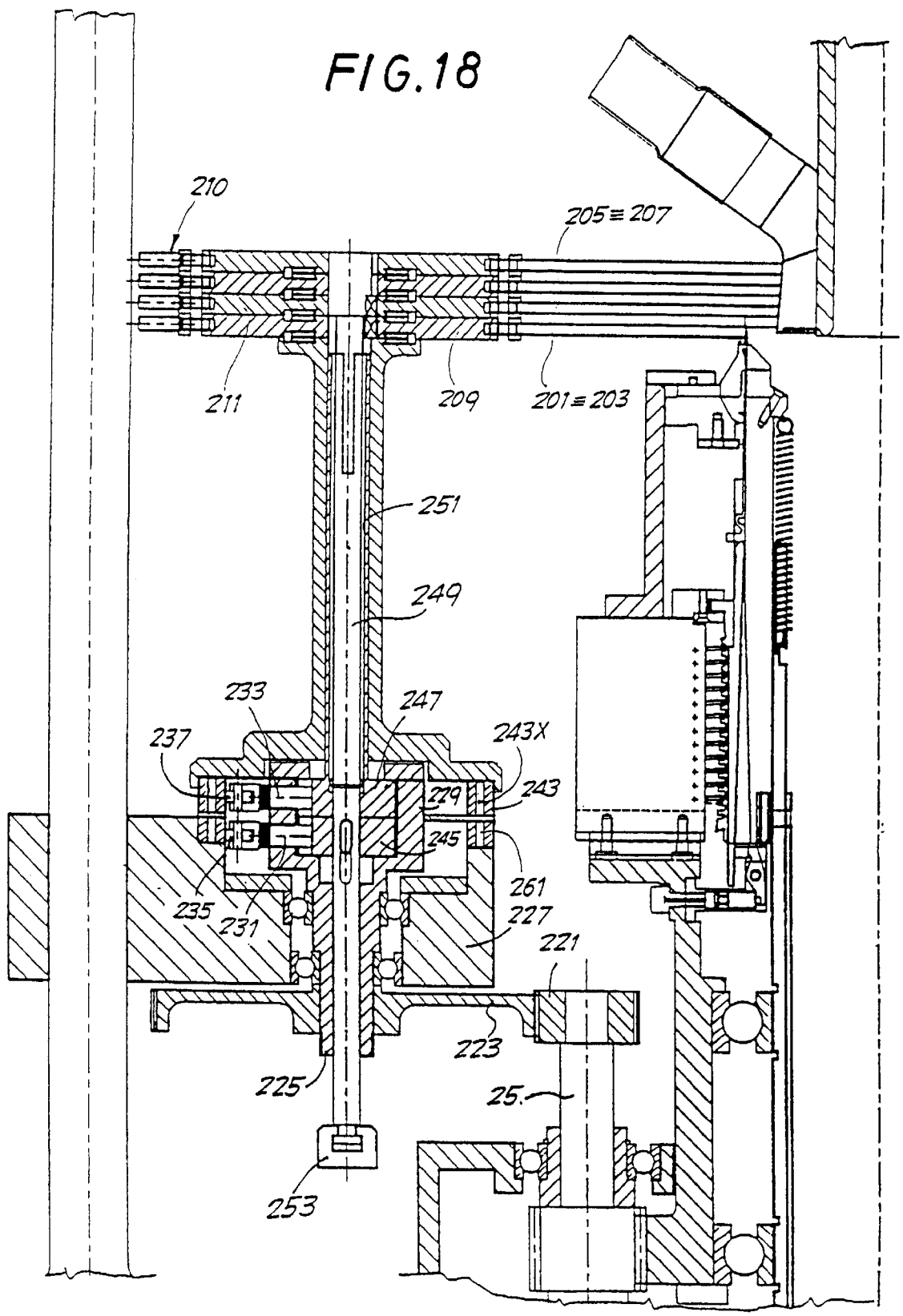

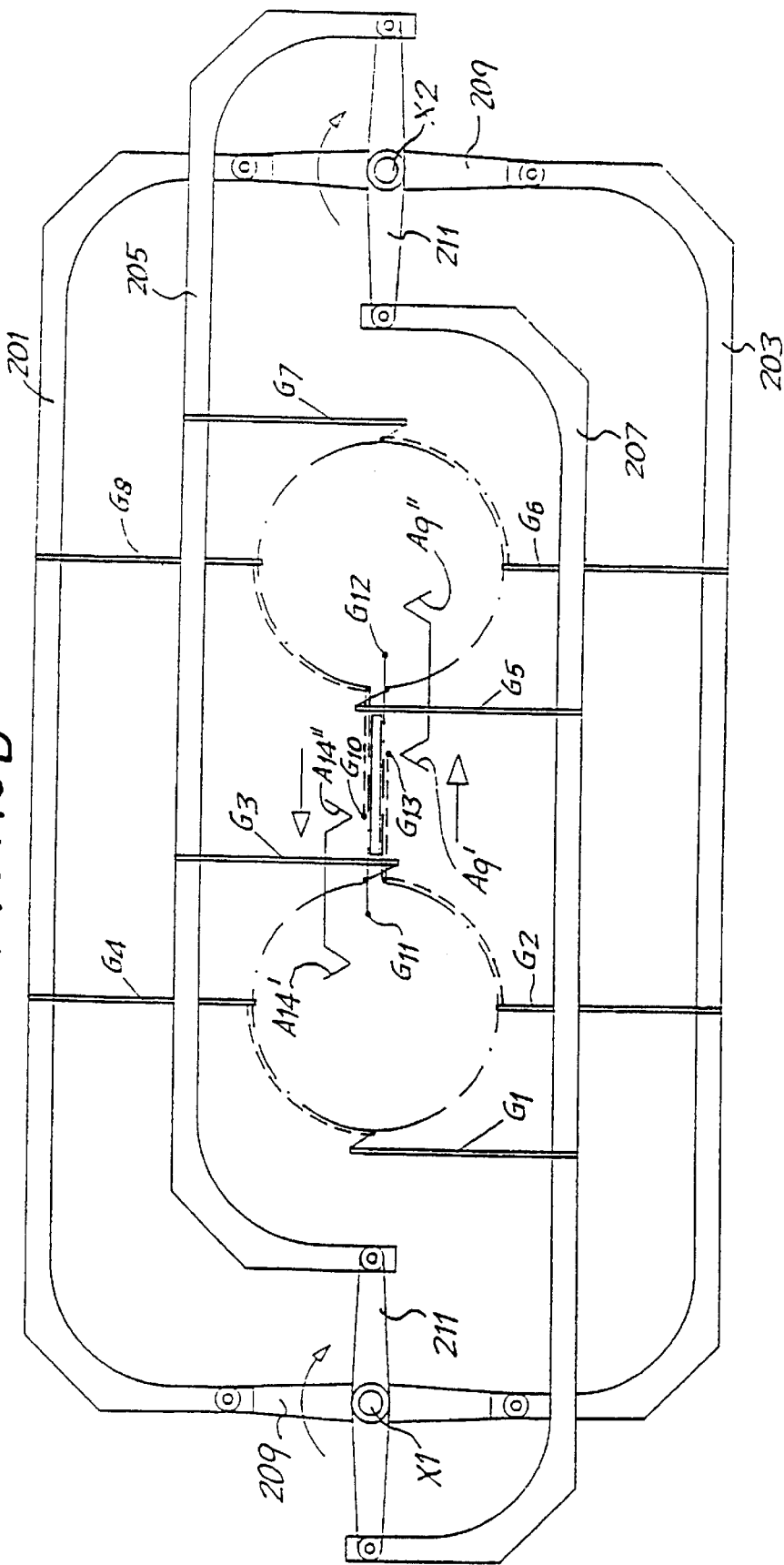

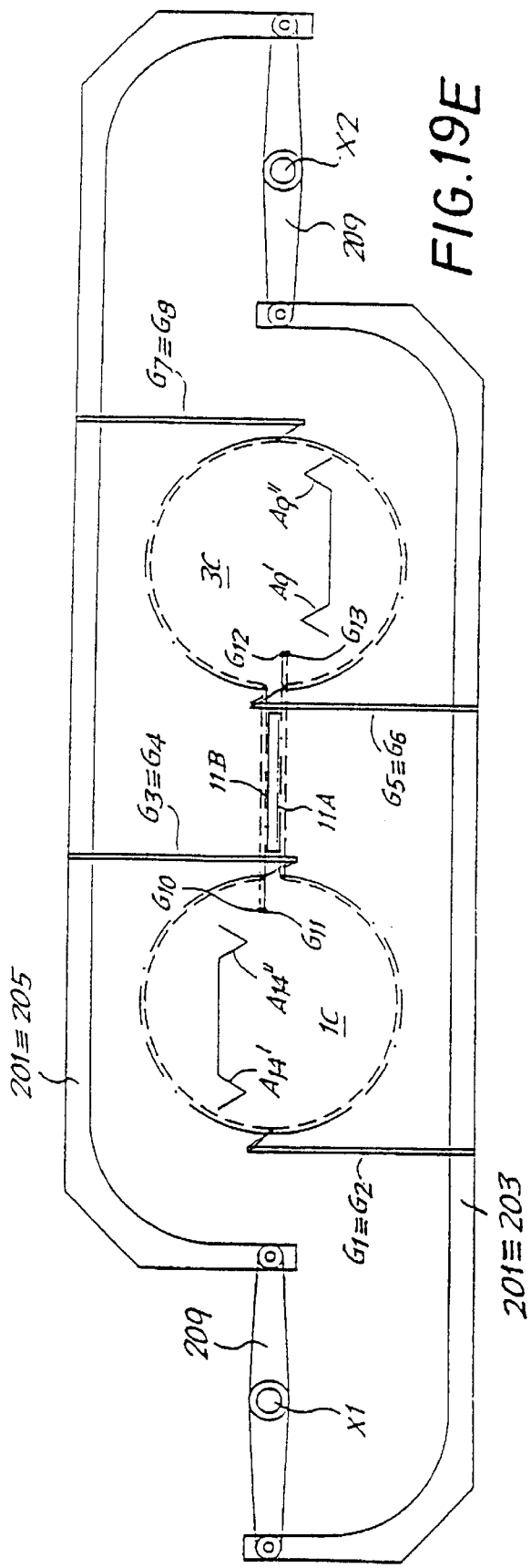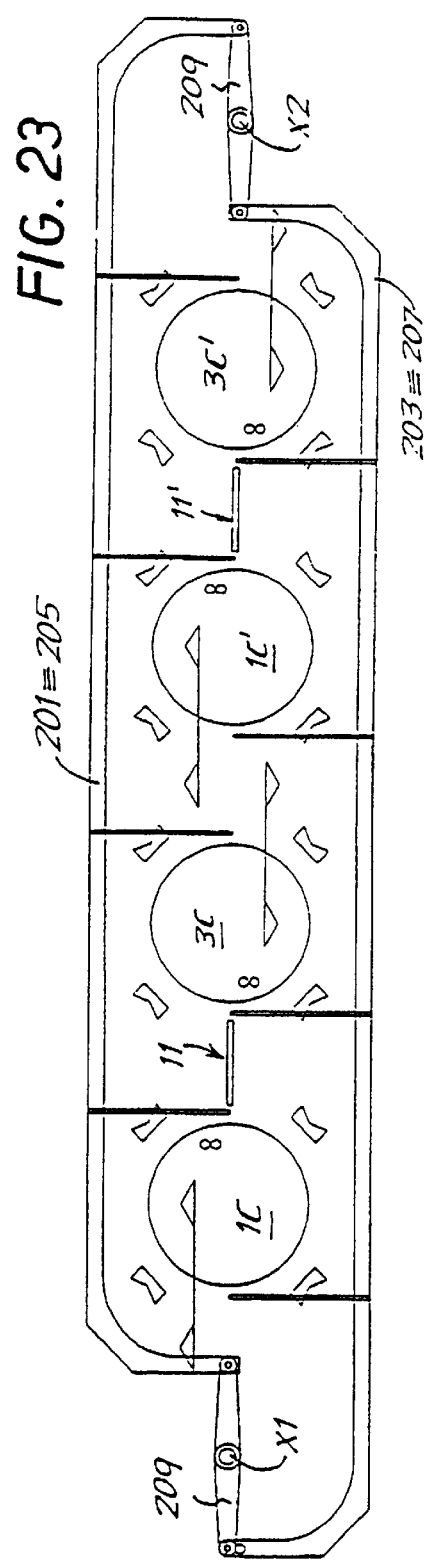

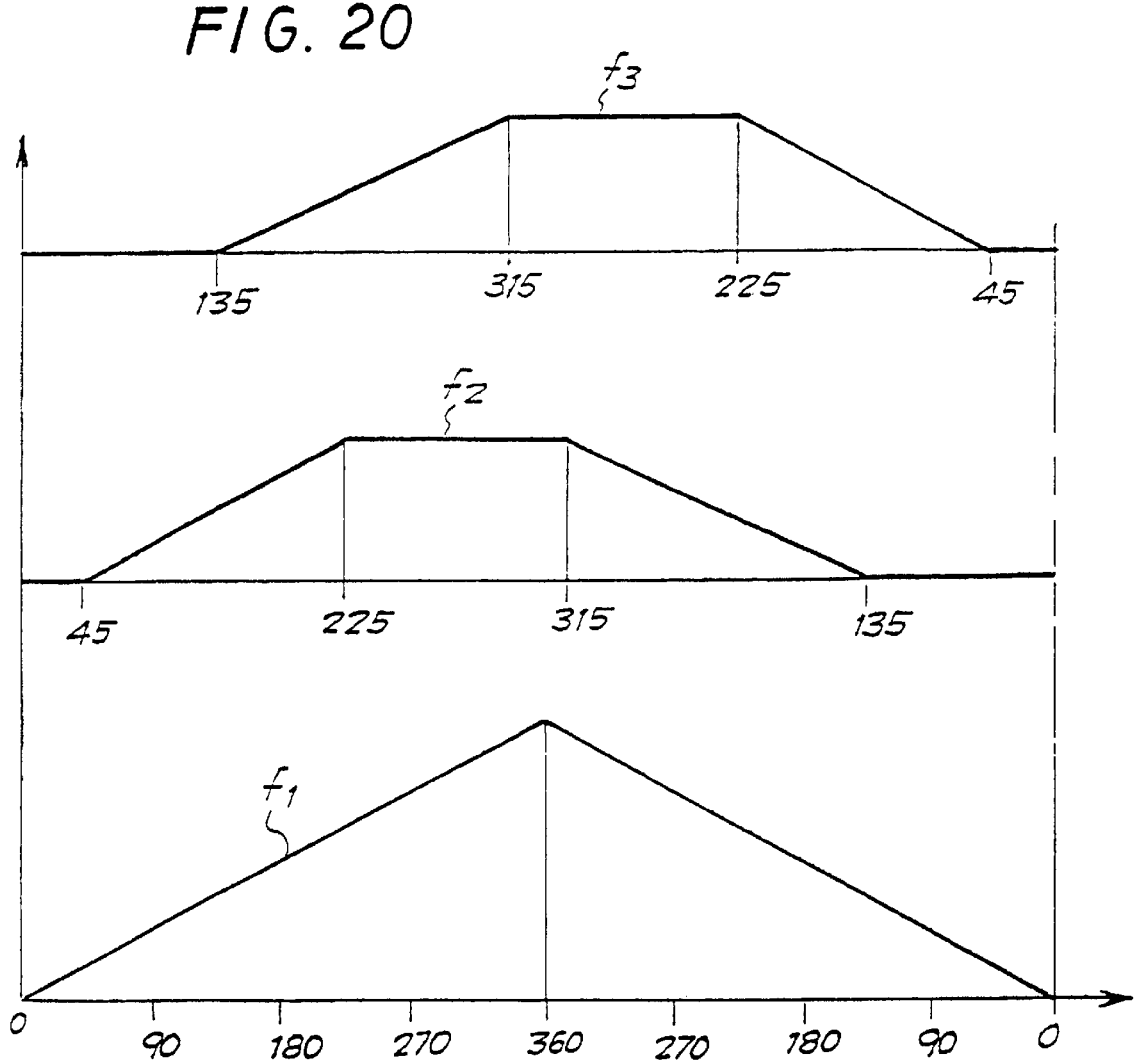

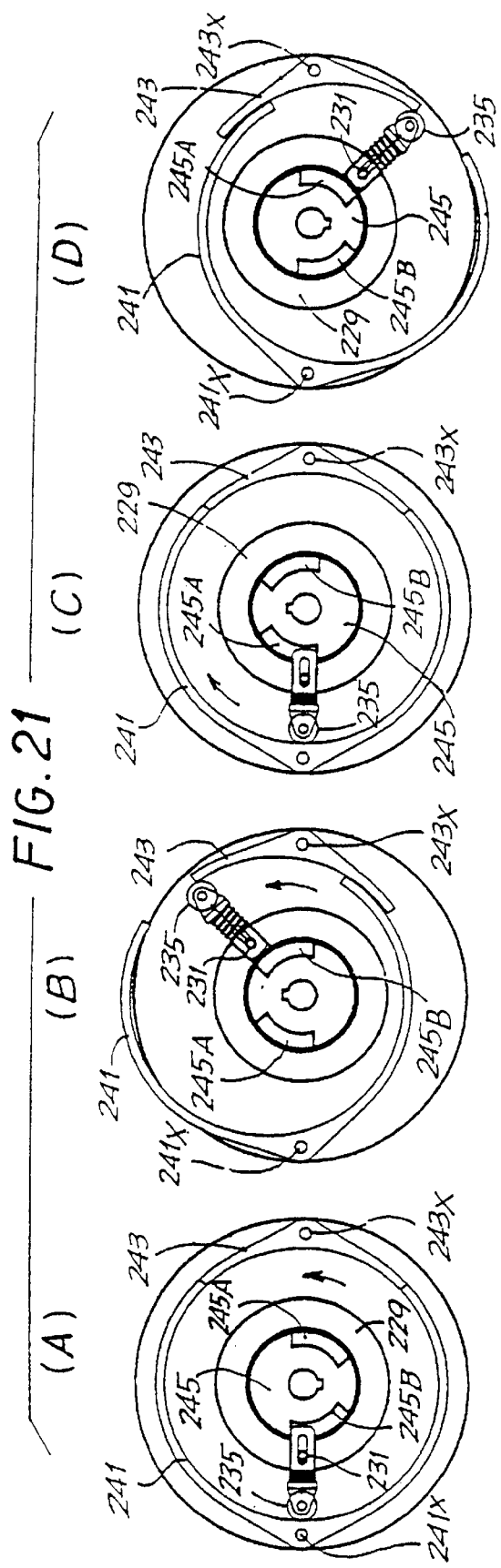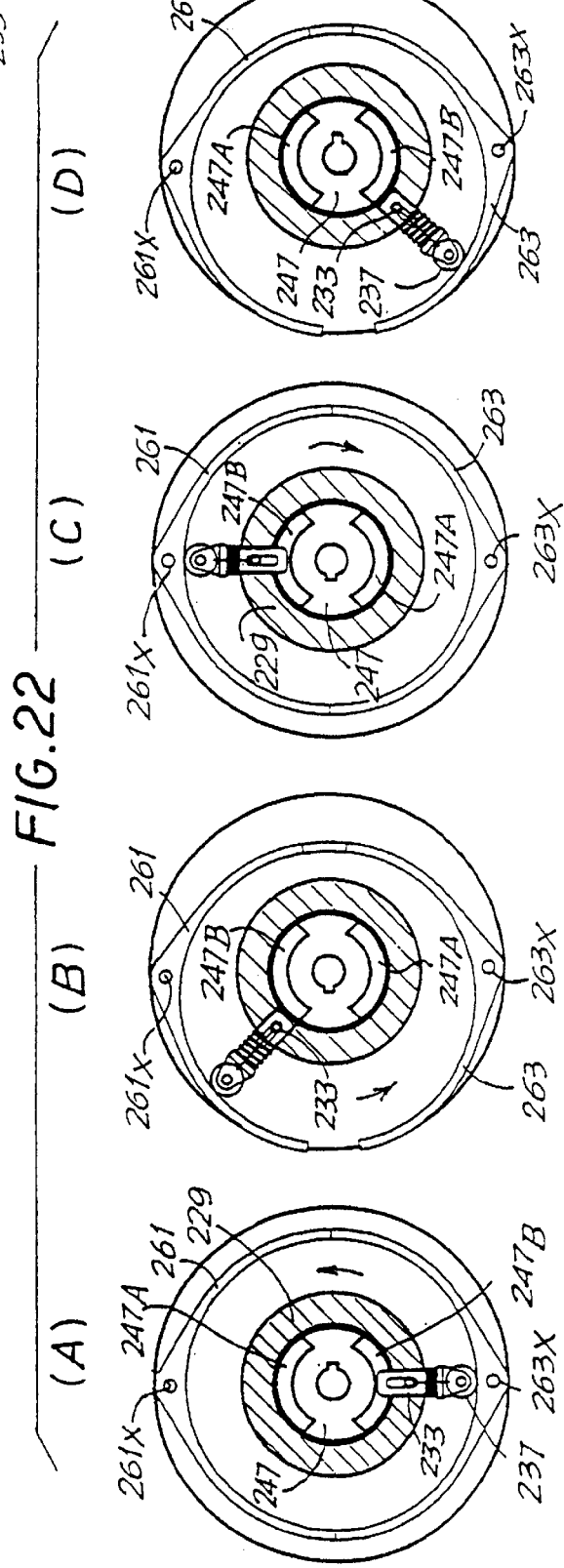

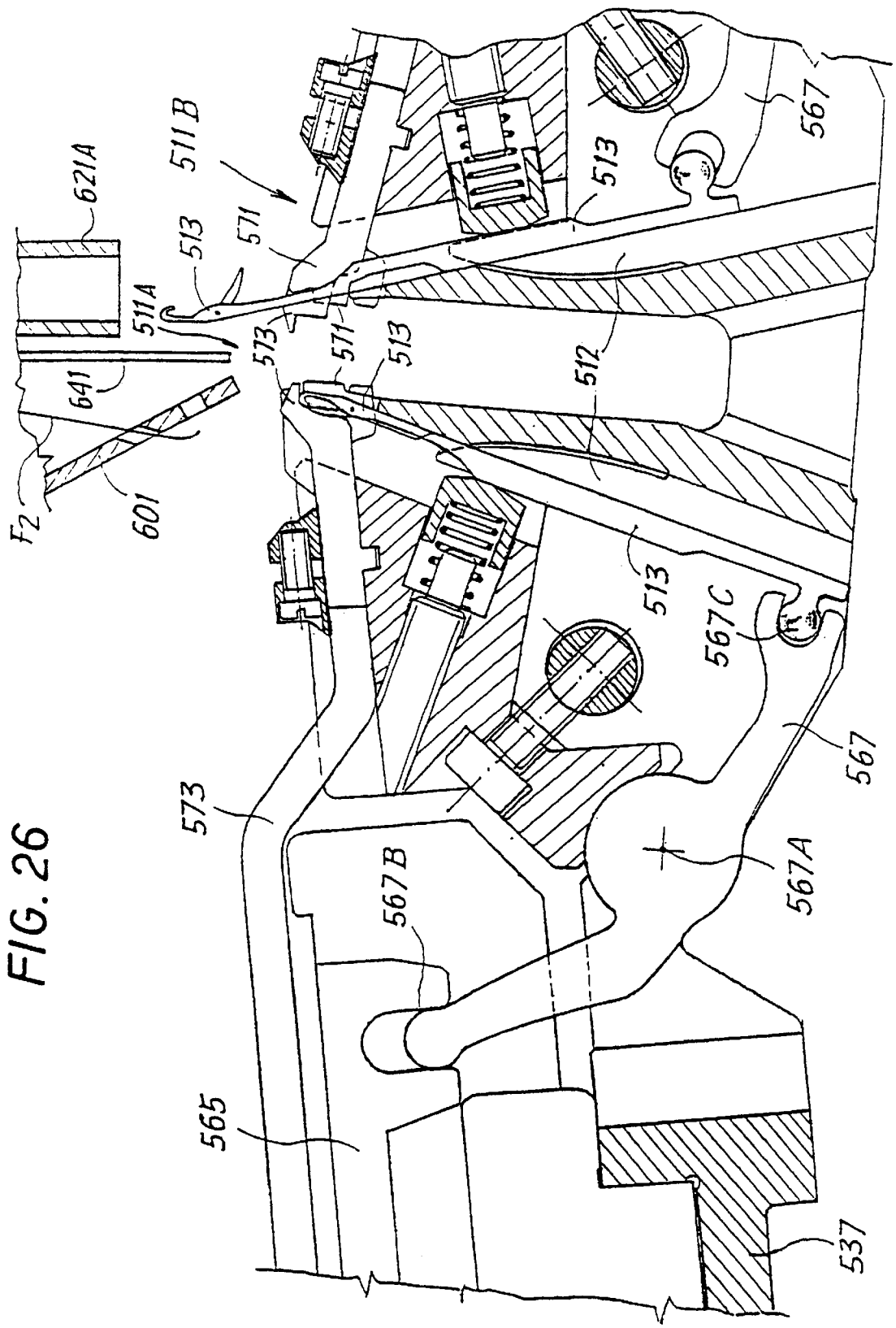

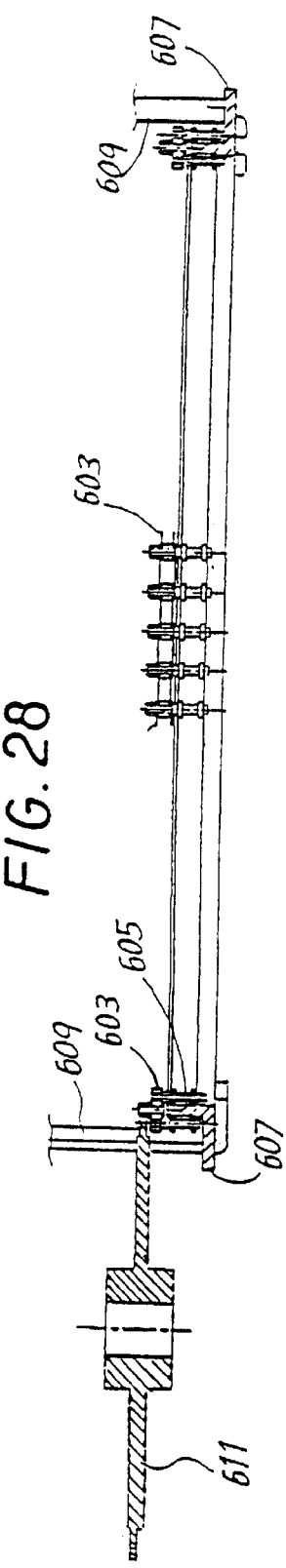
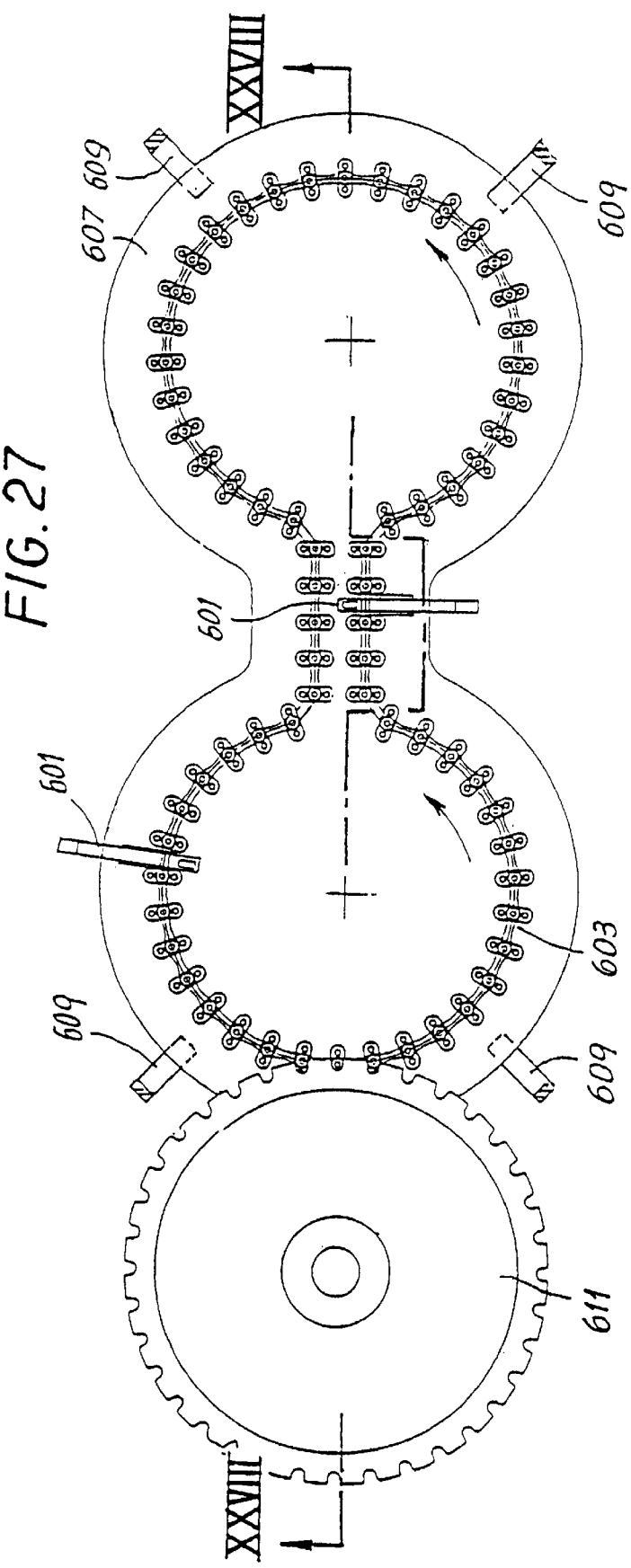
FIG.28
FIG.27

METHOD AND MACHINE FOR THE PRODUCTION OF KNITTED GARMENTS COMPRISING A BODY SECTION AND LEGS, IN A SINGLE PRODUCTION STAGE AND IN A SINGLE PIECE

FIELD OF THE INVENTION

The present invention relates to a new knitting process and a new knitting machine for producing garments comprising a body section or panty section and a pair of legs, as for example tights, leggings and similar products. The invention also relates to a product produced by this method.

BACKGROUND ART

The conventional method of producing knitted garments of the above type involves firstly producing two tubular articles one after the other on a circular knitting machine, and secondly sending these to a machine which cuts them and sews them together, forming the body section or panty section of the finished garment in the joining zone.

This process is long and complicated, in that it requires the semifinished material to be passed through more than one machine, involves a large proportion of labour and produces offcuts, so that yarn which has already been knitted is wasted.

Systems have therefore been devised for knitting tights and suchlike articles of the above type in a single knitting operation. Examples of these techniques are described in the following patents: U.S. Pat. No. 5,020,340, U.S. Pat. No. 5,127,240, U.S. Pat. No. 5,226,297. Systems of more recent production are described in WO 95/00689 (PCT/IT94/00087), WO 95/01473 (PCT/IT/94/00099). These systems are, however, highly complex.

OBJECTS OF THE INVENTION

It is an object of the present invention to provide a method and a machine for the production, in a single productive operation, of a knitted garment comprising a body section and two legs joined to said body section, which method and machine are simpler, more reliable and easier to operate than the methods and machines known hitherto.

In particular, one object of the present invention is to provide a production method and a machine of the aforesaid type that are fast and reliable and result in an article of pleasing appearance.

Another object of the present invention is to provide a textile knitting machine capable of producing a finished or almost finished article (with legs and body section) and that has a relatively small number of moving parts, with low inertias.

Yet another object of the present invention is to provide a method and a machine that can produce an article of the abovementioned type that is very strong.

An object of a further embodiment of the present invention is to provide a machine that can produce tights or similar products with the toes of the legs already closed, avoiding the need for closure in a separate stage.

Yet another object of an embodiment of the present invention is to provide a knitting method and a knitting machine that can produce articles in which the same yams form both the legs and the body section without any interruption.

These and other objects and advantages of the present invention will be clear to those skilled in the art on reading the following text.

SUMMARY OF THE INVENTION

The method according to the invention involves forming a complete garment or article, consisting of a body section and a pair of legs, in a single uninterrupted operation comprising the following stages:

a) producing the two legs of the garment simultaneously and in parallel, beginning with the lower ends of the legs, on two hosiery cylinders with needles arranged next to each other; and b) producing, on two rectilinear beds interposed between said cylinders, a body section closure zone, and completing said body section by the combined action of the cylinders and rectilinear beds of needles.

In the second stage of the operation the yarns already employed in the first stage may be the only ones that continue to be used, or, at the operator's choice, other yarns may be added to or substituted for them.

The method is realized by an original combined use of elements characteristic of two circular (or cylindrical) hosiery machines with elements characteristic of a rectilinear knitting machine; of which the first work initially on their own and subsequently in cooperation and in combination with the activity of the second.

The advantages of this are obvious, and include: the possibility of replacing yarns of a given quality with others of a different quality in the course of the operation and without interrupting it (for example, in order to make the gusset or construct the panty section with a different material from that of the legs); the elimination of offcuts; and the elimination of unpleasant seams, making the garment more comfortable to wear and improving its appearance.

In essence the machine that carries out the process described above comprises, in combination: at the sides, two knitting cylinders, parallel and close together, each with a plurality of needles and needle operating elements; and, in an intermediate position between said two cylinders, two rectilinear fabric forming beds next to each other, each with its own needles and needle operating elements.

As in known methods, the cylinders, which are rotating, form, beginning at the foot end, the two legs of the garment, while the rectilinear beds are temporarily inactive. Once the legs are finished, the cylinders stop rotating and the operating elements of their needles begin to rotate instead, and—without its being necessary to interrupt the operation of the machine—the two rectilinear beds close the crotch using one or more yarns supplied to their crossed-over needles and, immediately following this, by a reciprocating movement of the needle operating elements of the rectilinear beds and of the needle operating elements of the cylinders, the body section is formed from a plurality of zones of fabric joined together by suitable interlinking. During this stage the rectilinear beds produce the central or intermediate zones of the body section, while the lateral zones are knitted on the circular beds of the two cylinders.

The rectilinear beds can be arranged in parallel planes, in which case the closure of the crotch can be produced by using curved needles as in techniques known per se. However, partly for reasons of space, in a highly advantageous embodiment the beds are inclined in a "V" configuration with the vertex of the "V" pointing downwards.

Each cylinder has a plurality of yarn feeders able to move around the bed of needles carried by said cylinder. The yarn feeders are independent of the cylinder needle operating elements so that they can carry out the various processes during the article production cycle.

In practical application:
either the rectilinear beds are supplied with the same yarn which, having been used to knit the legs, supplies the circular needle beds of the cylinders; in which case at least some of the yarn feeders belonging to the cylinders must also be able to move along the rectilinear beds;

or each rectilinear bed has at least one extra yarn feeder travelling along it independently of the movements of the needle operating elements of the rectilinear beds.

In a particularly advantageous embodiment of the invention, for each cylinder there is also a tube coaxial therewith and positioned above it with a longitudinal slot facing the rectilinear beds at its lower end. During the formation of the body section of the garment, the legs of the garment are sucked pneumatically upwards inside said two tubes, and the legs in turn draw up through the two slots of the tubes the fabric of the body section as it is gradually formed. As a subsidiary point, an upward pneumatic suction is also provided between the two rectilinear beds. The lower rim of each tube is positioned approximately level with the area where the fabric is formed on the cylinders, in order correctly to guide the stitches as they are forming and ensure that they do not rise upwards before being cleared from the needles in that stage of the formation of the body section, in which the article is lengthening upwards rather than downwards.

For the driving of the fabric forming elements, in one embodiment it is advantageous to provide two motorized drives: one motorized drive giving motion to both cylinders and alternately to their needle operating elements; and a second motorized drive giving motion to the needle operating elements of the rectilinear beds. However, it is perfectly possible to have independent motorized drives for each group of needle operating cams and for each cylinder. For example, two motors may be provided for turning the cylinders (or, for the same purpose, a single motor with some suitable drive linkage), one or two motors for turning the cam boxes belonging to the cylinders and one or two motors for operating the carriages or carrying the operating cams of the rectilinear beds.

With suitable arrangements a single centralized motorized drive may be used if desired.

If it is wished that the legs of the garment should have feet, this can be done—without seams and with no break between the foot-making operation and the subsequent stages of constructing the remaining parts of the garment—by forming the legs with the toe of the foot already closed, by means of one of the known methods, including, by way of example, those described in: WO 95/31595; WO 95/34702; PCT/IT96/00102 (with Italian patent application FI95A000116 of May 24, 1995); PCT/IT96/00139 (with Italian patent application FI95A000165 of Jul. 14, 1995). The content of these documents is incorporated in this description.

According to a further embodiment of the present invention, the machine may include in combination to the two side units and the intermediate rectilinear beds, also means for controlling, during the formation of the body section, one or more yarn feeders around a closed path defined by said two cylinders and by said two rectilinear beds.

With this arrangement, the body section can be formed by moving the yarn feeders always in the same direction around the closed path, without reversing their motion. It is also possible to form the body section by moving two or more yarn feeders around said closed path with a reciprocating motion, or partly with a reciprocating motion and partly with a continuous motion. If the yarn feeders are driven with a reciprocating motion around the path, a single yarn feeder is advantageously used around one section of the path that comprises two semicircles about the two cylinders and one of the rectilinear beds.

The motion of the yarn feeders around the closed path is preferably a continuous motion for part or all of the stage of producing the body section.

Other characteristics and embodiments of the machine, of the method and of the article according to the invention are indicated in the following detailed description, which shows a nonlimiting example of a possible embodiment of the invention and of the machine, and in the claims with which this description concludes.

BRIEF DESCRIPTION OF THE DRAWINGS

The invention will be understood more clearly from perusal of the description and accompanying drawing, which shows a practical nonlimiting embodiment of said invention. In the drawing:

FIG. 10 is a simplified plan view illustrating the yarn feeders, the circular beds of the two cylinders and the two intermediate rectilinear beds;

FIGS. 14A–14F show a detail of the manner in which the yarn is passed from a rectilinear bed to a circular bed in the method illustrated in FIGS. 11A–11T;

FIG. 18 shows a detail of a different embodiment of the yarn feeder drive means;

FIGS. 19A–19E show five successive stages in the movements of the yarn feeders in the embodiment shown in FIG. 18;

FIG. 20 is a diagram of the angular movements of the means controlling the yarn feeders of FIGS. 18 and 19;

FIGS. 21 and 22 show the successive angular positions adopted by the yarn feeder control means;

FIG. 23 shows one arrangement of the yarn feeders for a double machine;

FIG. 26 shows an enlargement of FIG. 25;

FIG. 27 shows a schematic plan view of the chain on which the yarn feeders are carried;

FIG. 28 shows a sectional view on V—V as marked in FIG. 27;

DETAILED DESCRIPTION OF EMBODIMENTS OF THE INVENTION

Mechanical structure

Figure 8:
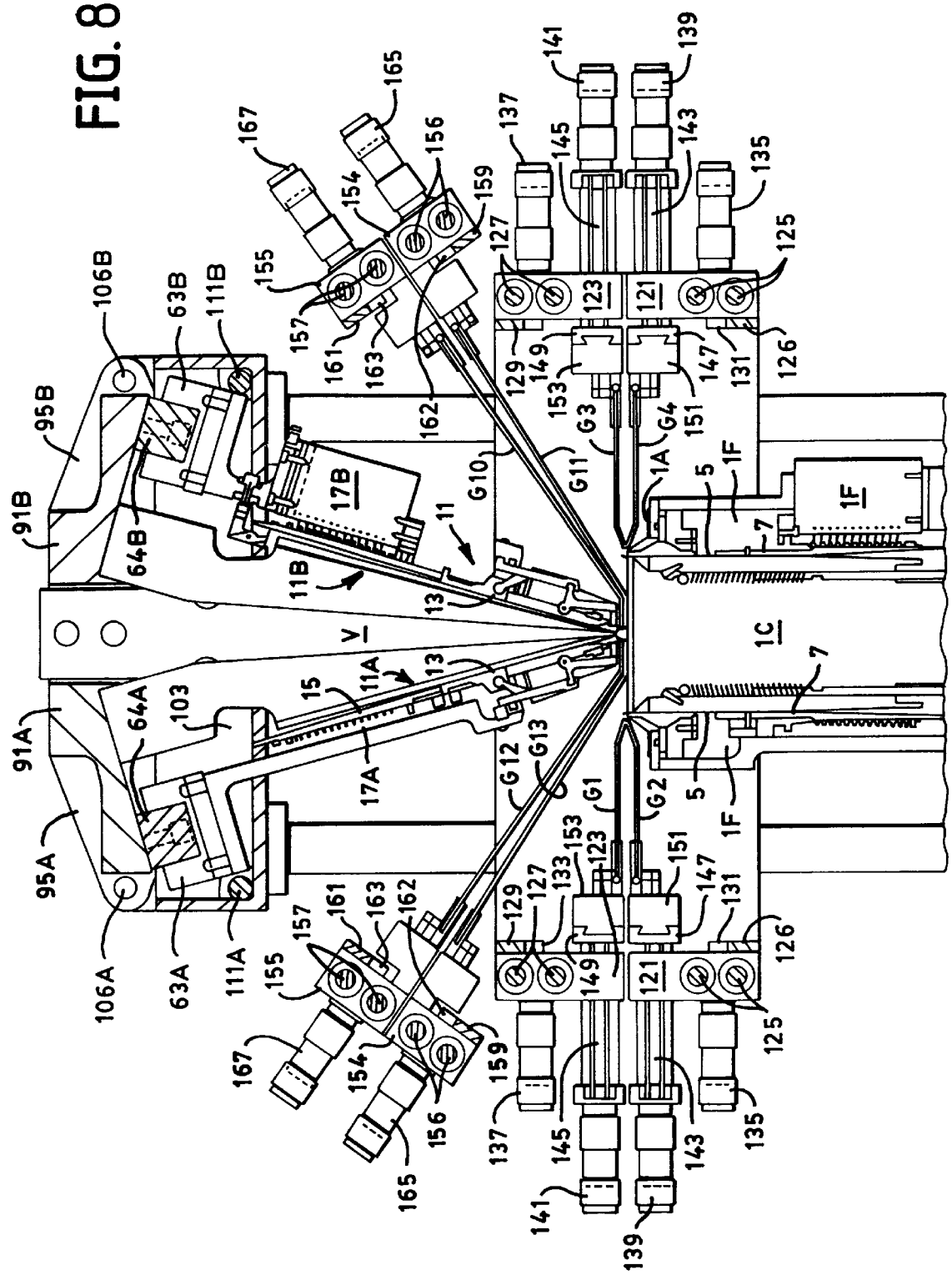
FIG. 8 is a transverse section on VIII—VIII as shown in FIG. 1, in which the machine's yarn feeders are visible in particular.

In schematic terms the machine comprises two working side units 1 and 3, each comprising a fabric forming cylinder 1C and 3C, of essentially conventional type, with tricks in which the needles marked 5, visible in FIG. 8, can slide. Still in FIG. 8, the number 7 indicates the jacks, while 1F and 3F indicate the cam boxes of the two cylinders 1C, 3C on which the cams for operating the jacks 7 and needles 5 are arranged. As will become clear from the following description, the cam box of each cylinder has four supplies i.e. four groups of needle operating cams. The supply groups are indicated schematically at A1–A8 in FIG. 11, to which reference will be made later.

Each cylinder 1C, 3C has a ring 1A, 3A for the sinkers. Each of the two working units 1 and 3 has a similar structure and performs analogous functions to those of a normal circular knitting machine for the production of socks and stockings.

Between the two side working units 1 and 3 is an intermediate unit 11 consisting of two short inclined needle beds 11A, 11B (FIG. 2) with respective tricks for housing and guiding needles 13 and jacks 15 (FIG. 8). For each bed 11A, 11B there is a carriage 17A, 17B fitted with an electronic selector and subject to reciprocating rectilinear movement along its bed and carrying the operating cams for the needles and jacks. The two rectilinear beds 11A, 11B have a narrow V geometry with the vertex at the bottom and are arranged symmetrically about the plane containing the axes of the cylinders 1C, 3C.

Figure 2:
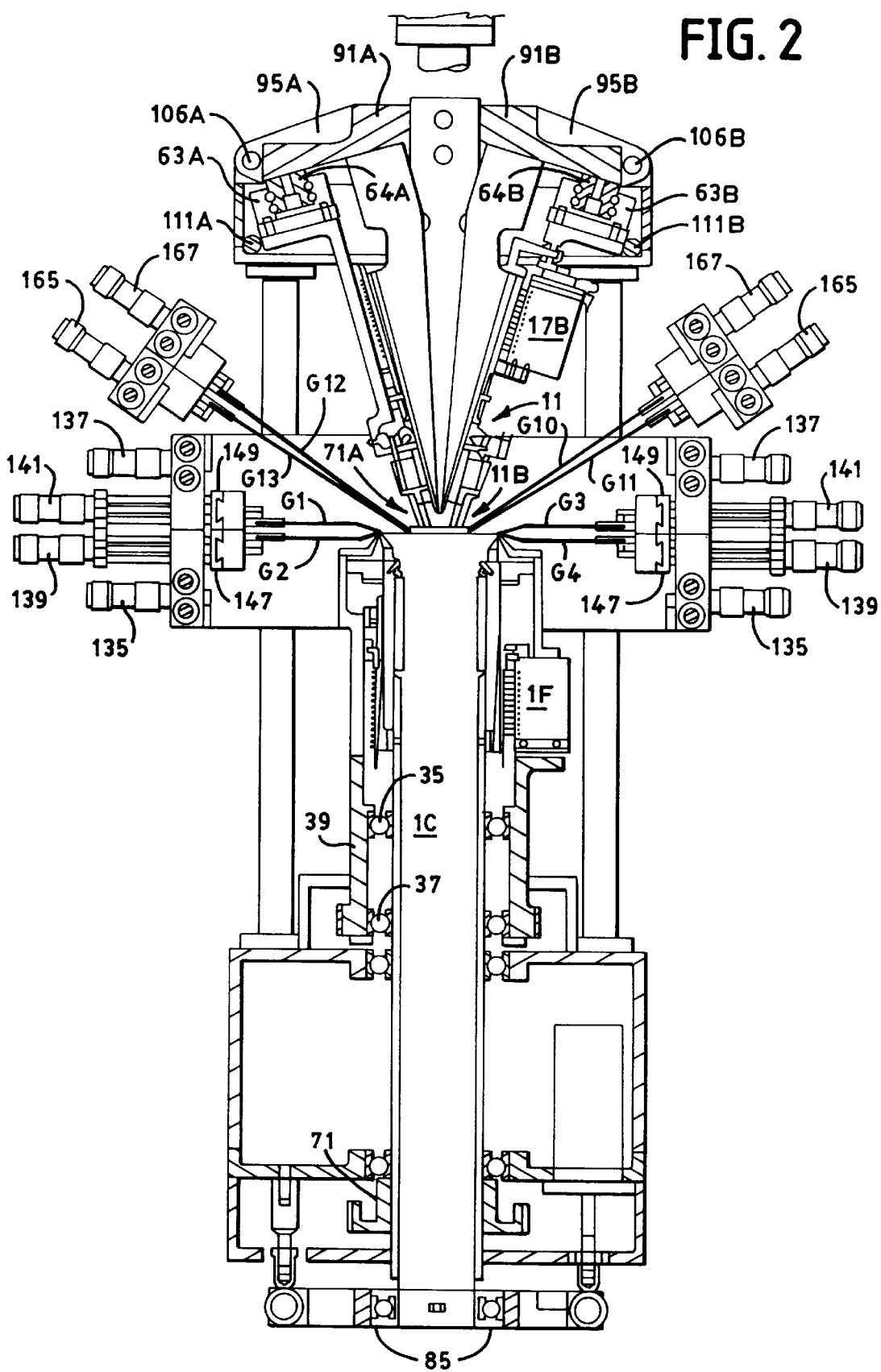
FIG. 2 shows a section on II—II as shown in FIG. 1.
Figure 3A:
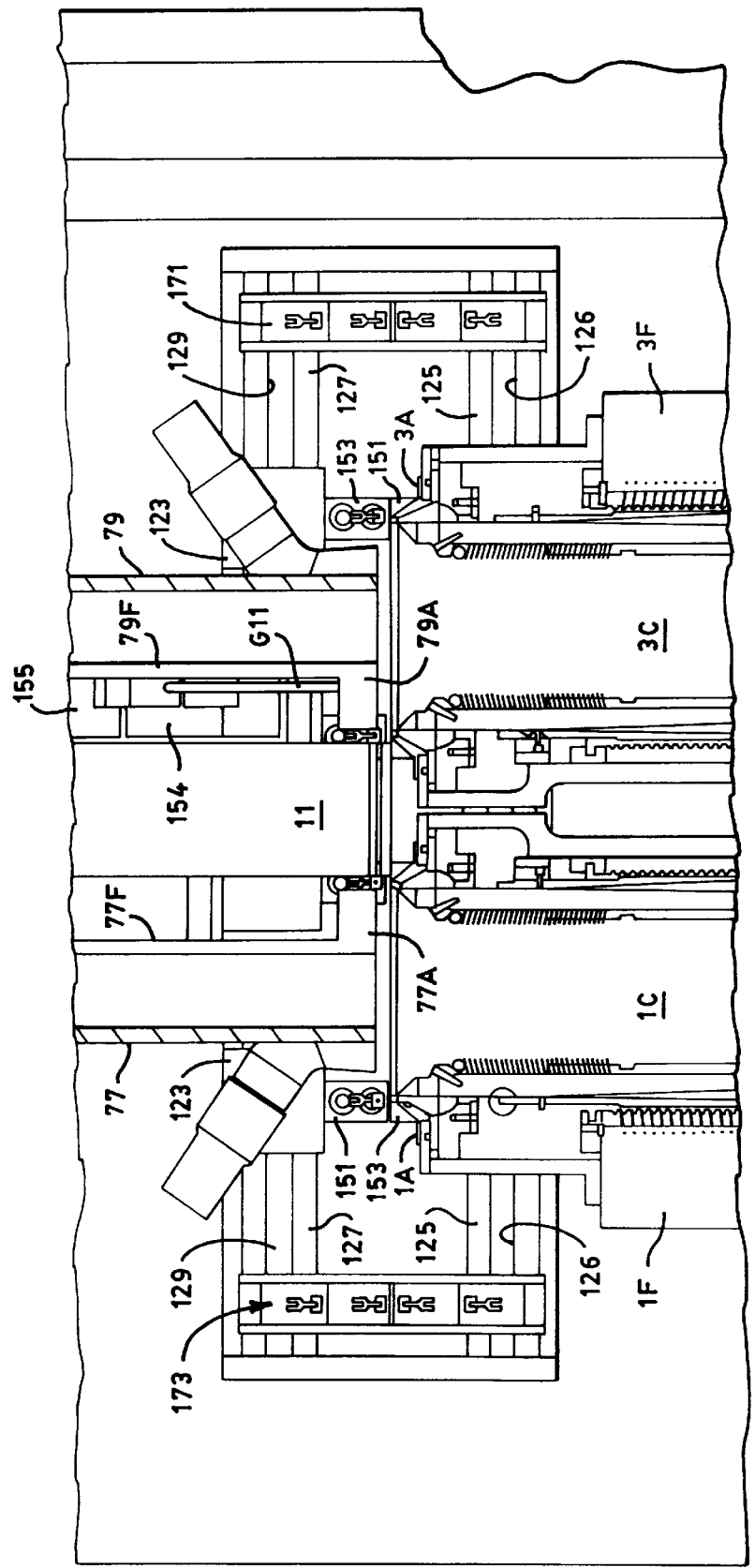
FIGS. 3A and 3B show two enlarged areas of FIG. 1, namely the fabric forming area and the area containing the control elements of the carriages belonging to the rectilinear beds.
Figure 3B:
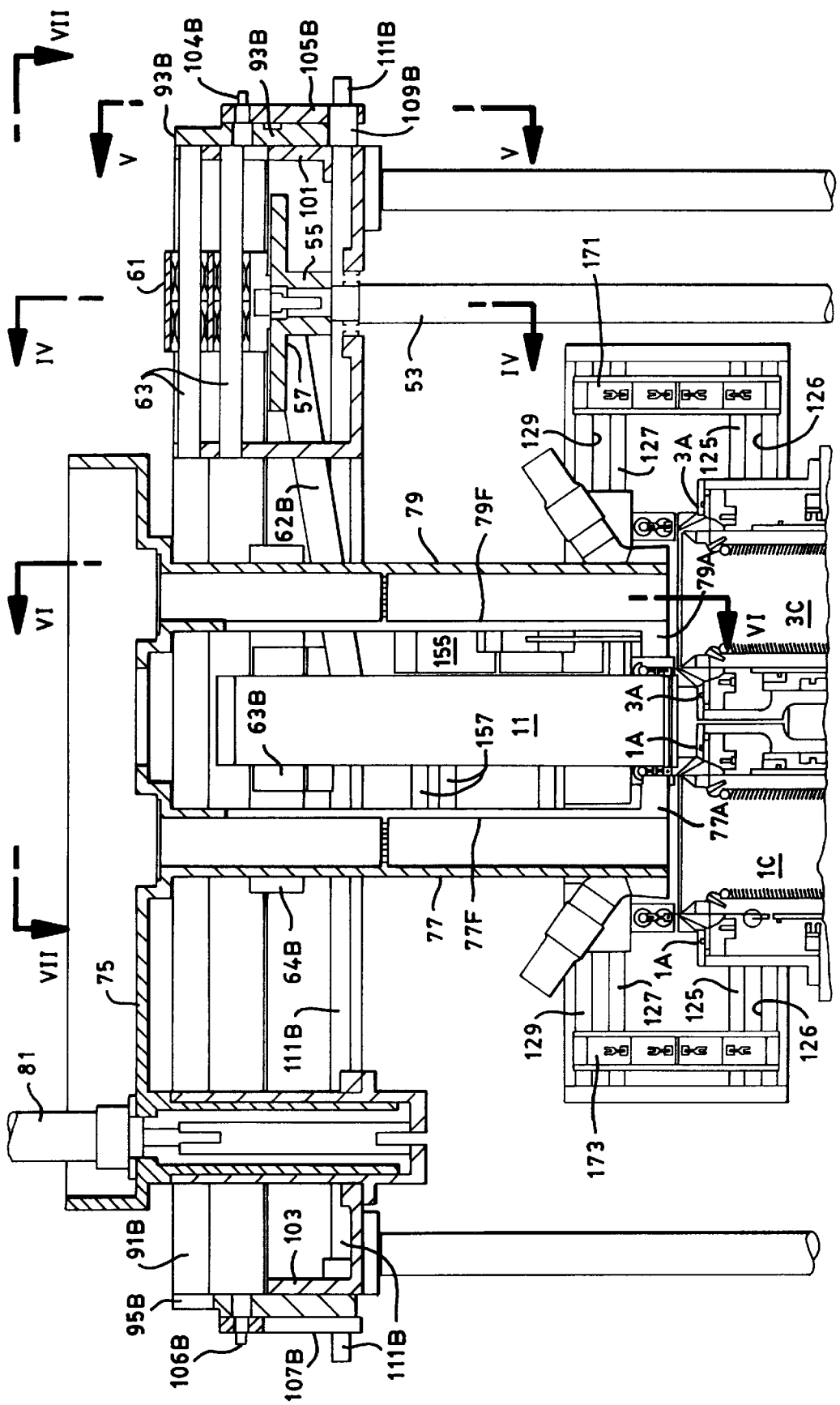

As shown in FIGS. 2 and 8, the intermediate unit 11 is actually a short upside-down rectilinear machine, where the knitted article is generated in the fabric forming area where the two beds approach each other and grows in the intermediate volume V defined between said beds, which is above the fabric forming area.

As will be described in greater detail below, the two side units 1 and 3 form the legs of the article simultaneously, and the same side units, in combination with the intermediate unit 11, form the body section.

In the embodiment illustrated, the three units 1, 3 and 11 are driven by two motorized drives 21 and 22, for the cylinders and for the rectilinear beds respectively, although it is also possible to use a central motorized drive, or a larger number of independent motorized drives.

Connected to the output shaft 23 of the motor 21 via a coupling 24 and a lined section 26 is a transmission shaft 25 which is also capable of axial movement indicated by the double arrow f25 for purposes which will be described later. This movement is provided by a fork or other control element schematically indicated at 27. Keyed to the shaft 25 are two gears 29 and 31 that serve to transmit the movement to the cam boxes 1F, 3F or the cylinders 1C, 3C depending on what stage the machine is at in its cycle.

Figure 1:
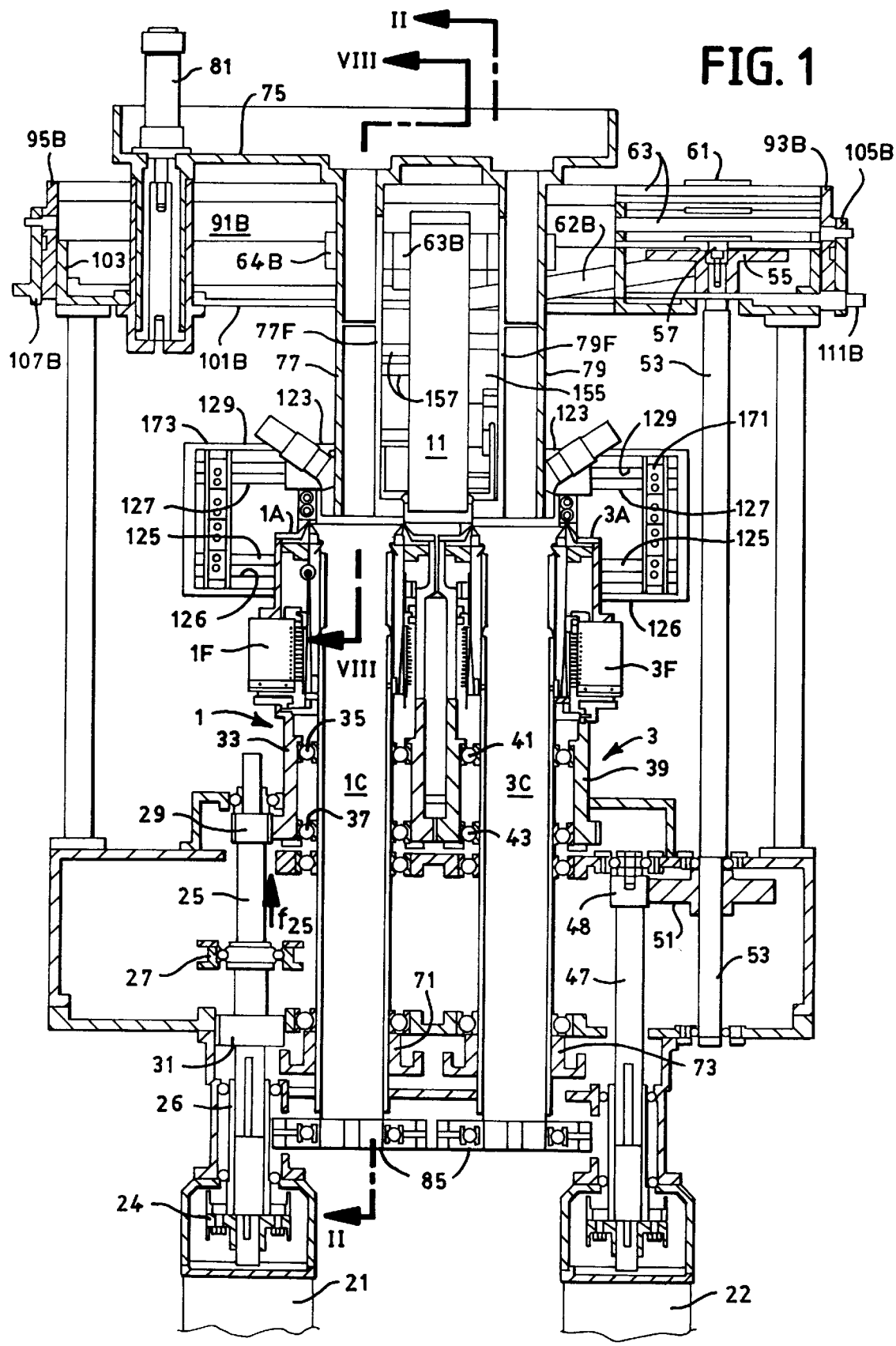
FIG. 1 shows a section of the machine on a vertical plane taken on the axes of the two cylinders.

In the position shown in FIG. 1 the gear 29 is in mesh with a ring gear 33 supported on bearings 35, 37 and fastened on its upper end to the cam box 1F and to the sinker operating cams situated on the ring 1A connected to the cylinder 1C. The ring gear 33 is in direct mesh with a second identical ring gear 39, supported on bearings 41 and 43, that controls the movement of the cam box 3F and of the sinker operating cams connected to the cylinder 3C. In this way, if the gear 29 is in mesh with the ring gear 33, the cam boxes 1F and 3F will rotate synchronously and in opposite directions.

Figure 7:
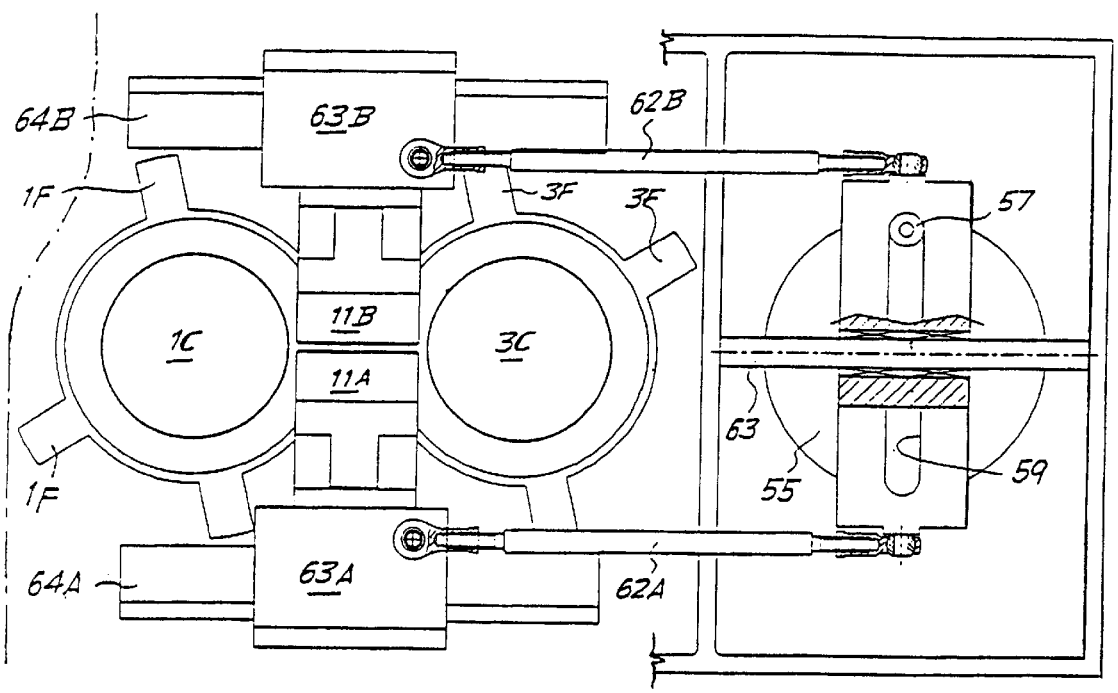
FIG. 7 is a partial plan view on VII—VII as shown in FIG. 3B.

The second motorized drive 22 drives a drive shaft 47, on which is keyed a pinion 48 that engages with a ring gear 51 keyed to a transmission shaft 53. Fixed to the top end of the latter is a disc 55 that carries an eccentric roller 57 inserted in a slot 59 (FIGS. 4 and 7) formed in a slide 61 that moves along guides 63 parallel to the plane containing the axes of the cylinders 1C, 3C.

The slide 61 is fastened by ties 62A, 62B to a pair of sliding shoes 63A, 63B travelling along guides 64A, 64B and fastened to the carriages 17A, 17B that carry the needle and jack actuating cams of the intermediate unit 11.

During the formation of the body section the gear 29 engages with the ring gear 33 and the rotation of the transmission shaft 25 produces rotational movement, in opposite directions, of the cam boxes 1F, 3F, while the two cylinders 1C, 3C are stationary and the gear 31 is disengaged. In this configuration the motor 21 rotates in alternating directions, causing the boxes 1F and 3F to oscillate for reasons which will be explained in greater detail later. At the same time the rotation of the motor 22 actuates the carriages 17A, 17B in alternating directions.

In the other possible operating configuration for leg formation, the transmission shaft 25 is displaced axially downwards from its position shown in FIG. 1, in order for the gear 29 to be disengaged from the ring gear 33, while the gear 31 is in mesh with a ring gear 71 integral with the cylinder 1C of the first side unit 1. The rotational movement of the ring gear 71 is transmitted, via an intermediate idle wheel (not shown), to a ring gear 73 identical to the ring gear 71 and keyed to the cylinder 3C. In this configuration, therefore, the rotation of the transmission shaft 25 is transmitted to both cylinders 1C, 3C which will rotate in the same direction, while cam boxes 1F, 3F are stationary. The motorized drive 22 is disengaged, so that the carriages 17A, 17B are stationary.

Towards the top of the machine lies a structure 75 carrying two tubes 77, 79 coaxial with the cylinders 1C, 3C and each possessing a longitudinal slot 77F, 79F on the side facing the intermediate unit 11 with feet 77A, 79A. The two tubes are used, as will be explained below, to keep the article in the correct position as it is being formed through the various phases of the machine's operation. The two tubes 77, 79 can be moved vertically as shown by the double arrow f77, by means of an actuator 81.

Means 85 of a type known per se are provided beneath the cylinders 1C, 3C for adjustments in the vertical direction to the position of the cylinders 1C, 3C for adjusting the length of the garment being formed. The methods and purposes of adjustment are known to those skilled in the art and will not be described.

Figure 4:
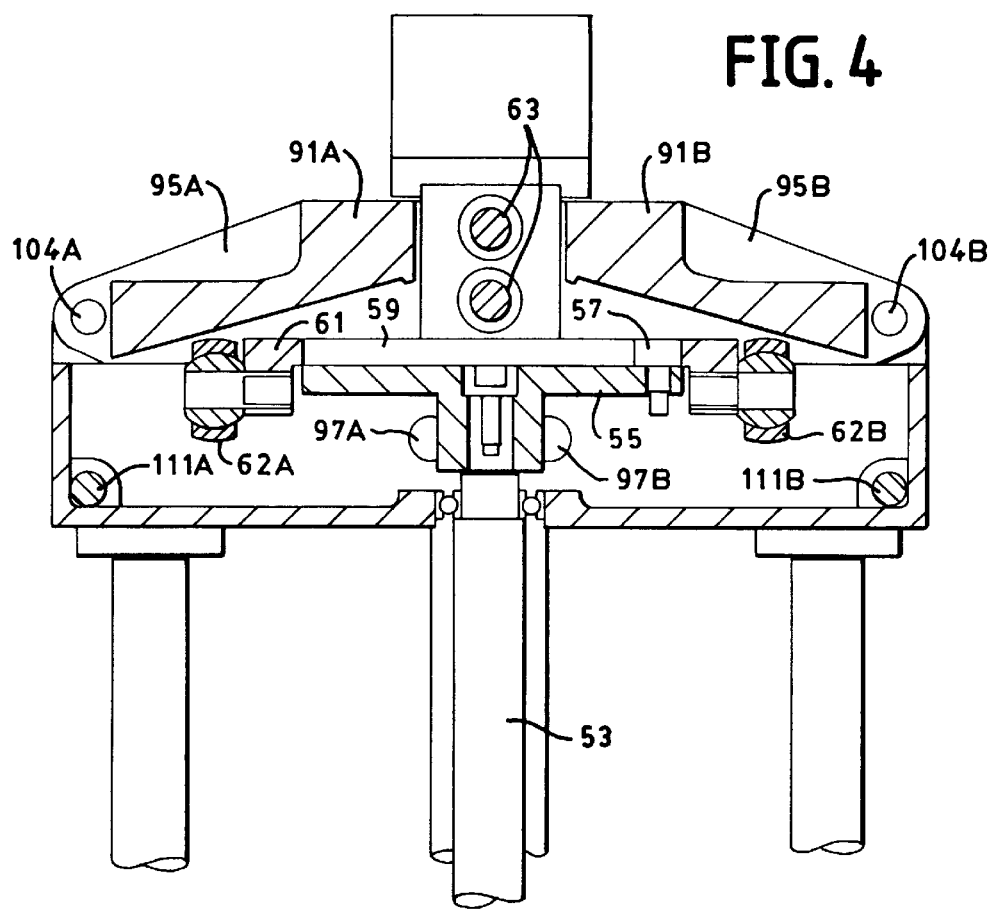
FIGS. 4, 5 and 6 are local transverse sections on IV—IV, V—V and VI—VI as shown in FIG. 3B.
Figure 5:
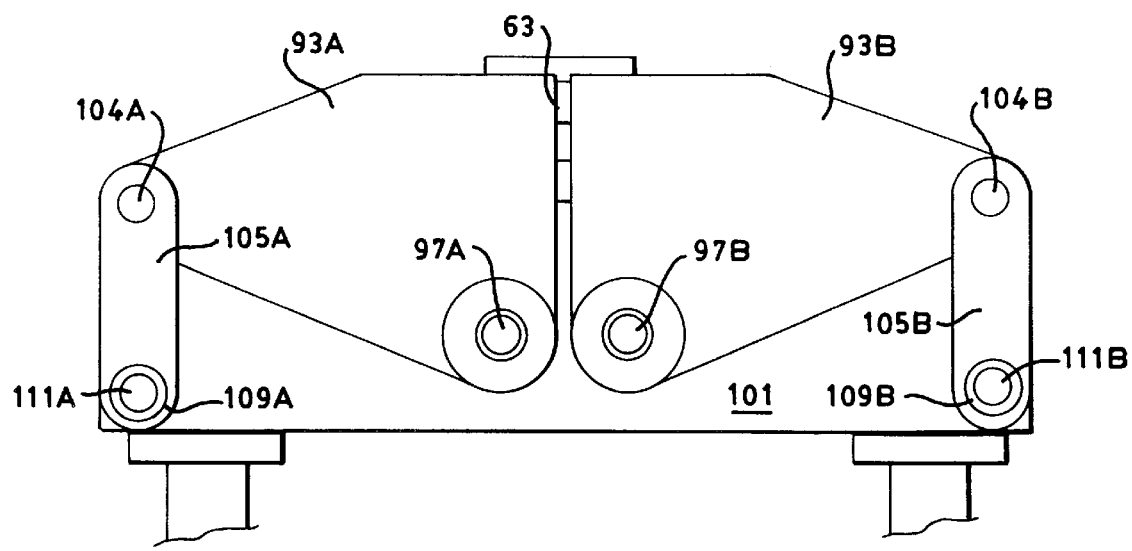
Figure 6:
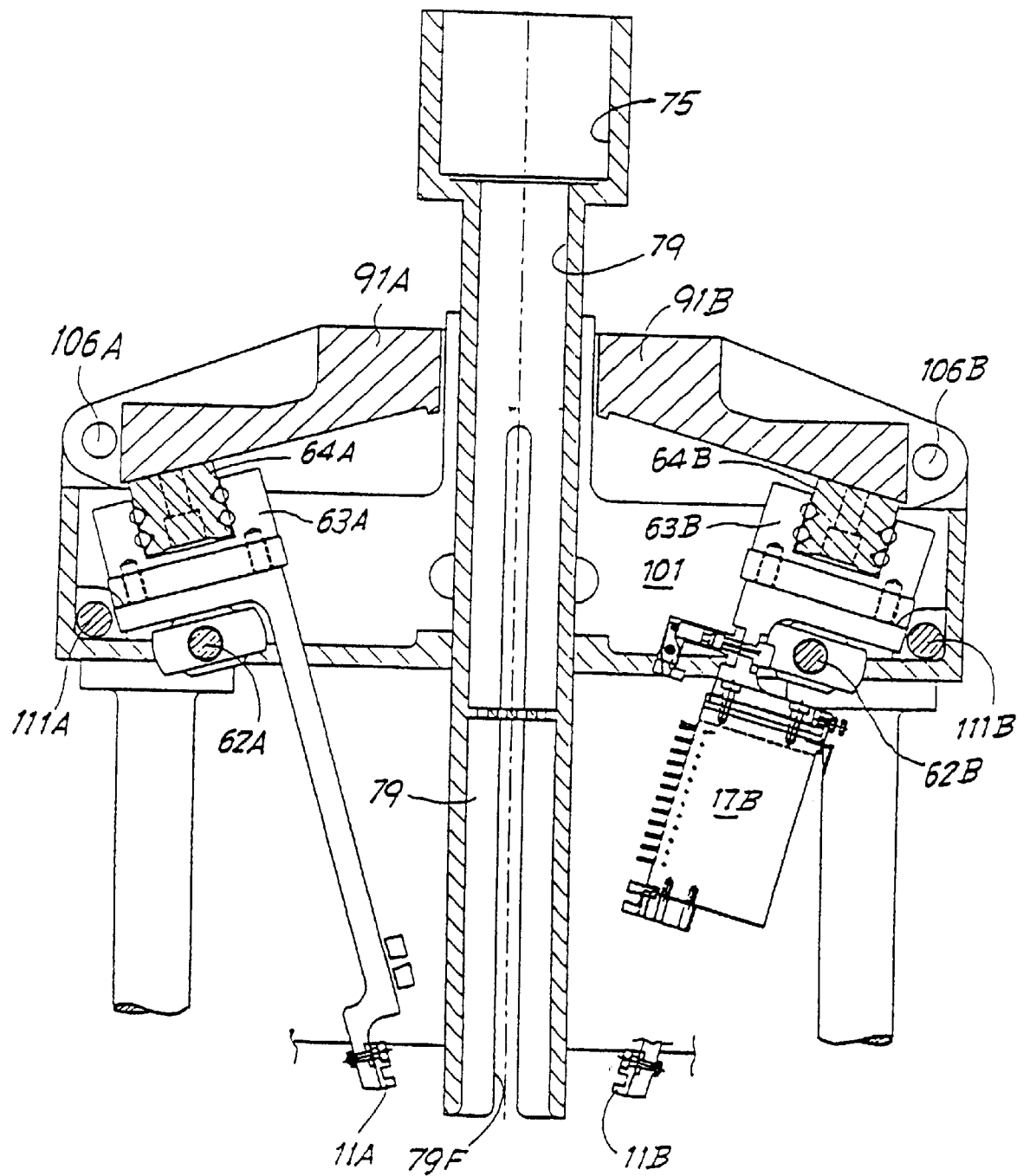

The two rectilinear beds 11A, 11B are mounted so as to be able to oscillate slightly to modify the angle formed between them so that thicker portions of the article can pass between them. For this purpose, as can be seen in FIGS. 4, 5 and 6 in particular, each bed 11A, 11B is integral with a respective cross member 91A, 91B, with which the corresponding guide 64A, 64B is also integral. Both cross members 91A, 91B are supported at each end by pairs of plates 93A, 95A and 93B, 95B hinged at 97A, 97B, 99A and 99B on the outside of two side walls 101 and 103. Also hinged to each plate 93A, 93B, 95A, 95B at 104A, 104B and 106A, 106B is a link 105A, 105B, 107A, 107B. Each of said links is in turn mounted on an eccentric (109A, 109B for links 105A, 105B) and the eccentric is fixed to a shaft 111A, 111B that runs parallel to the beds 11A, 11B. An oscillation (produced by an actuator, not shown) of the two shafts 111A, 111B in opposite directions about their respective axes produces a corresponding oscillation of the beds 11A, 11B about the hinges 97A, 99A, 97B, 99B.

As will be described in greater detail below, the machine described thus far works with a variable number of yarn feeders depending on the method used for forming the body section. All the yarn feeders with which the machine may be equipped will be described below, it being understood that some of them may be omitted or deactivated according to the operating modes adopted. In the example of an embodiment illustrated the machine has four supplies for each cylinder 1C, 3C and consequently has four yarn feeders per cylinder. Four yarn feeders are also provided for the rectilinear beds 11A, 11B. These latter feeders may be omitted when adopting the method of forming the body section with the same yarns as form the legs of the article. Each of the twelve yarn feeders is movable and independent of the supplies.

To begin with, the eight yarn feeders that serve the two cylinders 1C and 3C will be described. These will be denoted G1, G2, G3, G4 for cylinder 1C and G5, G6, G7 and G8 for cylinder 3C. In FIG. 10 the yarn feeders are shown in the rest or limit positions, superimposed in twos. In FIG. 8 they are shown in a retracted position assumed during the movement of the yarn feeder around the circular bed, as will be made clearer later.

G10, G11, G12 and G13 are the yarn feeders for the rectilinear beds 11A, 11B. More specifically, yarn feeders G10, G11 are associated with bed 11B, whereas yarn feeders G12, G13 are associated with bed 11A. In FIG. 10 these last four yarn feeders are in the rest or limit position at the ends of their respective beds.

Each of the yarn feeders G1–G8 is carried by its own carrier. The lower yarn feeders G2, G4, G6, G8 are carried by carriers 121, while the upper yarn feeders G1, G3, G5 and G7 are carried by carriers 123. The carriers 121 run along guides consisting of respective pairs of cylindrical bars 125, with a rack 126 mounted parallel to these. The carriers 123 run along guides consisting of similar cylindrical bars 127, with racks 129 mounted parallel to these. The movement of the individual carriers 121, 123, and hence of the yarn feeders, along their respective guides is provided by actuators, mounted on each carrier, that operate respective pinions which engage with the racks 126 and 129. The pinions connected to carriers 121 are marked 131 and those connected to carriers 123 are marked 133, while the actuators are marked 135 and 137 respectively. These therefore produce the movement of the yarn feeders parallel to the plane containing the axes of the cylinders 1C, 3C and perpendicularly to these axes.

Each carrier 121, 123 is also provided with a second actuator, marked 139, 141 respectively, that controls the movement of the associated yarn feeder in a direction at right angles to the direction of the movement produced by the actuators 135, 137, and perpendicular to the axes of the cylinders 1C, 3C. The movement is produced by turning a respective threaded rod 143, 145 engaged in a nut supported in the respective carrier 121, 123. The free end of this rod is connected to a dovetail-type guide 147, 149 on which is mounted the support 151, 153 of the associated yarn feeder. The combination of the movements imparted by the actuators 135, 137 and 139, 141 enables each yarn feeder to follow its respective circular bed of the cylinders 1C, 3C around a half circumference.

Yarn feeders G10–G13 are mounted in a similar manner, but perform reciprocating movements along a rectilinear path parallel to their respective beds 11A, 11B. They are carried by carriers 154, 155 that travel along guides 156, 157. Their translation movement along the guides is produced by a system of racks 159, 161 and pinions 162, 163 that mesh together. 165 and 167 are the actuators that turn the pinions 162, 163.

The machine is provided with four magazines of yarn feeders positioned laterally to the working area and indicated schematically at 171, 172, 173 and 174, which enable replacement of working yarn feeders by an automatic system analogous to those used for the automatic replacement of tools in a machine tool. The dovetail connection 147, 149 permits easier replacement.

Methods of fabric formation

The structural elements of the machine having thus been described, an account will now be given of two operating methods, although it should be understood that other fabric-forming procedures can be carried out on the same machine following the principles on which the present invention is based.

During the first stage of the working cycle the two legs of the article are produced by conventional methods in which the cylinders 1C, 3C revolve continuously. The two legs may begin with a closed toe by adopting one of the systems described in the publications cited in the introductory part and forming an integral part of the present description. Next, in the second stage of the process, the circular beds of needles on cylinders 1C, 3C work in combination with the rectilinear beds 11A, 11B to produce the body section of the article. During this stage the production process may follow a variety of different methods.

Figure 11A:
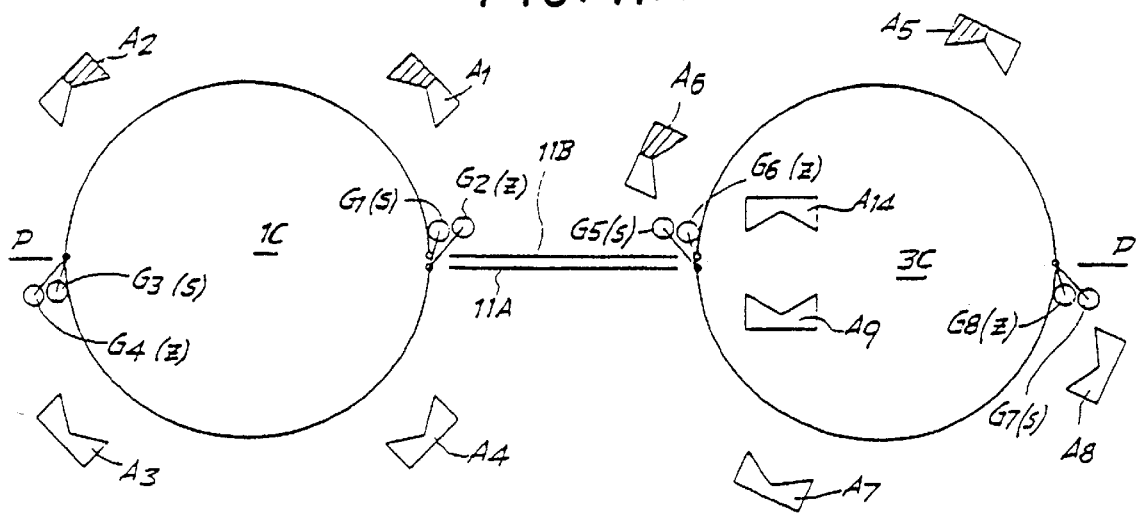
FIGS. 11A–11T show successive stages worked by the machine in one possible operating method, in which the body section is formed using the same yarns as for the legs.

FIGS. 11A–11T show schematically the movements of the fabric forming elements when following a first working method.

FIG. 11A shows a limit position which for convenience will be taken to be the initial instant in the description of the movements of the individual elements. The rectilinear beds 11A, 11B are assumed to have already effected the closure of the so-called crotch, that is the lower part of the body section between the two legs, by crossing their needles, in a manner which is basically known per se from the prior art referred to in the introductory part.

FIG. 11A shows the yarn feeders G1, G2, G3, G4 that work on cylinder 1C and the yarn feeders G5, G6, G7 and G8 that work on cylinder 3C. Not shown are yarn feeders G10–G13, which in this case are not used because the central portions of the body section are made using the yarns dispensed by yarn feeders G1, G3, G6, G8, as will be explained below. A1, A2, A3 and A4 schematically indicate the four supplies of cam box 1F, i.e. the four groups of cams that control the raising and lowering of the needles of cylinder 1C. A5, A6, A7, A8 likewise indicate the supplies of cam box 3F associated with cylinder 3C. A9 and A14 schematically indicate the supplies carried by carriages 17A, 17B for the beds 11A and 11B respectively.

Still referring to FIG. 11A, at the instant shown here the supplies A1–A9, A14 are in the initial position of their path, which, as will be clear on referring to the subsequent figures, is a reciprocating path. Yarn feeders G1–G8, shown diagrammatically as small circles, are likewise at the starting positions of their respective paths, close to their respective beds on the mid-plane indicated at P—P containing the axes of the cylinders 1C and 3C.

As is known, when tubular articles are being knitted, left hand- and right hand-twisted yarns are used alternately to form the different courses. These yarns are usually termed S-twisted and Z-twisted yarns. For clarity, FIG. 11A shows in brackets for each yarn feeder G1–G8 the type of twist of the yarn supplied by that particular yarn feeder. It is also known in the industry that yarns of differing technical or structural characteristics, e.g. one of "Lycra" and one of "Nylon" and so on, can be used instead of oppositely twisted yarns. In the context of the present description and of the claims, the expression "pairs of yarns of differing characteristics" should be understood to mean any possible alternative to the alternation of S and Z twists.

Figure 11B:
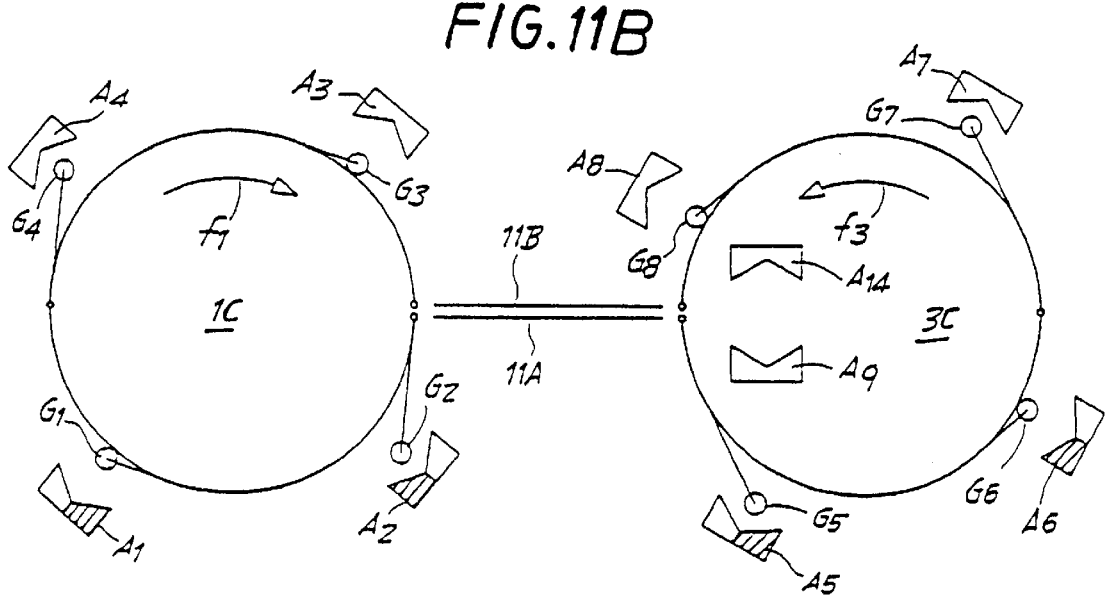

FIG. 11B shows the start of the movement of the supplies A1–A8, and hence of the cam boxes 1F, 3F on which they are carried. At this stage rotation is clockwise in the case of cam box 1F carrying supplies A1–A4 (arrow f1) and anticlockwise in the case of cam box 3F carrying supplies A5–A8 (arrow f3). During this stage supplies A9 and A14 are still stationary, whereas the other supplies A1–A8 have begun to move. They initially describe a nonworking path from the position shown in FIG. 11A and ending beyond the plane marked P—P containing the axes of the cylinders 1C, 3C. In this position they begin working on the needles of the corresponding circular half-beds, their movement being followed by the yarn feeders. In FIG. 11B supply A1 has described approximately two thirds of its active path around the lower (as depicted in the figure) circular half-bed while the needles it has raised and lowered are resupplied with yarn by yarn feeder G1, which has moved from the position on the mid-plane P—P together with supply A1. The movement of the tip of the yarn feeder follows the circular line of the bed as a result of the dual movement (parallel and perpendicular to plane P—P) imparted to each yarn feeder G1–G8, as described earlier. Supply A2 has described approximately one third of its own active path followed by yarn feeder G2. Passing around the upper circular half-bed of cylinder 1C are supplies A3 and A4 together with yarn feeders G3 and G4 respectively. The situation on cylinder 3C is a mirror image of this, with supplies A5 and A6 working on the lower circular half-bed with yarn feeders G5 and G6, while supplies A7 and A8 with yarn feeders G7 and G8 move around the upper circular half-bed. The movement continues until the configuration of FIG. 11D is reached: here, supplies A3 and A8 have completed the active section of their paths and are beginning to move around the lower half-beds, without forming stitches as their yarn feeders G3 and G8 have stopped roughly on the mid-plane P—P. Supplies A1 and A6 have similarly finished their active path and are beginning to move around the upper half-beds without forming stitches, as yarn feeders G1 and G6 have stopped roughly on plane P—P. Supplies A2 and A4 on cylinder 1C and supplies A5 and A7 on cylinder 3C are still in an intermediate position along their active path around the respective half-beds.

At this point the carriages 17A, 17B with their respective supplies A9 and A14 perform a movement from right to left (FIG. 11E). Along this path supply A9 is inactive, while supply A14 forms a row of stitches along the rectilinear bed 11B with the yarn supplied by yarn feeder G8 which moves along the rectilinear bed from its position in FIG. 11D to its position in FIG. 11E.

In the subsequent passage from the configuration of FIG. 11E to that of FIG. 11F, a reverse movement by the carriages 17A, 17B causes supplies A9 and A14 to return to their initial positions. In this movement, while supply A9 is still inactive, supply A14 forms a second row of stitches along bed 11B with the yarn dispensed by yarn feeder G3. The yarns of yarn feeders G3 and G8 have opposite twists (S for G3 and Z for G8), so that two successive rows of stitches on bed 11B are formed with yarns of alternate twists. With the two movements described in FIGS. 11D–11F the yarns of yarn feeders G3 and G8 have passed from the circular beds of cylinders 1C and 3C, respectively, to the rectilinear bed 11B. This can easily be arranged by ensuring that the end of the respective yarn feeder is moved between the circular bed and the rectilinear bed slightly past the plane of the needles of the rectilinear bed 11B.

From the position shown in FIG. 11F, supplies A9 and A14 perform a nonworking stroke from right to left (FIG. 11G) followed by a further stroke from left to right (finishing in the final position shown in FIG. 11H) during which the supply A14 forms a row of stitches along bed 11B with the yarn dispensed by yarn feeder G8, while supply A9 performs a nonworking stroke again. On a subsequent right-to-left stroke (moving from FIG. 11H to FIG. 11I), yarn feeder G3 follows supply A14 from cylinder 3C to cylinder 1C, to form a row of stitches along bed 11B, while supply A9 remains inactive.

In the succession of steps leading from FIG. 11D to FIG. 11I, therefore, four courses of stitches have been formed on rectilinear bed 11B, using the yarn dispensed by yarn feeders G3 and G8, whereas no stitches have been formed on bed 11A.

The passage from FIG. 11I to FIG. 11J completes the active path of supplies A2, A4 around cylinder 1C and A5, A7 around cylinder 3C, the yarn feeders each reaching the diametrically opposite position to the initial position shown in FIG. 11A.

At this point there is a reversal of the motion of the cam boxes 1F, 3F and hence of their supplies A1–A8: supplies A1–A4 begin rotating anticlockwise and supplies A5–A8 clockwise about their respective cylinders. In FIG. 11K, supply A2 has begun forming stitches on the lower half-bed of cylinder 1C using yarn dispensed by yarn feeder G1, while supply A4 has begun forming stitches on the upper half-bed. Supplies A1 and A3 are about to reach the plane P—P from where their active path will commence. The situation on cylinder 3C is a mirror image of this, with supply A5 having begun forming stitches with the yarn dispensed by yarn feeder G6 on the lower half-bed, and supply A7 beginning to form its own course of stitches on the upper half-bed using yarn dispensed by yarn feeder G8. Supplies A6, A8 are completing their nonworking stroke in order to begin forming stitches from the moment they pass plane P—P.

In FIG. 11L all eight supplies A1–A8 are working on their respective beds. It can easily be verified that the yarns are dispensed in such a way that on each half-bed the courses are formed with Z and S yarns alternately.

In FIG. 11M, on cylinder 1C, supplies A4 and A2 have passed beyond the end of their actual active stroke and their respective yarn feeders G3 and G1 are stationary approximately on the mid-plane, while on cylinder 3C, supplies A7 and A5 are about to finish their active stroke, at the end of which yarn feeders G8 and G6 will be left on the mid-plane, as can be seen in the next FIG. 11N.

In passing from FIG. 11M to FIG. 11N there is also the left-to-right movement of supplies A9 and A14. This time supply A14 performs a nonworking stroke, while supply A9 forms a row of stitches along rectilinear bed 11A using the yarn dispensed by yarn feeder G1 which moves from the circular bed of cylinder 1C to the rectilinear bed 11A and follows the movement of the supply A9 to reach the position shown in FIG. 11N.

After this, to get to the configuration of FIG. 11P, supplies A9 and A14 describe a right-to-left stroke: supply A14 describes a nonworking stroke, while supply A9 forms a course of stitches along bed 11A using the yarn dispensed by yarn feeder G6, which consequently moves from right to left. After this (moving to the configuration of FIG. 11Q), supplies A9 and A14 both execute a nonworking stroke from right to left and then (passing from FIG. 11Q to FIG. 11R) a stroke from left to right, in which supply A9 uses the yarn from yarn feeder G1 to form a third course of stitches along bed 11A, while supply A14 performs a nonworking stroke. Yarn feeder G1 has thus been returned to the initial position shown in FIG. 11M. On subsequently moving to the configuration shown in FIG. 11S, supplies A9, A14 return from left to right, supply A14 with a nonworking stroke and supply A9 forming a fourth course of stitches using the yarn dispensed by yarn feeder G6 which is thus returned to the initial position as shown in FIG. 11N.

The subsequent recommencement of the rotation of supplies A1–A8 (FIG. 11T) brings the fabric forming elements (supplies A1–A8 and yarn feeders G1–G8) back to the original position of FIG. 11A to start a new cycle. The operation repeats itself cyclically until the body section is finished, including the optional creation of an elastic waistband by techniques known per se.

Figure 13:
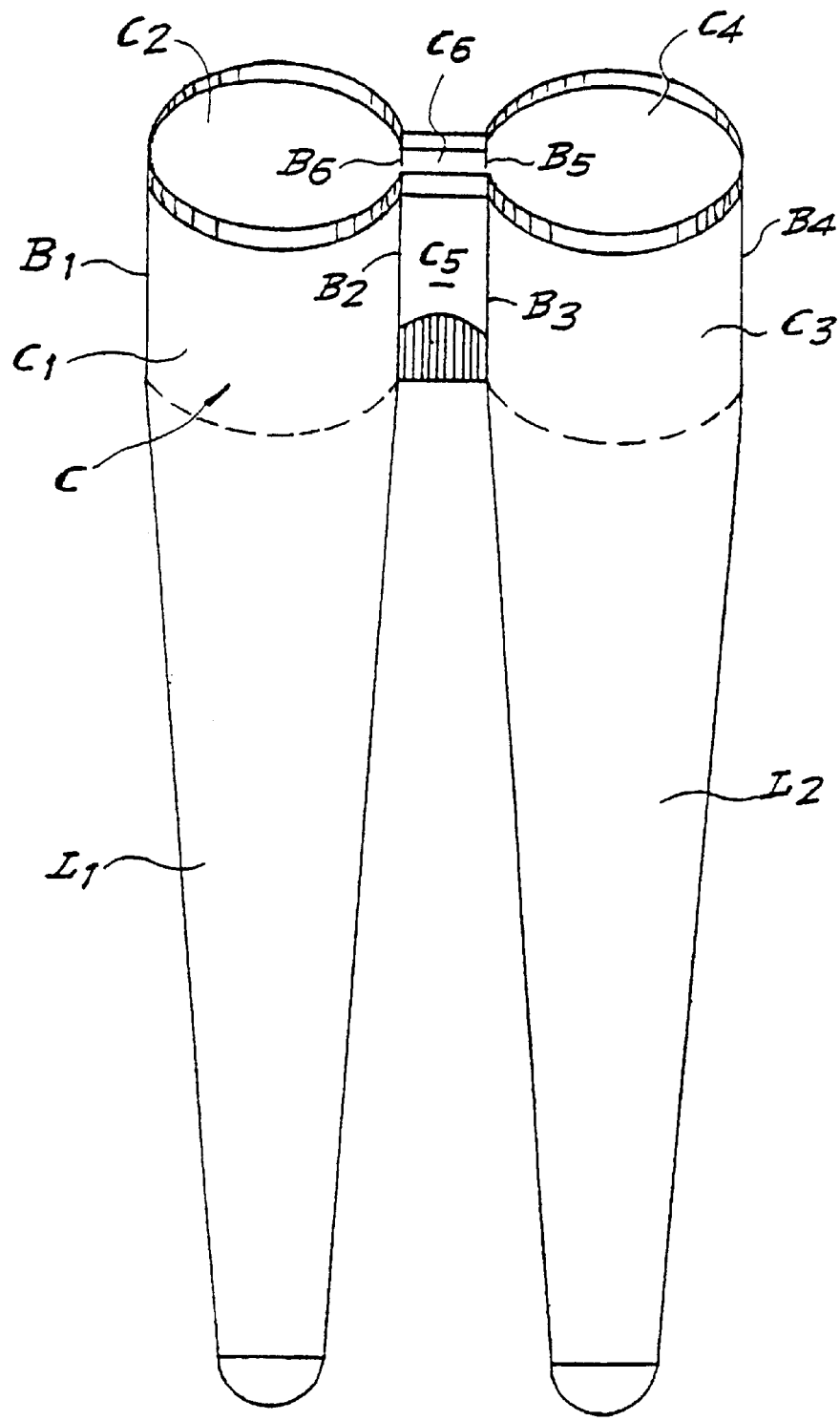
FIG. 13 shows diagrammatically a pair of tights produced in accordance with the invention.

FIG. 13 shows diagrammatically the article produced by this fabric forming operation. L1 and L2 are the two legs and C is the body section. The latter is basically produced in six zones or portions, formed respectively by the four half-beds of the cylinders 1C, 3C (i.e. each by the needles of half a cylinder) and by the two rectilinear beds. C1 and C2 are the portions produced on the two half-beds of cylinder 1C; C3 and C4 the two portions produced by the two half-beds of cylinder 3C; and C5 and C6 the portions formed by the rectilinear beds 11A and 11B, respectively. B1–B6 indicate the lines of division between the six portions indicated above. It should be noted that along the lines B1 and B4 the connection between the respective portions C1, C2 and C3, C4 is produced simply by feeding each yarn not only to that particular half-bed but also to the first few needles of the adjacent half-bed. Thus for example the yarn dispensed by yarn feeder G1 is also fed to the first few needles at the extreme left of the upper half-bed of cylinder 1C (cp. FIGS. 11C, 11D).

Passing the yarn from the circular bed to the rectilinear bed raises no particular problems. Passing it back again, however, requires providing the respective yarn feeder with an additional guide element which performs the function illustrated in FIGS. 14A–14F, showing the way in which a generic yarn feeder G passes with its generic yarn F from the rectilinear bed 11B to the semicircular bed 1C, the beds being depicted by their respective needles. In FIG. 14A the yarn feeder dispenses its yarn to the needles of the rectilinear bed. In FIG. 14B the yarn feeder is between rectilinear bed 11A and the circular bed of cylinder 1C and is moved between the two beds (FIG. 14C). At this point a guide element G' belonging to the generic yarn feeder G remains temporarily in the position reached in FIG. 14C, while the yarn feeder G moves back (FIG. 14D); both elements G and G' move up to the circular bed 1C and the yarn feeder G then continues its passage around this circular bed 1C (FIG. 14F), thus enabling the needles of the circular bed to capture the yarn F dispensed via the guide element G', which subsequently follows the yarn feeder G and returns to its side.

Figure 12:
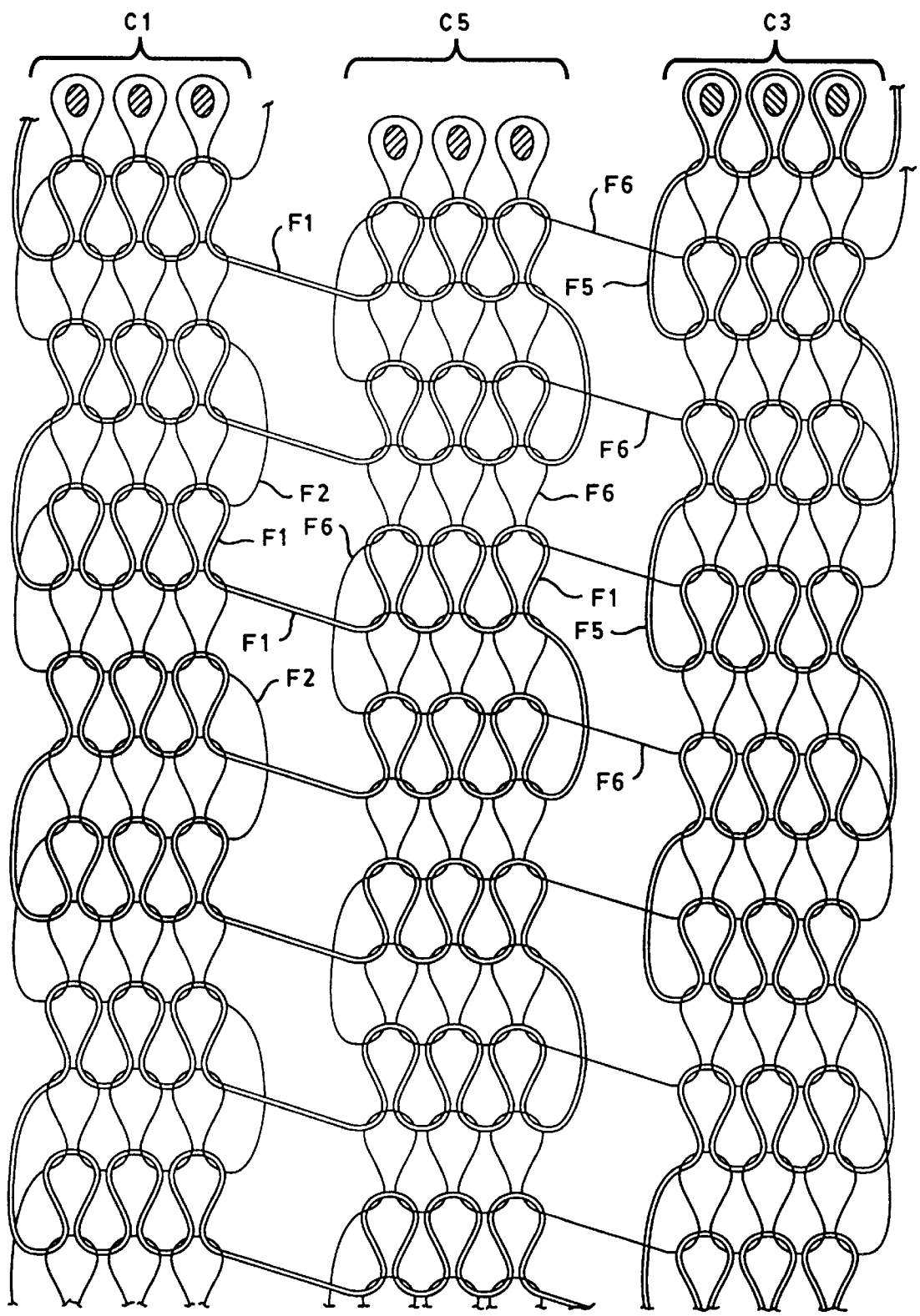
FIG. 12 shows diagrammatically and greatly enlarged a knitting area for the body section formed by the working method illustrated in FIGS. 11A–11T.

FIG. 12 shows a portion of knitted fabric obtained with the method described above. C1, C3 and C5 again denote portions of body section produced on the circular half-beds of the cylinders 1C and 3C and on the rectilinear bed 11A. All that is shown is a zone reduced to courses of three stitches, but it should be understood that the fabric formed extends for a much greater number of stitches. The courses schematically illustrated in FIG. 12 serve to show the paths of the individual yarns that go to make up the various zones. The yarns are denoted by the letter F followed by the number corresponding to the yarn feeder from which they were dispensed (e.g. yarn F1 was dispensed by yarn feeder G1 and so on). For the sake of clarity, Z-twist yarns are shown in black and S-twist yarns in white. As is clear from this figure, while portions C1–C4 are formed by face fabric, portions C5 and C6 are formed by reverse fabric. This constitutes a peculiar feature of the article produced by the machine of the present invention, in which the central portions C5 and C6 of the body section are produced by rectilinear beds that operate in reverse configuration relative to the circular beds that form the lateral portions of the body section.

Figure 15:
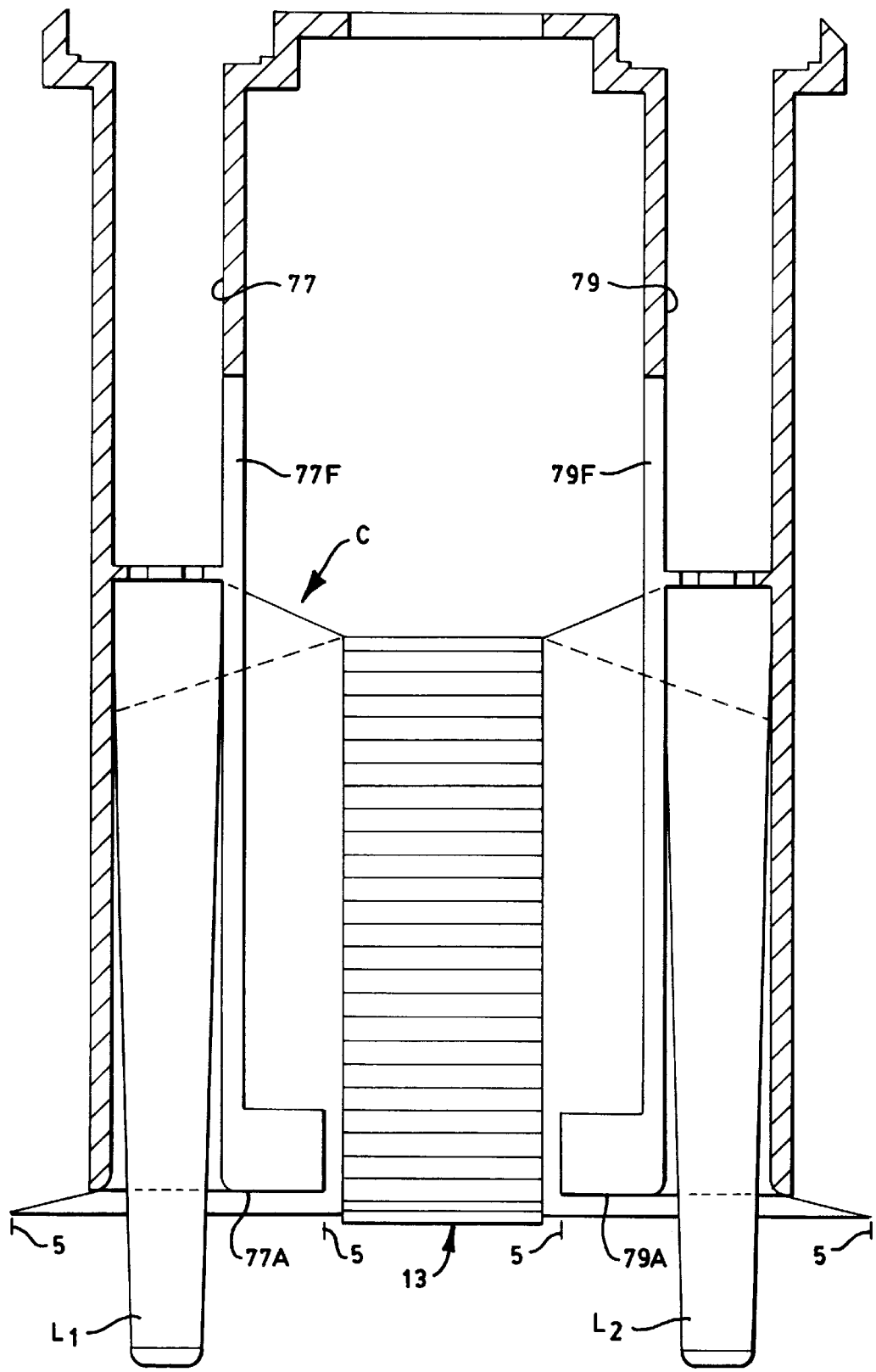
FIG. 15 shows diagrammatically the configuration of the article in the machine at the completion of its knitting.

During the formation of the body section C the article inside the machine adopts the position shown diagrammatically in FIG. 15. The legs L1 and L2 formed in the previous stage with the needles 5 of the cylinders 1C and 3C are sucked up inside tubes 77 and 79 in which a vacuum is set up. The lower ends of the two tubes are in the vicinity of the plane on which the fabric is formed on cylinders 1C, 3C. A pair of feet or projections 77A and 79A extend from the two tubes 77 and 79 towards the rectilinear beds in order to hold the developing fabric in the correct position. The intermediate portions C5 and C6 of the body section that are formed by the rectilinear beds 11A and 11B are sucked up into the central zone between the two tubes 77 and 79. The slots 77F and 79F along the two tubes 77 and 79 enable the fabric of the developing body section to move upwards so as to be correctly formed by the needles 5 of cylinders 1C and 3C and by the needles 13 of beds 11A, 11B. Whereas the legs L1, L2 grew from the plane of the needles 5 downwards, the central portions C5 and C6 of the body section grow from the beds 11A, 11B upwards and are therefore in reverse fabric.

Figure 16A:
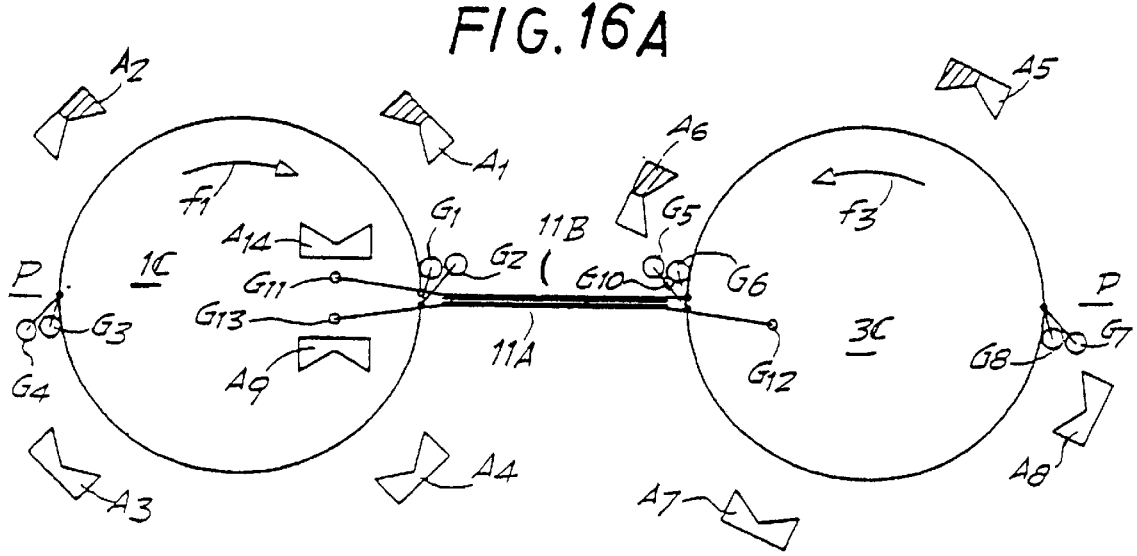
FIGS. 16A–16P show successive stages worked by the machine in another possible operating method, in which the body section is generated using additional yarns or yarns differing from those of the legs.
Figure 16B:
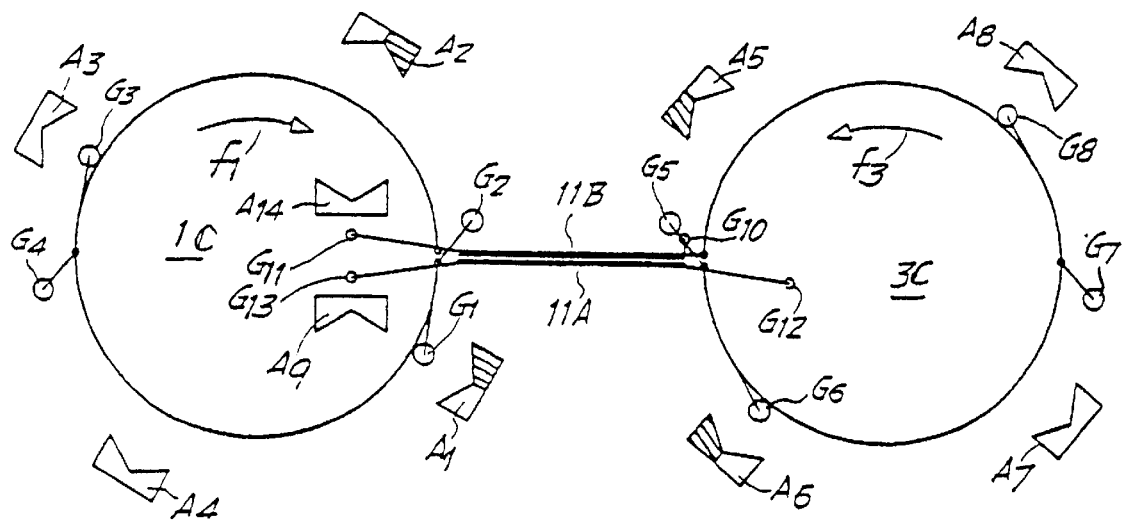
Figure 16P:
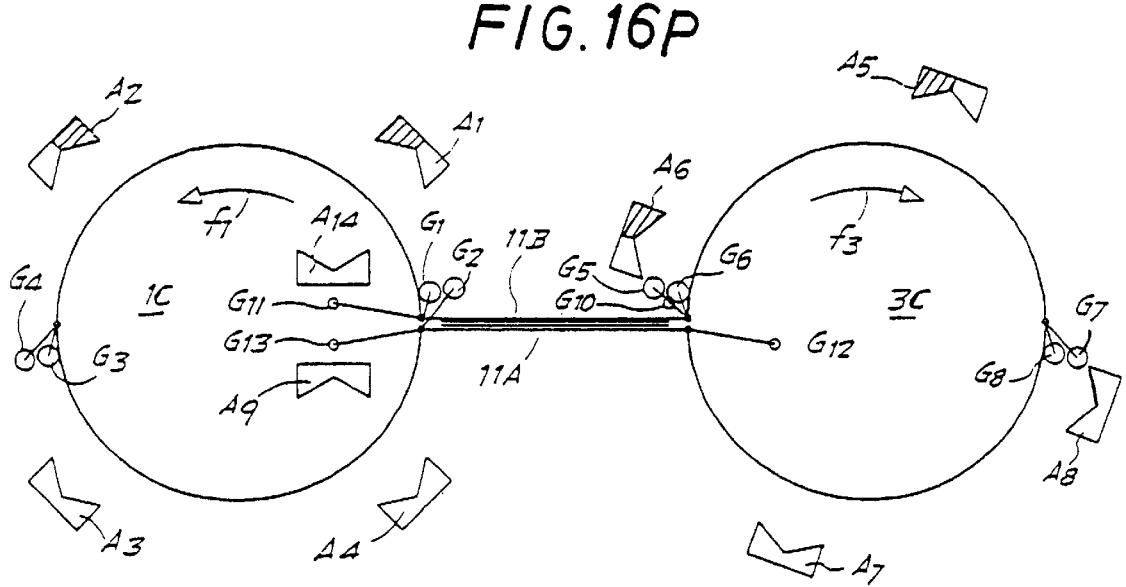

FIGS. 16A–16P show a second method of fabric formation with the machine of the present invention. In these figures, in the same way as in FIGS. 11A–11T, the references A1–A8 denote the eight supplies around the two cylinders 1C and 3C (supplies A1–A4 in the case of cylinder 1C, supplies A5–A8 in the case of cylinder 3C). Again G1–G4 denote the yarn feeders belonging to cylinder 1C, and G5–G8 are the yarn feeders belonging to cylinder 3C. A9 and A14 are the supplies belonging to the rectilinear beds 11A, 11B, while G10–G13 are four additional yarn feeders belonging to the two rectilinear beds: yarn feeders G12, G13 (with S and Z yarns respectively) for bed 11A, and yarn feeders G10, G11 (with S and Z yarns) for bed 11B.

FIG. 16A shows a limit position which will be taken conventionally as the initial instant in the working cycle illustrated in the following series of figures and during which four successive courses of stitches will be formed on each bed portion. In the configuration of FIG. 16A (which corresponds substantially to the configuration of FIG. 11A) the cam boxes 1F, 3F belonging to the two cylinders 1C, 3C begin rotating clockwise (arrow f1) and anticlockwise (arrow f3), respectively. Supplies A1–A8 initially describe a nonworking portion of a stroke bringing them each to the mid-plane marked P—P. It will initially be supplies A1, A3 and A6, A8 that pass beyond the mid-plane. This position having been passed, they commence their active stroke during which they form stitches along the corresponding circular half-beds with the yarns dispensed by their respective yarn feeders A1, A3, A6, A8. This configuration is shown in FIG. 16B. Supplies A9 and A14 are temporarily stationary.

As the rotation continues (FIG. 16C), supplies A2, A4, A5, A7 also begin to form respective courses using the yarns dispensed by yarn feeders G2, G4, G5 and G7. Supplies A9, A14 then execute a left-to-right stroke (arrow f11 in FIG. 16D) during which they form a row of stitches along beds 11A, 11B with the yarns dispensed by yarn feeders G11 and G13, respectively. In FIG. 16D, yarn feeder G11 is positioned above yarn feeder G10. FIG. 16E shows the final position reached by the yarn feeders of the rectilinear beds, while the supplies of the cylinders continue to rotate.

FIG. 16F shows the start of the reverse stroke of supplies A9, A14 from right to left. During this stroke, supply A9 forms a course of stitches along bed 11A using the yarn dispensed by yarn feeder G12 which follows the movement from right to left. Likewise supply A14 creates a course of stitches along bed 11B with the yarn of yarn feeder G10 which travels from right to left. FIG. 16G shows the final position reached by the intermediate supplies A9, A14 at the end of this stroke. Supplies A1–A8 continue their own paths. In FIG. 16G, supplies A6 and A8 have finished the active part of their stroke and their respective yarn feeders G6 and G8 have stopped approximately on the mid-plane P—P diametrically opposite the positions they had in FIG. 16A. As the rotation continues (FIG. 16H) the remaining supplies A1–A5, A7 also reach the mid-plane and end their active stroke, leaving the yarn feeders diametrically opposite the positions they had in FIG. 16A. Each supply A1–A8 performs an extra nonworking stroke to take it out of action before reversing its motion.

Between FIG. 16H and FIG. 16I, supplies A1–A8 reverse their direction of motion, as shown by arrows f1, f3. Supplies A9 and A14 remain temporarily stationary. Supplies A9, A14 also perform in succession a nonworking stroke from left to right and then an active stroke from right to left, during which they form a course of stitches along bed 11A using the yarn dispensed by yarn feeder G13 and a course of stitches along bed 11B using the yarn dispensed by yarn feeder G11. Consequently in FIG. 16I the yarn feeders G10–G13 are all between the rectilinear beds and the cylinder 1C.

It can be seen in FIG. 16J that in this phase of the operation the individual supplies A1–A8 form respective courses of stitches with yarns different from those of the previous phase: supply A1 forms stitches with the yarn dispensed by yarn feeder G2 and so on. As in the method described with reference to FIGS. 11A–11T, so in this case yarn feeders G1–G4 and G5–G8 dispense yarns with alternately Z and S twists, in such a way that at the conclusion of the operating cycle four courses of stitches have been formed on each circular half-bed with alternately S and Z twist yarns.

FIG. 16J also shows the beginning of the next stroke from left to right by supplies A9 and A14. They each form one course of stitches along beds 11A and 11B with the yarns of yarn feeders G10 and G12. Proceeding via the position of FIG. 16K, where supplies A9 and A14 are completing their stroke, they reach the end-of-stroke position of FIG. 16L, where the yarn feeders G10, G12 are at the cylinder-3C end in an out-of-action position, while yarn feeders G11 and G13 are at the cylinder-1C end.

In FIG. 16M, supplies A9 and A14 perform a nonworking stroke from right to left to reach the position of FIG. 16N, while supplies A1–A8 continue rotating to the position of FIG. 16P. In this position all supplies and yarn feeders have resumed the initial position shown in FIG. 16A.

In FIGS. 16A–16P each yarn feeder is shown with its particular yarn. The movements of yarn feeders G10–G13 to the lateral positions are such as to cause the yarns they are dispensing to cross the yarns dispensed by yarn feeders G1–G8, so that the portions of fabric formed on the rectilinear beds 11A, 11B are joined to the portions formed on the four circular half-beds.

Figure 17:
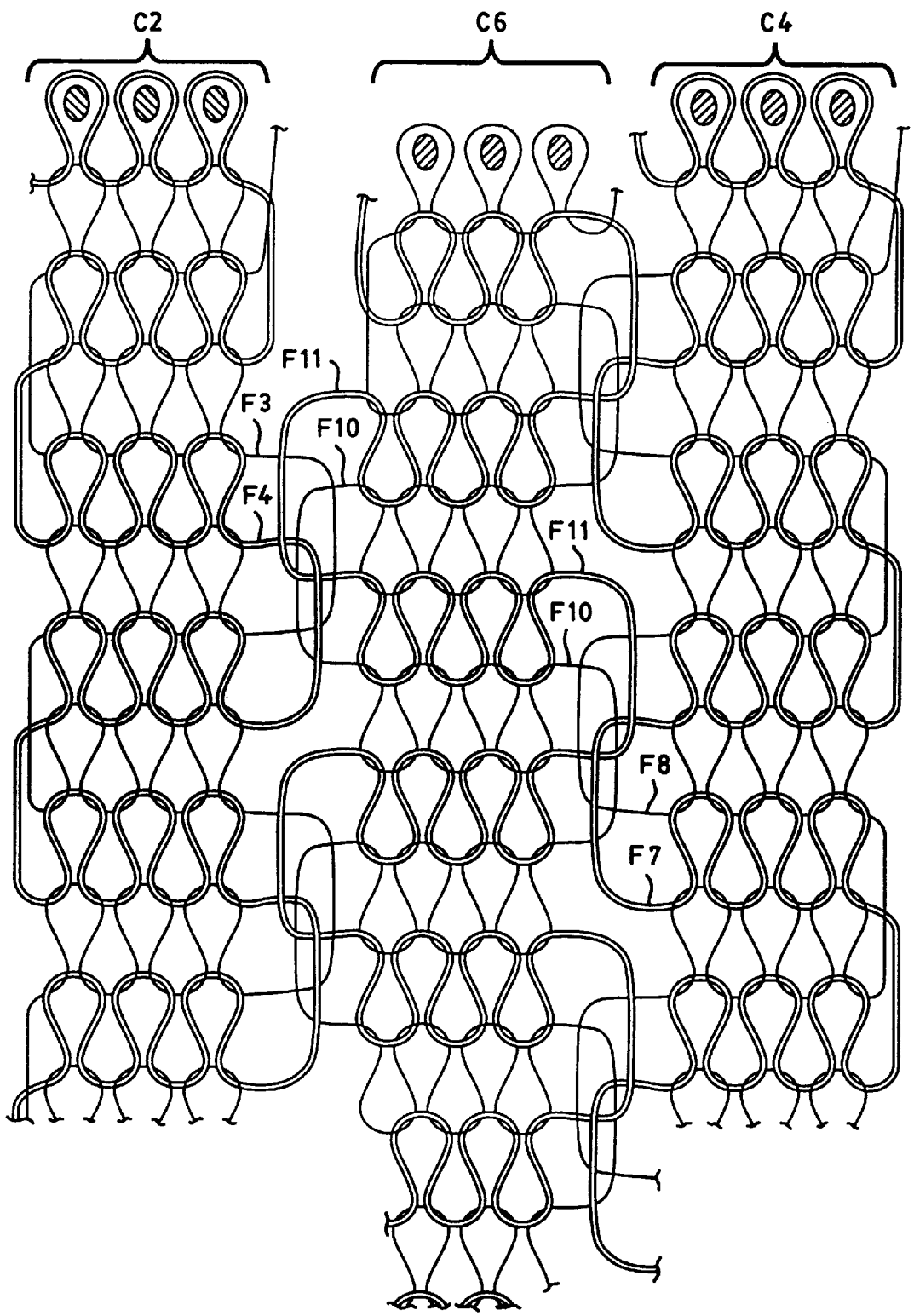
FIG. 17 shows diagrammatically and much enlarged a fabric forming area for the body section formed in accordance with the operating method described with reference to FIGS. 16A–16P.

FIG. 17 shows a portion of the article produced by this method. The same points that were made about FIG. 12 also apply here. F10 and F11 are the yarns dispensed by yarn feeders G10 and G11, which form the intermediate back portion C6. F3 and F4 are the yarns dispensed by yarn feeders G3 and G4 to form portion C2, while F7, F8 are the yarns dispensed by yarn feeders G7 and G8 to form portion C4.

The method described immediately above has the advantage over the preceding method that it can use a different yarn for the central portion of the body section than the yarn used for the lateral portions. This means that, for example, a gusset can be made with a different yarn.

Embodiment with oscillating beams (FIGS. 18 to 23)

In FIGS. 18 to 23 a different way of moving the yarn feeders is shown.

In this embodiment the yarn feeders belonging to the two cylinders 1C and 3C are mounted on two pairs of opposing beams 201, 203 and 205, 207. The section shown in FIG. 18 shows four pairs of superimposed beams because this embodiment makes it possible to have many pairs of beams for selecting many different yarns in the various stages of the fabric forming process. In the remainder of the description, however, reference will only be to two pairs of beams, it being understood that where more superimposed pairs are used (always an even number), working methods remain substantially the same except that many pairs of beams with corresponding yarn feeders can be used as an alternative.

Figure 19A:
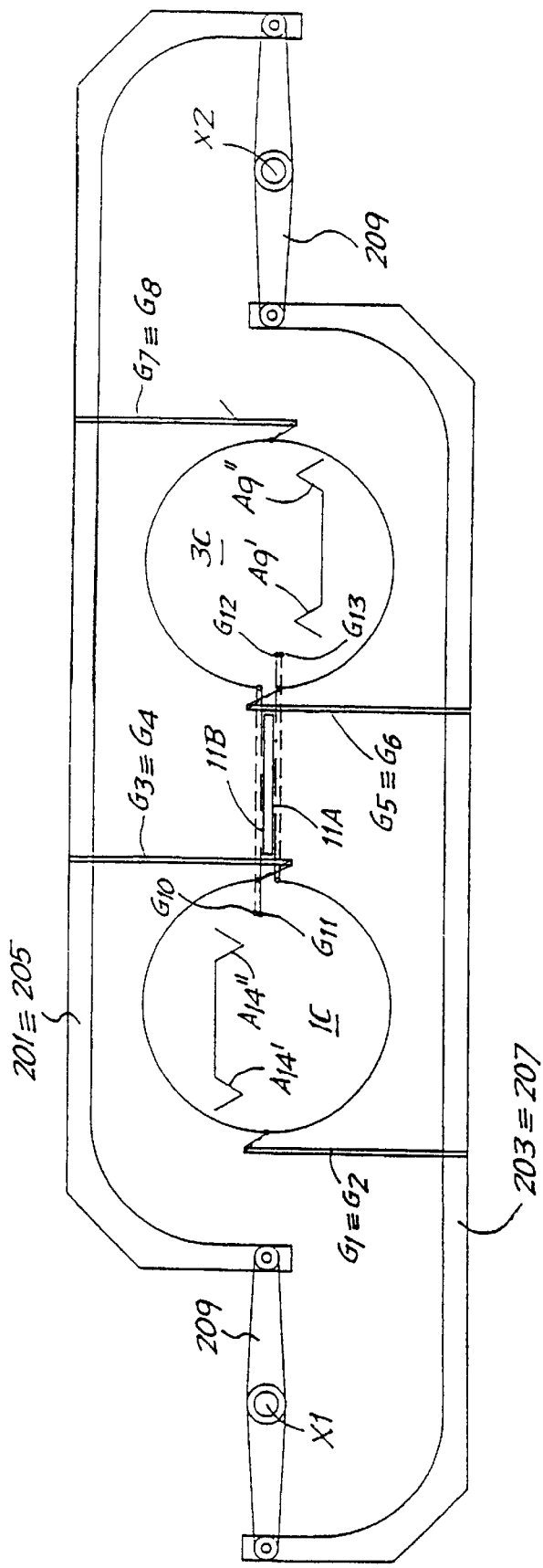

FIGS. 19A–19E indicate in plan view the successive positions of the two pairs of beams when forming four successive courses of stitches for the body section C of the garment. In FIG. 19A, only two opposing beams lying in the same plane are visible, because the beams of the second pair are below and above and therefore not visible. Both pairs of beams can be seen separated from each other in FIG. 19B and in FIG. 19D.

The two beams 201, 203 and 205, 207 of the two pairs are mounted on respective twin rocker arms 209, 211 pivoted on common spindles X1, X2. The four beams and four twin rocker arms together define four four-bar chains.

The yarn feeders are numbered on the same system as adopted in FIG. 10. Yarn feeders G1 and G5 are mounted on beam 207, yarn feeders G2 and G6 on beam 203, yarn feeders G3 and G7 on beam 205 and yarn feeders G4 and G8 on beam 201. To simplify the drawing the supplies of the cylinders have been omitted, but it should be understood that they are reciprocated and synchronised with the movement of the yarn feeders G1–G8, as already seen in the version illustrated in FIGS. 16A–16P. In FIG. 19A the yarn feeders are superimposed in pairs on each other and in this figure this circumstance is pointed out by the use of the dual numbering.

In contrast to the previous embodiments, each of the two rectilinear beds 11A, 11B has two supplies marked A9', A9" and A14', A14", respectively, rather than just one. The movements of the two pairs of supplies are in opposition, in the sense that they move simultaneously in a reciprocating manner but in opposite directions. The rectilinear beds also have the yarn feeders G10–G13 which in this case are moved about by the supplies A9', A9", A14', A14" in the same manner as occurs in a rectilinear machine and in the sequence which will be described below.

Referring to FIGS. 19A–19E, the sequence of actions by which the body section is formed will be described initially, while the mechanisms that operate the beams will be described later. In the description which follows, where reference is made to defined angular movements, these movements should be understood as approximate and indicative, and hence not limiting, unless otherwise stated.

Figure 19B:
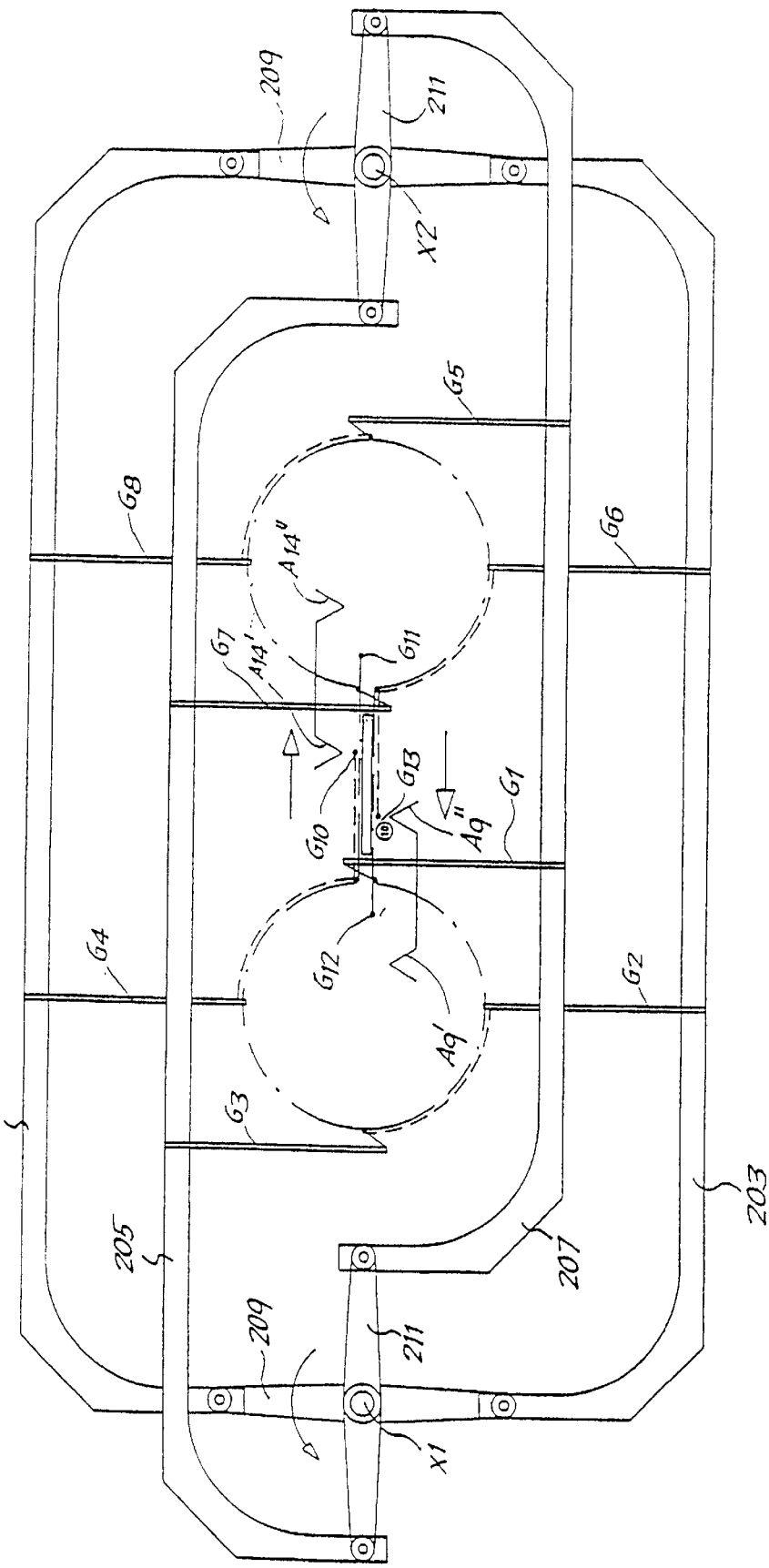

In the configuration of FIG. 19A the yarn feeders are in the limit position corresponding to the position of FIG. 16A. The twin rocker arms 209 and 211 begin turning with a relative angular displacement of 90°, so that when the rocker arms 211 have effected an angular movement of 180° anticlockwise (FIG. 19B), rocker arms 209 have effected a movement of only 90° in the same direction. In the position of FIG. 19B yarn feeders G1, G3, G5 and G7 have formed an entire course of stitches with their respective yarns around their respective circular half-beds, while yarn feeders G2, G4, G6 and G8 have formed about half a course with their yarns. At the same time a course of stitches has been produced along the rectilinear beds 11A, 11B using the yarns from yarn feeders G11 and G12 by means of supplies A9' and A14", while yarn feeders G10 and G13 are still dispensing yarn to supplies A9" and A14' which have not yet completed their stroke.

Figure 19C:
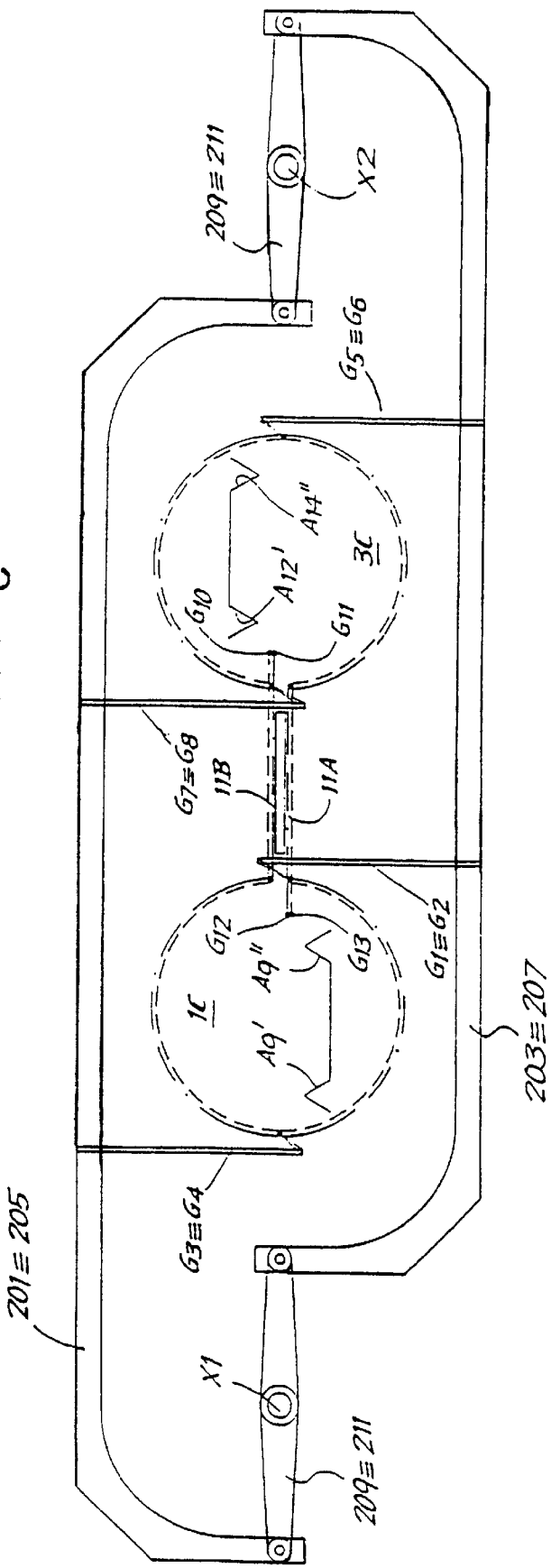
Figure 24:
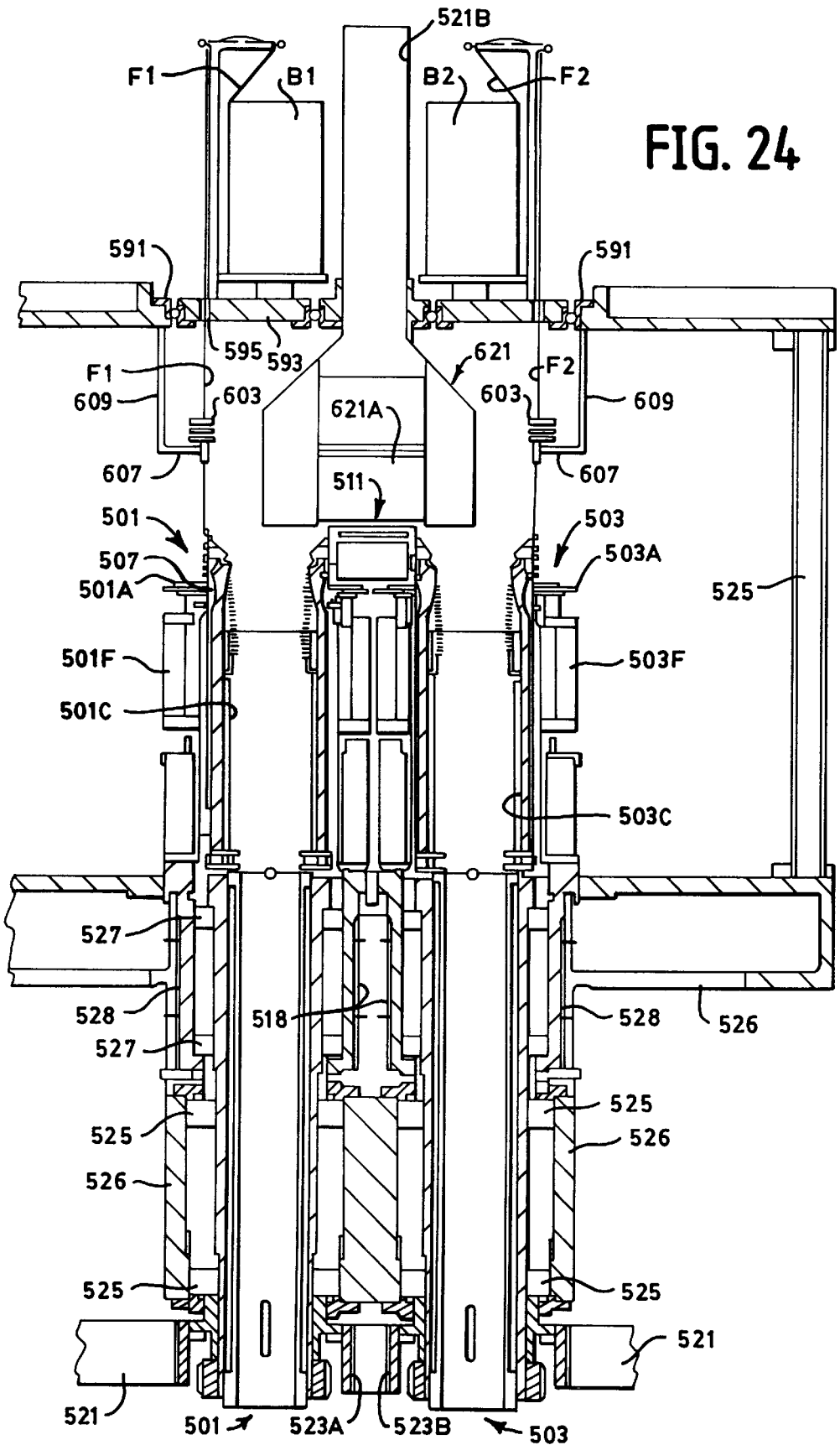
FIG. 24 shows a schematic cross-section through the cylinders of the machine, on a vertical plane containing the axes of the cylinders.

Next, in FIG. 19C, beams 205, 207 are still in the position of FIG. 19B, whereas beams 201, 203, which were at an angle of 90° behind them in FIG. 19B, have now completed the first 180° stroke, so that the yarns of yarn feeders G2, G4, G6 and G8 have completed their respective courses of stitches. At the same time yarn feeders G10 and G13 and their respective supplies A9" and A14' have also finished their strokes. In this configuration, therefore, two course of stitches have been formed on each circular half-bed and two courses of stitches have also been formed along each rectilinear bed. The courses are indicated by the dashes and chain lines in FIG. 19C.

At this point the direction of rotation of rockers arms 209 and 211 is reversed. In FIG. 19D the beams 205 and 207 are once again in the initial position of FIG. 19A, having effected a 180° stroke in the opposite direction to the previous stroke, while beams 201, 203 are lagging by 90°. Consequently the yarns dispensed by yarn feeders G1, G3, G5 and G7 have each generated one entire course around the respective circular half-beds, while yarn feeders G2, G4, G6 and G8 are still moving and have effected approximately half a stroke to form approximately half a course with their yarns. Supplies A9', A9", A14', A14" and their various yarn feeders G10–G13 are executing a stroke in the opposite direction to that already described; yarn feeders G11 and G12 have reached the end of their strokes, while yarn feeders G10 and G13 are still in an intermediate position. In FIG. 19E the fabric forming elements have returned to the start-of-cycle position illustrated in FIG. 19A.

As is clear from the sequence illustrated in FIGS. 19A–19E, two 180° strokes of the rocker arms 209, 211 gives two strokes of the beams 201–207, with the formation of four courses of stitches along the rectilinear beds 11A, 11B and around the four circular half-beds defined by the two cylinders 1C, 3C. By having alternative yarns in the yarn feeders (e.g. S- and Z-twist yarns respectively), the courses form alternately with S and Z yarns.

The version described immediately above will be found to be particularly advantageous in that it greatly simplifies the operating mechanism of the yarn feeders. Whereas yarn feeders G10–G13 can be actuated as in ordinary rectilinear machines, yarn feeders G1–G8 belonging to the two cylinders are actuated synchronously by acting on the four twin rocker arms 209, 211. All the movements, both of the twin rocker arms and of the carriages carrying the supplies A9', A9", A14', A14" can be derived from the movement of the cam boxes carrying the supplies of the cylinders 1C and 3C. Since supplies A9', A9" on the one hand and supplies A14', A14" on the other are actuated synchronously but in phase opposition, it is possible to use two carriages attached, say, to a belt running around two pulleys to obtain the out-of-phase movement, rather than having two carriages 17A, 17B integral with each other or otherwise actuated in the same direction.

A possible mechanism for controlling the synchronised movement of the twin rocker arms 209, 211 and hence of the beams 201–207 will now be described with reference to FIGS. 18, 20 and 21. In this illustrative embodiment the motion is derived from shaft 25, for which purpose a pinion 221 is keyed to its upper end and meshes with a ring gear 223 keyed to a hollow shaft 225 supported by a lateral block 227. The hollow shaft 225 ends in a cylindrical sleeve portion 229 that bears two small pistons 231, 233 with horizontal axes lined up in a vertical plane containing the axis of the shaft 225. The two pistons 231, 233 are urged centrifugally by two helical compression springs causing them to press via two respective rollers 235, 237 against the inner surface of respective oscillating cams, the shape of which is visible in FIGS. 21 and 22. The two cams 241, 243 associated with the upper piston 231 define (FIG. 21A) an active inner surface of cylindrical form divided into two portions of different extent, the two cams not being the same as each other. More specifically, cam 241 has a circumferential extent of approximately 270° while cam 243 has a circumferential extent of approximately 90°. 241X and 243X denote two vertical pivot pins for the two cams 241, 243. The oscillation of the cams is controlled by actuators which are not shown. As is clear in FIGS. 21A–21D, the oscillation of cams 241, 243 produces a radial movement of piston 231.

Coaxial with the cylindrical sleeve portion 229 are two superimposed discs 245, 247, the first of which is integral with a shaft 249 which, acting through a suitable key connection, turns the twin rocker arm 211 and hence causes the beams 205, 207 to oscillate, while the second disc 247 is integral with a hollow shaft 251 which, acting through a system of keys, turns the twin rocker arm 209 and hence causes the beams 201, 203 to oscillate. The inner shaft 249 is linked to a selector 253 that can shift the shaft 249 and the hollow shaft 251 axially in such a way that it can engage a different rocker arm connected to different beams with other yarn feeders carrying different types of yarn.

Disc 245 contains two tangential recesses 245A, 245B set apart by 135° from each other and having a circumferential extent of approximately 45°. The tangential recesses 245A, 245B act in combination with the piston 231 to set up a temporary mechanical torsional link between the sleeve portion 229 and the disc 245 so as to transmit the rotation of drive shaft 25 to shaft 249 and hence to the rocker arm 211.

In a similar arrangement, two cams 261 and 263 defining an active cylindrical surface are arranged around piston 233. Said cams pivot about two vertical pins 261X, 263X which are offset by 90° from pins 241X, 243X. Cams 261, 263 are identically shaped. Disc 247 has two recesses 247A, 247B on opposite sides with circumferential extents of slightly more than 90°. These act in combination with the piston 233 so as temporarily to couple the hollow shaft 251 torsionally to the cylindrical sleeve 229 and hence to transmit the rotary motion to rocker arm 209.

FIGS. 21A–21D show the movements of the cams 241, 243, the piston 231 and the disc 245 through one work cycle, during which the beams 201–207 and rocker arms 209, 211 execute the movements described with reference to FIGS. 19A–19E. FIG. 21A corresponds to the position of the beams in FIG. 19A. The piston 231 is inside the recess 245B. The anticlockwise rotation of shaft 225 and hence of the cylindrical sleeve 229 is not transmitted to shaft 249 for the next 45° because this is the angular extent of the recess 245B. At the end of this 45° rotation the piston 231 abuts against the end surface of the recess 245B and takes the disc 245 around with it to the position shown in FIG. 21B, causing disc 245 (and hence shaft 249 and the twin rocker arm 211 attached thereto) to execute an angle of 180°. This corresponds to the 180° rotary movement involved in passing from FIG. 19A to FIG. 19B. For the subsequent 135° rotation of the cylindrical sleeve 229, the disc 245 remains stationary as the piston 231 is radially out. In FIG. 21C, shaft 225 and hence sleeve 229 have completed a rotation of 360° and their motion now reverses, as a result of the reversal of the direction of rotation of shaft 25 and hence of the supplies of cylinders 1C and 3C (which in this embodiment revolve in the same direction as each other). When the cylindrical sleeve 229 and hence piston 231 reach the position shown in FIG. 21C, cams 241, 243 pivot into the initial position so as to push the piston into recess 245A. There then follows a rotation of 45° by the sleeve 229 during which there is no mechanical connection with the disc 245, and as a result the rocker arm 211 still remains stationary, until the piston 231 abuts against the end surface of the recess 245A and therefore begins to push the disc 245 round with it in its rotary movement. This rotation of the disc 245 continues for 180° to the position shown in FIG. 21D, where the cams pivot to bring about a radial centrifugal movement of piston 231 and hence disconnect disc 245 (which stops) from the cylindrical sleeve 229. The latter continues to rotate until it has completed a 360° stroke, that is to say until it has returned to the position shown in FIG. 21A, where there is reversal of the motion and oscillation of the cams 241, 243.

The twin rocker arms 209 and 211 are connected to suitable brake means 210 (FIG. 18) which arrest their movement at the right moment so that their inertia does not carry them beyond the movements of the underlying discs 245, 247.

FIGS. 22A–22D show the various positions adopted during the same work cycle by piston 233, cams 261, 263 and disc 247. For convenience of illustration, FIGS. 22A–22D show instants offset by angles of 90° from those illustrated in the corresponding FIGS. 21A–21D. For instance, FIG. 22A shows a condition in which the sleeve 229 has already executed the first 90° of its stroke from the initial instant of the cycle illustrated in FIG. 21A. From the beginning of the angular stroke, for the first 135° of rotation of shaft 225 and of sleeve 229, disc 247 remains stationary. At this point the piston 233 abuts against the end surface of recess 247B and begins to carry disc 247 around with it to the position shown in FIG. 22B, i.e. through 180°. In this configuration, recesses 245A, 245B have therefore swapped positions compared with FIG. 22A. The cams pivot to cause piston 233 to emerge from recess 245B and allow the cylindrical sleeve 229 to complete its angular stroke for the last 45° (position not shown) while the associated rocker arm is kept stationary. At this point the shaft 225 and cylindrical sleeve 229 reverse their direction of rotation. FIG. 22C shows the configuration of the system after a 90° rotation in the reverse direction. Cams 261, 263 have returned to the position in which they are pushing piston 233 in a centripetal radial direction. After turning 135° from the position where the direction of rotation was reversed, piston 233 comes once again into contact with the end surface of recess 247B and, as the rotation of cylindrical sleeve 229 continues, disc 247 is once again set rotating until it reaches the configuration of FIG. 22D, where cams 261, 263 pivot to cause the piston to leave the recess 247B. A further 45° rotation brings the system to its initial configuration ready for a new cycle.

FIG. 20 is a diagram illustrating the angular strokes of the various elements. The x-axis carries the angle of rotation of shaft 225 and of cylindrical sleeve 229, while the y-axis carries the angle of rotation of cylindrical sleeve 229, disc 245 and disc 247. The references f1, f2 and f3 identify the three diagrams referring to shaft 225, disc 245 and disc 247.

The version described above also lends itself to the construction of multiple machines for the simultaneous formation of a plurality of articles. FIG. 23 shows a configuration with two pairs of cylinders 1C, 3C and 1C', 3C', with two pairs of rectilinear beds 11, 11'. In this case each beam carries four yarn feeders. The movement is synchronized across the two machine sections 1C, 3C, 11 and 1C', 3C', 11'.

Embodiment of FIGS. 24 to 36

In schematic terms, the machine comprises two working side units 501, 503 each comprising a fabric forming cylinder 501C, 503C, of essentially conventional type, with tricks in which the needles, marked 505, can slide. 507 indicates the jacks (see in particular FIG. 30), while 501F and 503F indicate the cam boxes of the two cylinders 501C, 503C, which carry the movement control cams of the jacks 507 of the needles 505.

Each cylinder 501C, 503C possesses a ring 501A, 503A for the sinkers. Each of the two working units 501 and 503 has a similar structure and performs analogous functions to those of the cylinder of an ordinary circular knitting machine for producing hose.

Situated between the two working side units 501 and 503 is an intermediate unit 511 consisting of two short inclined needle beds 511A, 511B (see FIG. 25), each with their own tricks 512 for housing and guiding needles 513 and jacks which will be described in greater detail later. For each bed 511A, 511B there is a carriage 517A, 517B with an electronic selector: this is caused to reciprocate in a straight line along its respective bed and carries the needle and jack control cams. The two rectilinear beds 511A, 511B are arranged like an inverted V, with the vertex uppermost, and are situated symmetrically about the plane containing the axes of the cylinders 501C, 503C.

As will be explained below, the two cylinders 501, 503 form the legs of the article, and later, these same cylinders in combination with the two rectilinear beds 511A, 511B form the body section of the article.

Each cylinder is caused to revolve by a common belt 521 (shown only partly in FIG. 24) that travels around two pulleys 523A, 523B connected to the two cylinders 501C, 503C. 525 indicates the bearings that support the cylinders 501C, 503C on the fixed structure 526 of the machine. 527 indicates the bearings of the cam boxes 501F, 503F.

The cam boxes 501F, 503F are rotated via respective belts (not shown) that travel around pulleys 528 integral with the cam boxes themselves. The motorized drive of the cam boxes is independent of that of the cylinders so as to make it possible either to rotate the cylinders while keeping the cam boxes stationary, or else to rotate the cam boxes while keeping the cylinders stationary.

Figure 25:
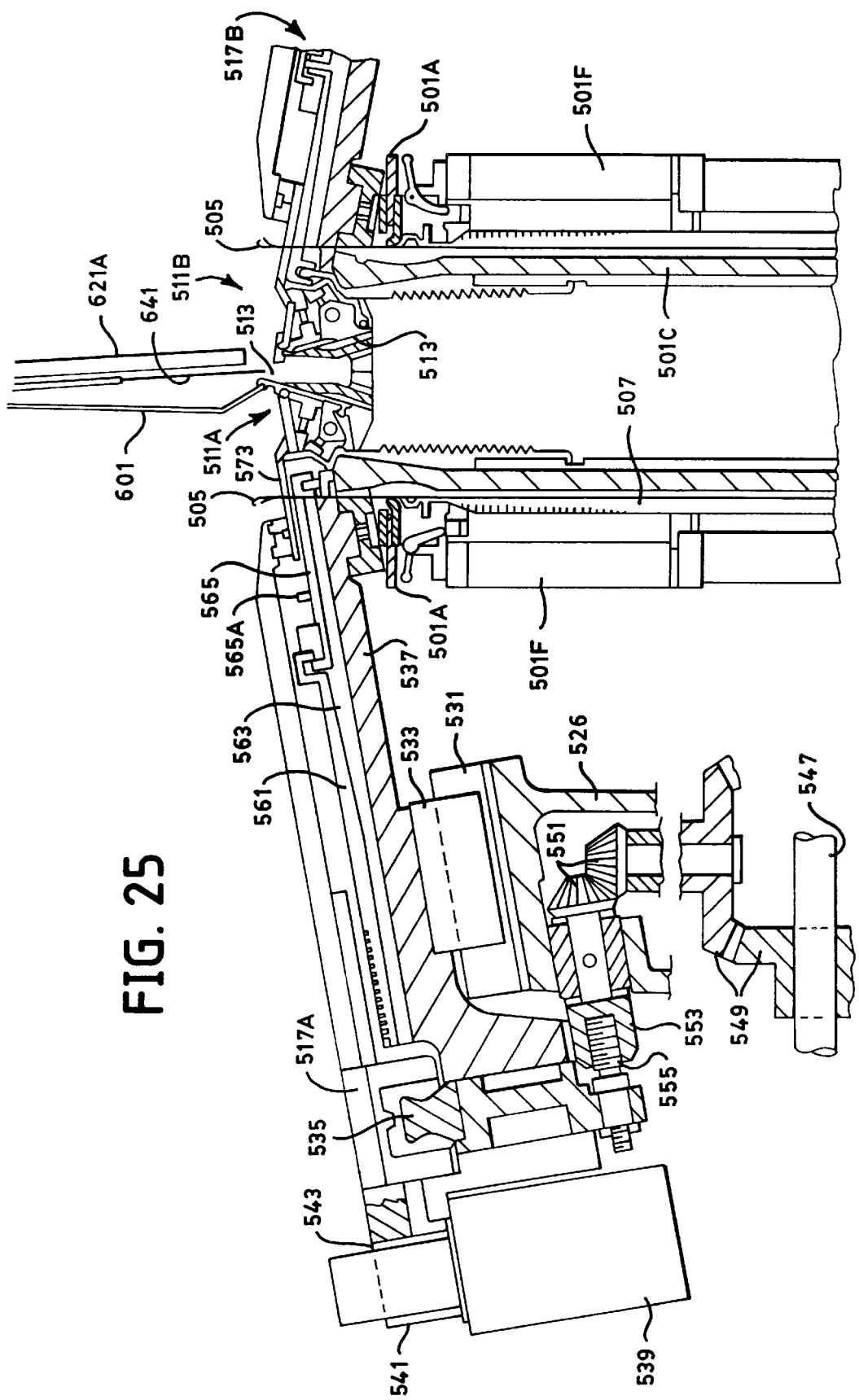
FIG. 25 shows a local section on a vertical plane at right angles to the plane of the cross-section of FIG. 24, showing the elements of the rectilinear beds.
Figure 29:
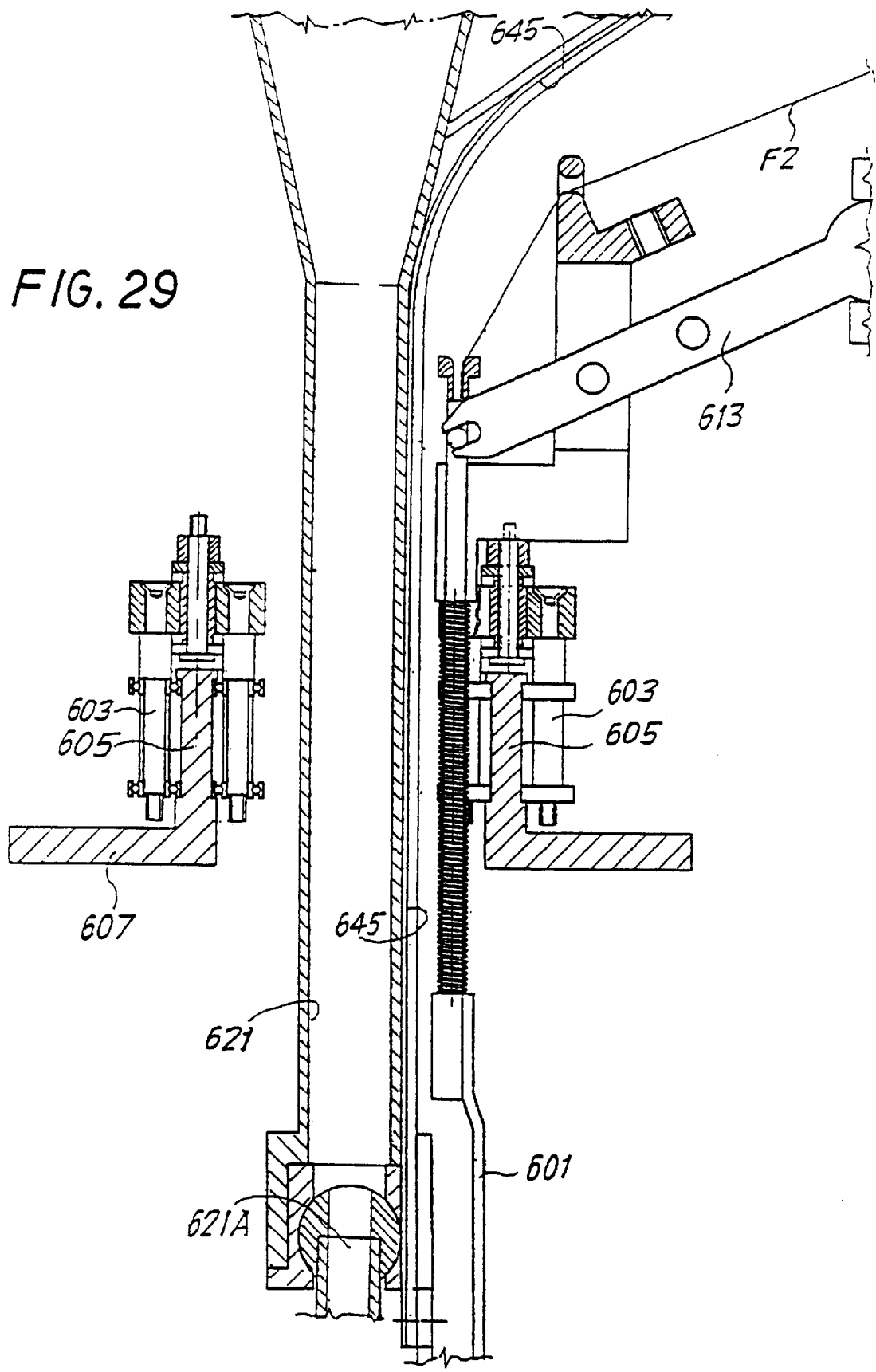
FIG. 29 shows an enlargement of the chain on which the yarn feeders are carried.

Also mounted on the structure 526 are two guides 531, one of which is visible in FIG. 25, the other being symmetrical with respect to the mid plane of the machine, parallel to the rectilinear beds 511A, 511B. On each guide 531 runs a slide 533, integral with another guide 535 perpendicular to guide 531. Also integral with the slide 533 is a plate 537 containing the tricks in which the operating jacks of the needles 513 of that particular rectilinear bed can slide, as will be described later in greater detail.

The plate 537 also supports an electric motor 539 with a pinion 541 that engages with a rack 543 integral with carriage 517A or with carriage 517B. The rotation of the motor 539 moves the respective carriage 517A or 717B along the guide 535 in order to operate the needles 513 of the corresponding rectilinear bed.

The position of the plate 537 with respect to the fixed structure 526 of the machine can be adjusted by means of an adjustment spindle 547 which, through a bevel gear pair 549 and a further bevel gear pair 551, turns a nut 553 in which a threaded pin 555 integral with the plate 537 is engaged. The spindle 547 passes through the machine and, with an arrangement of bevel gear pairs symmetrical to 549, 551, acts on the plate 537 of the other rectilinear bed 511B. By turning the spindle 547 it is possible to modify the position of both plates 537, causing them to move along their respective guides 531. This provides the means of adjusting the distance between the rectilinear beds 511A, 511B so that thicker portions of the article, e.g. the elasticated waist band, can pass through if this is required.

The arrangement of the operating elements of the needles and sinkers of both rectilinear beds 511A, 511B will now be described in greater detail with reference to FIGS. 25 and 26. Indicated in FIG. 25 are the jacks 561 that slide in individual tricks 563 in the plate 537. In contrast to what takes place in conventional machines, the jacks 561 act not directly on the butts of the needles 513, but on rods 565 which transmit the motion to the needles 513 through rocker arms 567 (see in particular the enlargement FIG. 26), each of which is pivoted at 567A on the plate 537 and linked at 567B and at 567C to the associated rod 565 and associated needle 513 respectively. The rods 565 have projections or butts 565A (see FIG. 25) operated by cams carried by the respective carriage 517A or 517B for the control of the needles 513, while the jacks 561 are operated by other control cams carried by the same carriages for lifting the needles 513. The movements of the needles 513 are however produced via the kinematic chain formed by the rods 565 and rocker arms 567. This is because the carriages 517A, 517B have a much shallower inclination to the horizontal than the needles 513 in order to leave room beneath them for the circular beds of the cylinders 501C, 503C.

Also visible in FIGS. 25 and 26 are the fixed sinkers 571 and moving sinkers 573 of the rectilinear beds 511A, 511B. The moving sinkers 573 are controlled by cams carried by the carriage 517A or 517B acting directly on said sinkers. In FIG. 26 the needles 513 of bed 511A are lowered and their sinkers 573 withdrawn, while the needles of bed 511B are lifted and sinkers 573 are in the advanced position.

Figure 30:
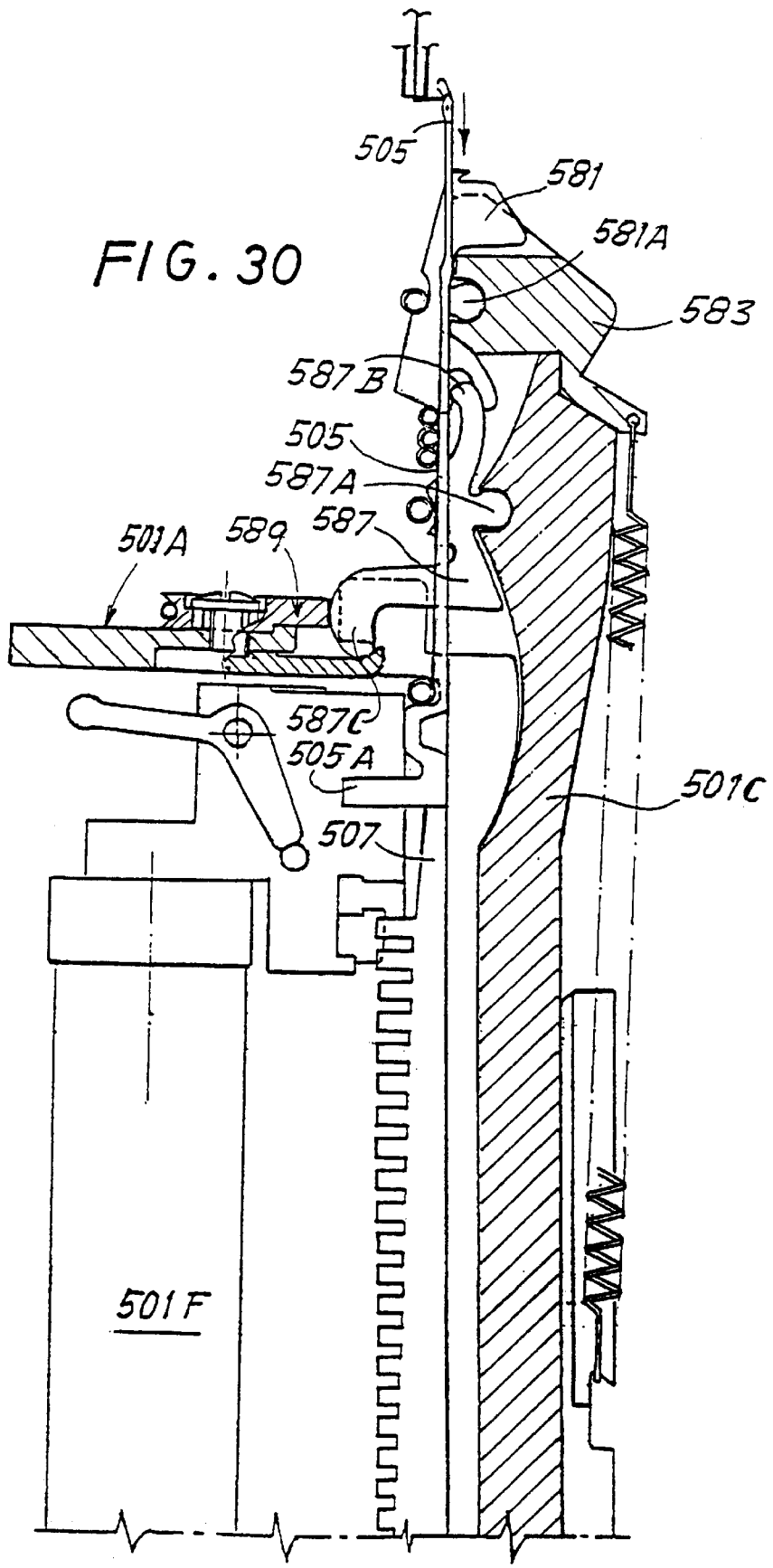
FIGS. 30 and 31 show the movement of the cylinder sinkers and their associated operating elements.
Figure 31:
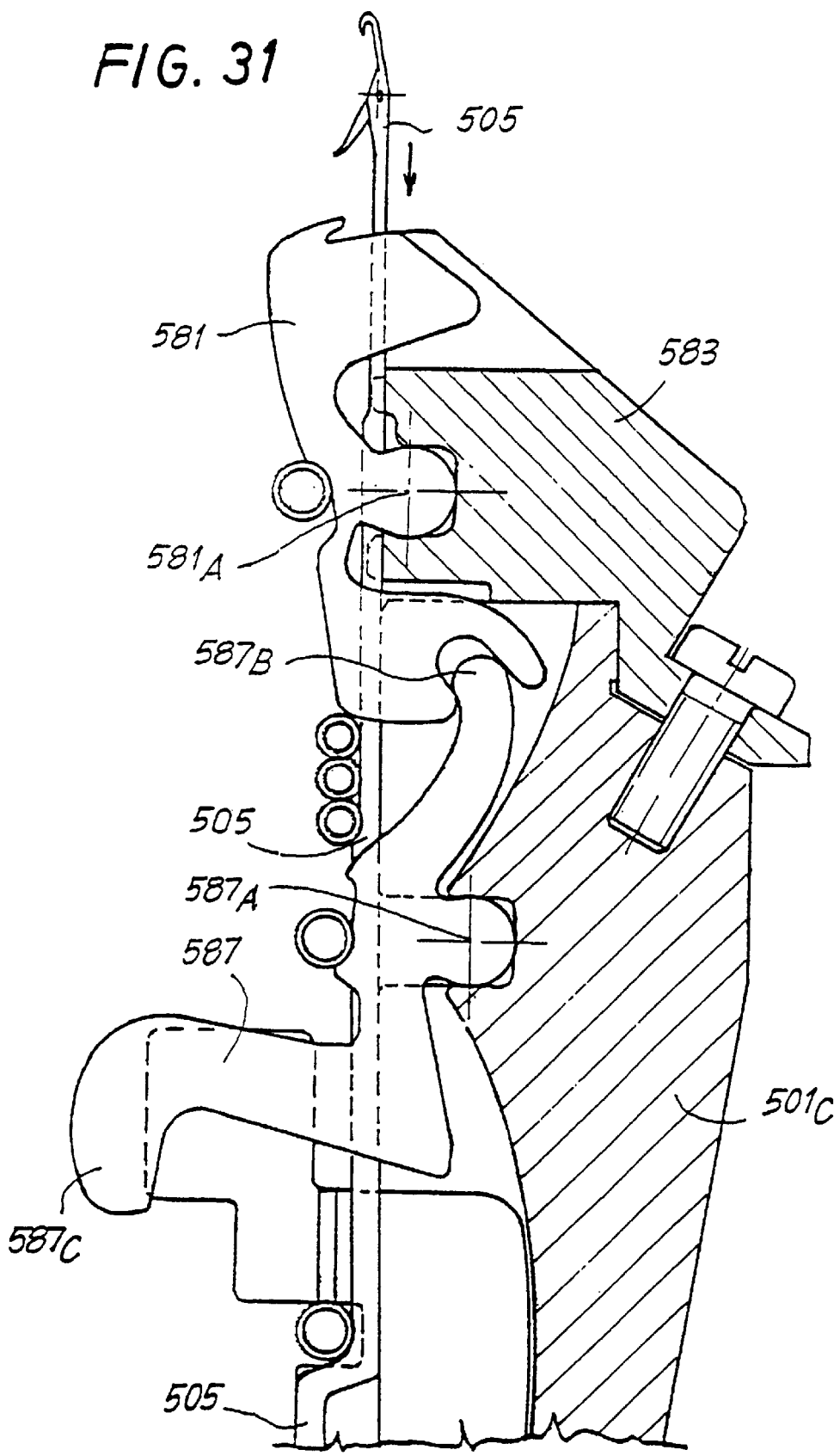

FIGS. 30 and 31 schematically show the sinker operating elements of the cylinders 501C, 503C. Also visible in FIG. 30 is one of the needles 505 with its butt 505A and its jack 507. The operating elements of the needles and jacks of the cylinders, housed in the cam boxes 501F, are of conventional type and are not shown in the drawing. However, the operation of the sinkers has been modified for reasons of space. Each sinker, marked 581, is pivoted at 581A in a corresponding seat in a ring 583 integral with the associated cylinder 501C. In FIGS. 30 and 31 the sinkers are shown in the two positions, advanced and retracted respectively, relative to the fabric forming area, while the needle 505 is shown always in the raised position, it being understood that in the position shown in FIG. 31 it must slide down, as indicated by the arrow.

Compared with conventional machines, the sinker ring 501A, i.e. the element comprising the cams for controlling the sinkers 581, is set at a lower level, in such a way that the pivoting movement is imparted to the sinkers 581 through a respective rocker arm 587 pivoted at 587A in the respective seat and linked at 587B to the associated sinker 581. A projection 587C on the rocker arm is operated by the cams 589 (visible in FIG. 30) of the ring 501A. In practice the rocker arm 587 is a means of transmitting the motion from the sinker control cams to the sinkers themselves, which means that the sinker rings 501A, 503A can be arranged lower than normal, so as to leave space for the plates 537 and the carriages 517A, 517B carrying the needle operating elements of the rectilinear beds 511A, 511B.

The fixed structure 526 of the machine extends upwards (see FIG. 24) above the rectilinear beds 511A, 511B and above the cylinders 501C, 503C to form an annular track 591 in which a revolving member 593 rotates. The axis of rotation of the revolving member 593 is vertical and passes through the centre of the rectilinear beds 511A, 511B. Supported by the revolving member 593 are a number of yarn packages, two of which are visible in FIG. 24 marked B1 and B2. The yarns F1, F2 supplied by the packages B1, B2 pass through holes 595 formed in the base of the revolving member 593 and are fed down to the fabric forming elements. As can be seen in particular in FIG. 32 in the case of yarn F2, this is fed to a yarn feeder 601 carried by a chain 603 that runs in a horizontal plane and forms a closed path which follows the two rectilinear beds 511A, 511B and the two circular needle beds on the cylinders 501C, 503C. The path of the chain 603 can be seen in FIG. 27 in particular. The path of the chain is defined by a track 605 (see FIG. 28) integral with a plate 607 supported by the fixed structure 526 of the machine. In the example illustrated, the plate 607 is supported by brackets 609 shown by way of indication in FIG. 24. Also illustrated in FIGS. 27 and 28 is a sprocket marked 611 which transmits the motion to the chain 603 by means of an actuator (not shown).

In the example illustrated, the chain 603 carries two identical yarn feeders 601 out of phase with each other by a suitable amount, as will be described below, for feeding two yarns F1, F2 from two packages B1, B2 mounted on the revolving member 593, but it is also possible to arrange more than two yarn feeders on the chain with suitable spacing.

Each yarn feeder 601 is controlled by a lever 613 which, acting through a respective cam, in a manner known per se, lowers the yarn feeder or lifts it and consequently withdraws it from the beds when the knitted article is finished and requires removing. When this happens, the yarn feeders are lifted and the yarns are cut and held in grippers, as is known to those skilled in the art, to enable the article to be removed and the next article begun.

The machine described thus far operates as follows.

The article is started at the toes, which may be open to start with, or closed by one of the known devices, such as, by way of example, those described in: WO 95/31595; WO 95/34702; PCT/IT96/00102 (with priority from Italian patent application FI95A000116 of May 24, 1995); PCT/IT96/00139 (with priority from Italian patent application FI95A000165 of Jul. 14, 1995). The teachings of these documents are incorporated in the present description.

The legs are knitted with the cam boxes 501F, 503F of the fabric-forming side units 501, 503 stationary and the cylinders 501C, 503C revolving with continuous and/or reciprocating motion. The rectilinear beds 511A, 511B are temporarily inactive. The legs are formed by the methods already known and currently used for the separate formation of hosiery legs on circular machines. Each cylinder can be supplied with a suitable number of yarns, for example four. One of the four supplies of each cylinder 501C, 503C consists of one of the yarns F1, F2 fed through the yarn feeders 601 from the packages B1, B2 located on top of the revolving member 593, which at this stage of the fabric forming process is stationary.

Once the legs are completed, the cylinders 501C, 503C of the side units 501, 503 are stopped, three of the supplies to each of the cylinders are interrupted, the needles of the rectilinear beds 511A, 511B are lifted and crossed over to form the crotch closure zone, and the two yarn feeders 601 begin a continuous movement, each continuing to supply its own yarn F1, F2 while the other three supplies to each cylinder that are used to form the legs are interrupted. The movement of the yarn feeders is produced by driving the chain 603, which runs around the closed path resembling a figure of eight, shown in FIG. 27. The cam boxes 501F, 503F of the side units 501, 503 are moved with a continuous rotary motion, while the carriages 517A, 517B carrying the needle 513 operating cams of the rectilinear beds 511A, 511B are moved with reciprocating motion.

Needles 505 of both cylinders 501C, 503C and needles 513 of both rectilinear beds 511A, 511B form in practice in this phase a single bed whose form corresponds essentially to that of the track on which the chain 603 runs and, by supplying two yarns F1, F2 through the yarn feeders 601 to these needles, the body section of the article is formed. Clearly, more than two supplies could be used during this stage, e.g. four supplies simultaneously.

Figures 32, 32A:
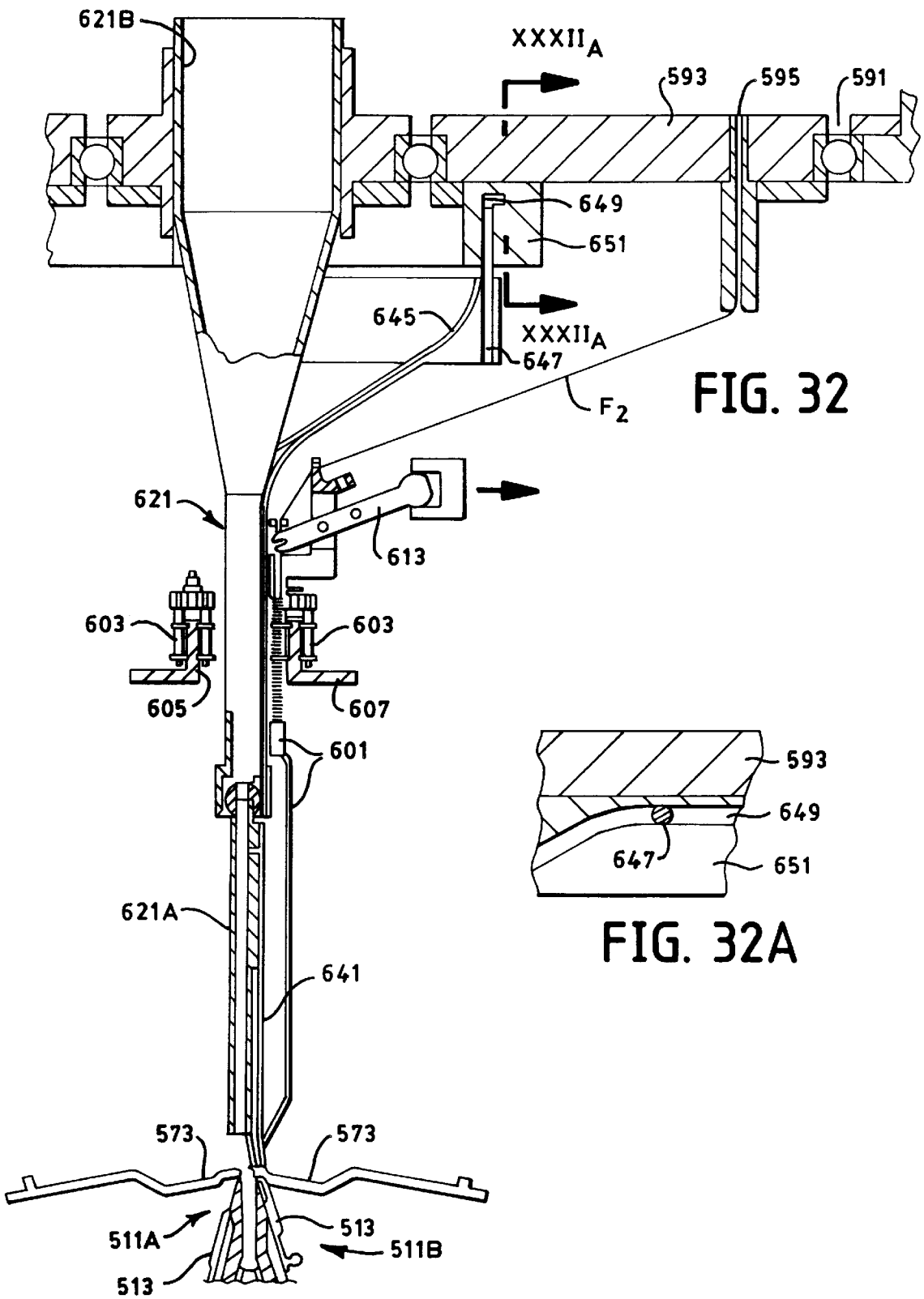
FIG. 32 shows a section on a vertical plane, at right angles to the rectilinear beds, of the region above said beds.
FIG. 32A shows a local section on IXA—IXA as marked in FIG. 32.

Situated above the cylinders 501C, 503C and above the rectilinear beds 511A, 511B is a suction pipe 621 with a lower portion that is flat in its central part and parallel to the rectilinear beds 511A, 511B. This portion extends upwards to where it joins a cylindrical upper portion 621B. The article is sucked into the pipe 621 as it forms so as not to interfere with the fabric forming elements beneath it. As can be seen in FIG. 32 in particular, the central part, denoted 621A, of the flat lower portion of the pipe 621 pivots so as to move back in each cycle from that bed 511 whose needles are lifted, as shown in FIG. 32, where the needles of bed 511B are lifted and portion 621A of the suction pipe is displaced towards bed 511A.

While the yarn feeders 601 move with continuous motion around the path of the chain 603, the revolving member 593 rotates about its own vertical axis, guided in the circular track 591, so that the yarns F1 and F2 do not become tangled.

Figure 33:
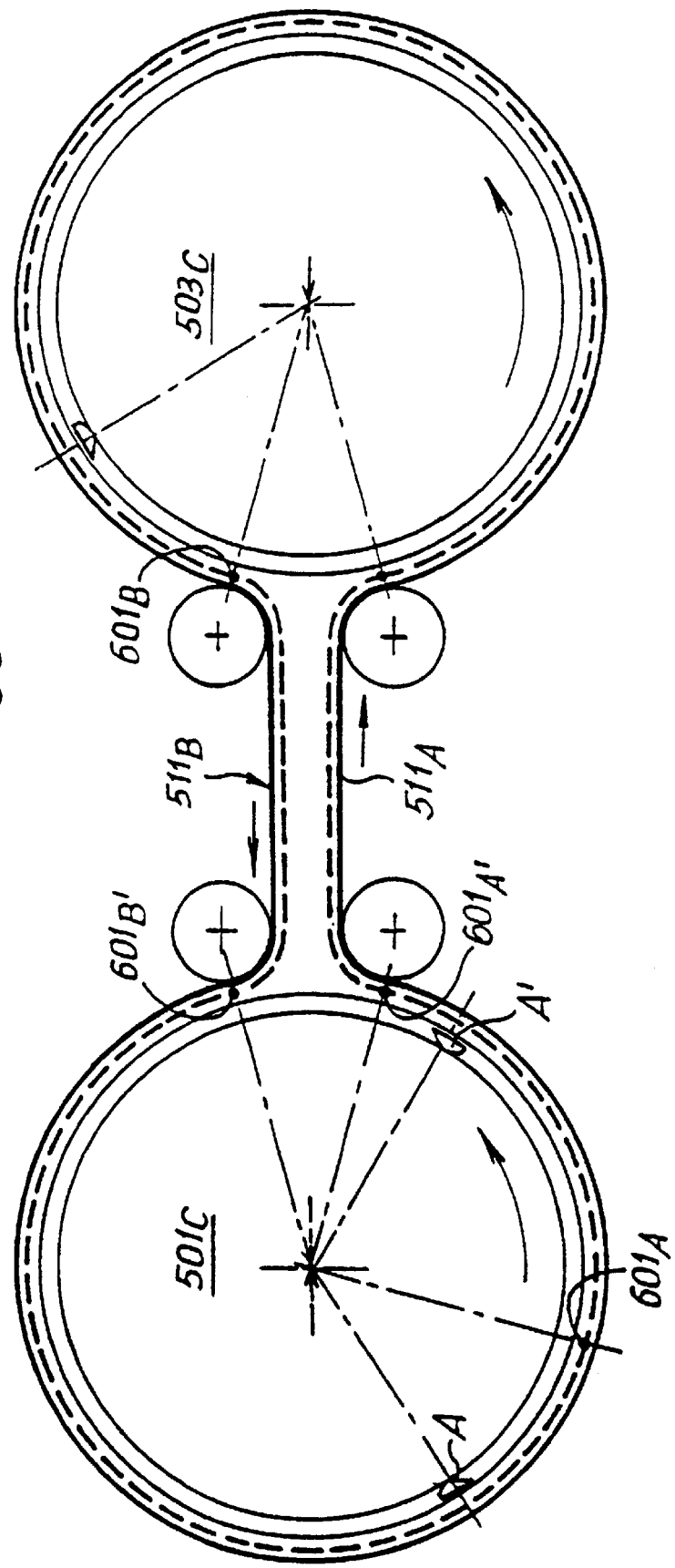
FIG. 33 shows one way of moving the cams and yarn feeders around the closed path for formation of the body section in two different embodiments.

The movements of the yarn feeders 601, and hence of the chain 603, and of the needle operating cams of the rectilinear beds 511A, 511B and of the cylinders 501C, 503C must be synchronized properly to achieve the correct sequence of motion. FIG. 33 shows one possible method of controlling the yarn feeders and knitting cams in which two yarn feeders and hence two supplies are used, and the two yarn feeders 601A, 601B pass along the rectilinear beds 511A, 511B 90° out of phase with each other. When feeder 601B is passing from cylinder 503C to bed 511B, yarn feeder 601A is approximately 90° behind the position where it will pass from cylinder 501C to rectilinear bed 511A. A shows the instantaneous position of the knitting cam which is co-operating with yarn feeder 601A.

From this position, yarn feeder 601B moves at a slightly reduced speed along rectilinear bed 511B eventually reaching position 601B' on cylinder 501C. At the same time yarn feeder 601A has reached position 601A' and its knitting cam has reached position A'. The angular distance between yarn feeder 601A and the cam A has reduced because of the slowing down of the chain 603 by which the yarn feeder is driven (while the cam boxes of both cylinders revolve at constant speed). From position 601A' the yarn feeder 601A begins to move across bed 511A at reduced speed, while yarn feeder 601B' begins its path around cylinder 501C operated by the same knitting cam that has until now worked with yarn feeder 601A, which is already in position A'.

By using more supplies it is possible to dispense with the need to slow down the movement of the yarn feeders around their path.

Figure 9:
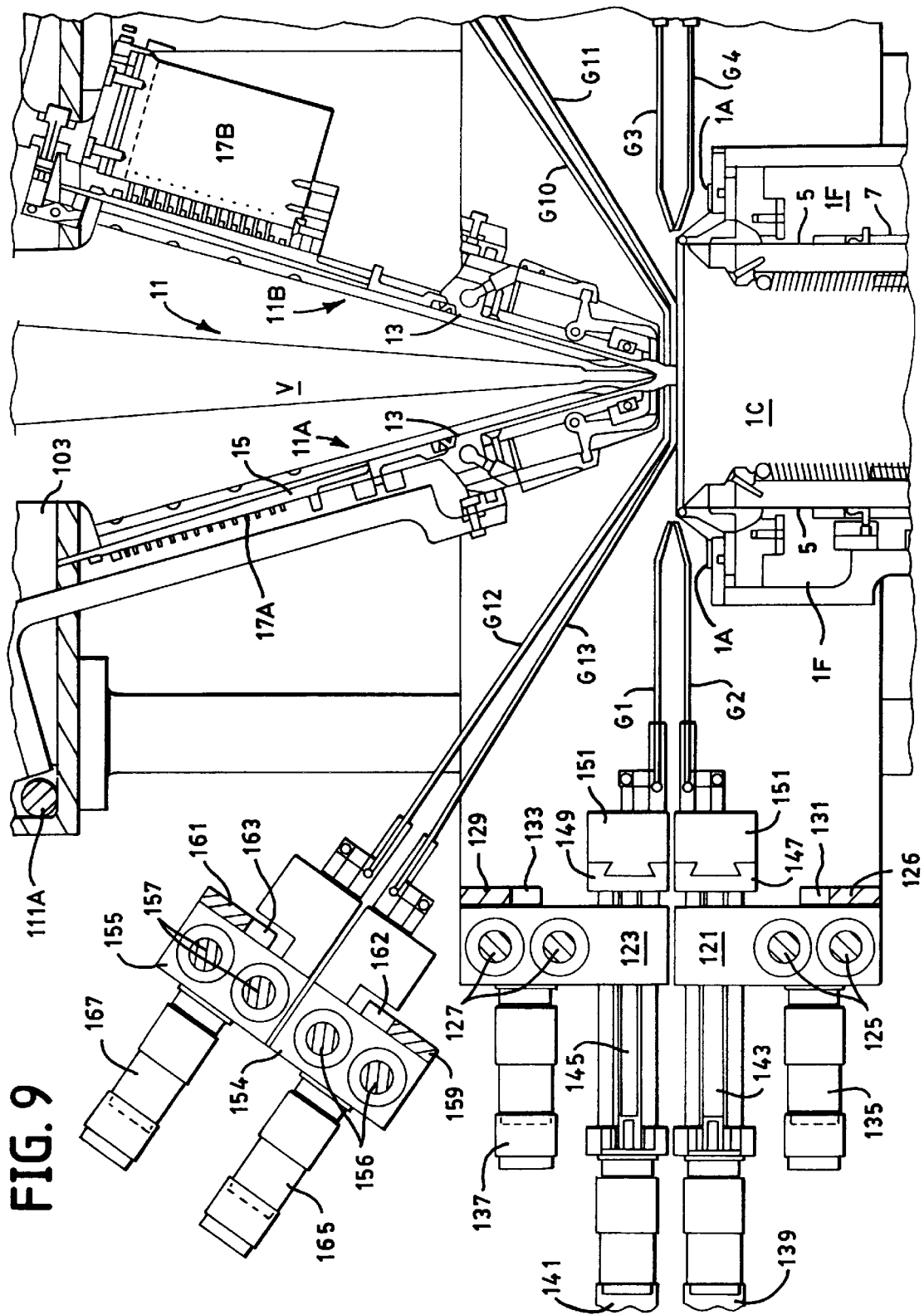
FIG. 9 is a partial enlargement of FIG. 8.
Figure 34:
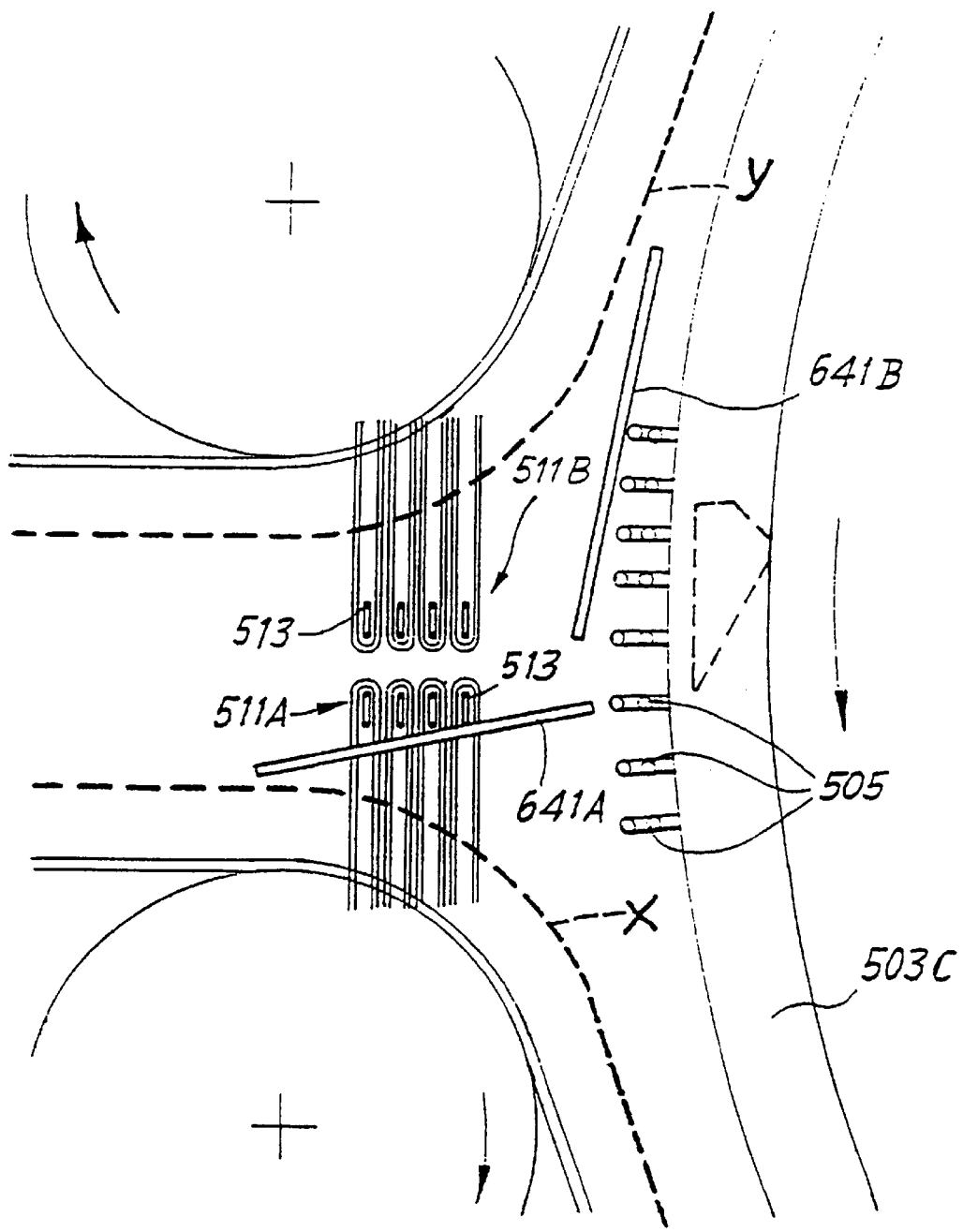
FIG. 34 shows an enlargement of the junction between the rectilinear bed and the circular bed.
Figure 35:
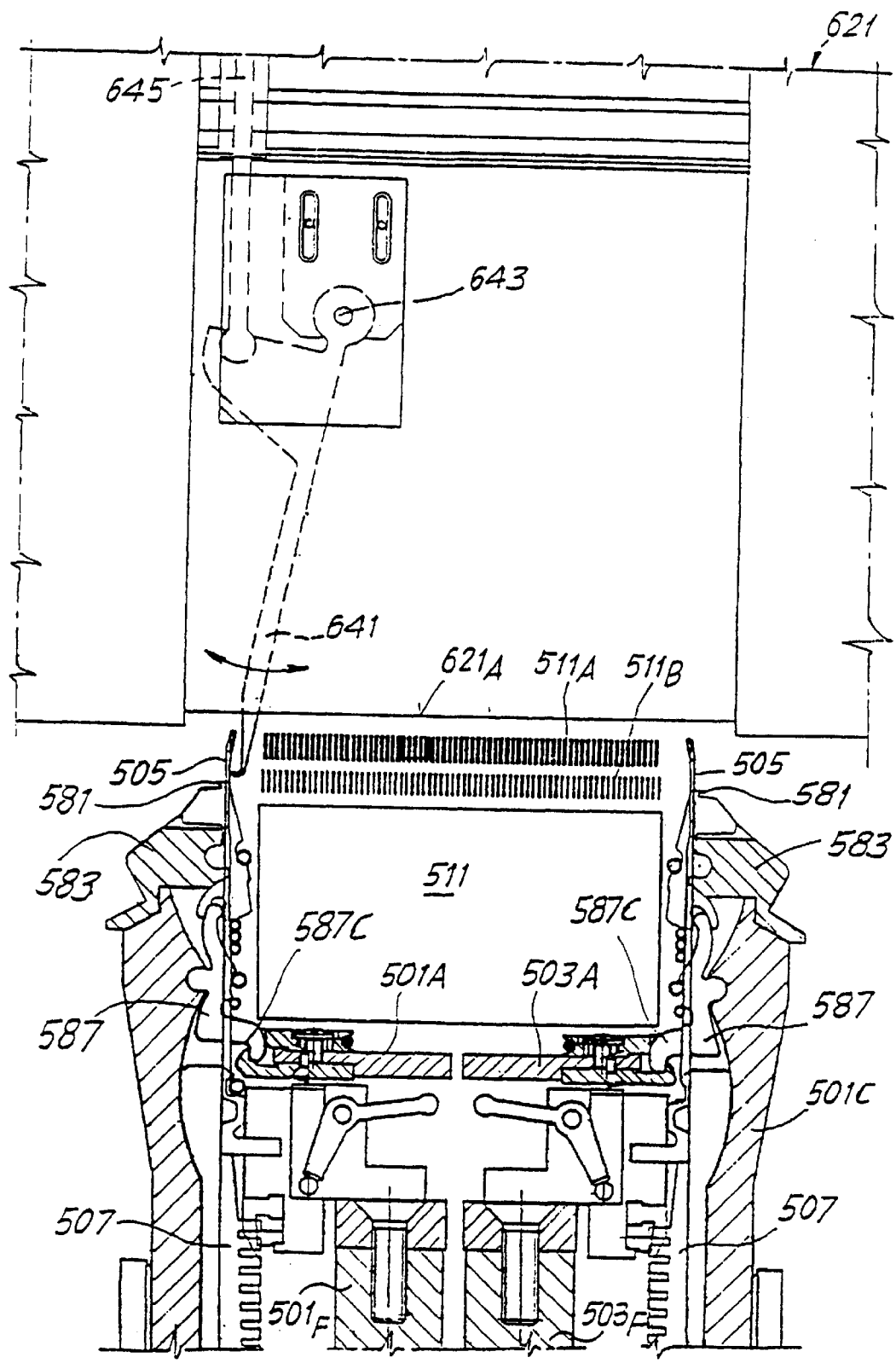
FIG. 35 shows an enlargement of the mechanism by which yarn is transferred from the rectilinear bed to the circular bed.

It will be clear from the foregoing that each yarn F1, F2 is fed to both of the cylindrical beds of cylinders 501C, 503C and to both the rectilinear beds 511A, 511B. This is made possible by the fact that the yarn feeders 601 travel round a closed path that essentially follows the outline of the beds. Nevertheless, on passing from the rectilinear bed to the circular bed and vice versa, problems can occur because the chain carrying the yarn feeders cannot follow the exact path of the beds. Accordingly, in order to enable a secure passage of the yarn from one type of bed to another, four transfer mechanisms, shown in FIGS. 32, 34 and 35, are provided at the four junctions. More particularly, visible in FIG. 35 is the mechanism for passing the yarn from a rectilinear bed to a circular bed (that of cylinder 501C in this particular case). The mechanism comprises a lever 641 hinged at 643 to a point integral with the fixed structure of the machine or to the pivoted central portion 621A of the suction pipe 621. The lever 641 possesses a hooked lower end and is controlled by a flexible lead 645 whose lower end is anchored to the lever 641 while its upper end is attached to a slider 647 that slides in a slot-type cam 649 (see FIGS. 32 and 9A) formed in a ring 651 integral with the revolving member 593. The profile of the slot-type cam is such as to cause oscillation of the lever 641 and of the other three levers similar to it located at the four junctions between the rectilinear beds and the circular beds.

FIG. 34 schematically shows a few needles 505 from the circular bed of cylinder 503C and the needles 513 adjacent to these from the two rectilinear beds 511A, 511B. Shown in thick lines and marked 641A, 641B are the routes followed by two levers 641 that assist the transfer of the yarn from rectilinear bed 511A to the circular bed of cylinder 503C and from the latter to rectilinear bed 511B respectively. In practice, when the yarn feeder travels around the curve denoted X, defined by the track on which the chain 603 runs, lever 641A takes its yarn from needles 513 of bed 511A and pushes it towards the cylinder 503C needles 505 which are in the intermediate area between the two rectilinear beds. For the opposite action, as the yarn feeder passes around curve Y from cylinder 503 to bed 511B, lever 641B pushes the yarn towards the middle of the two rectilinear beds.

Figure 36:
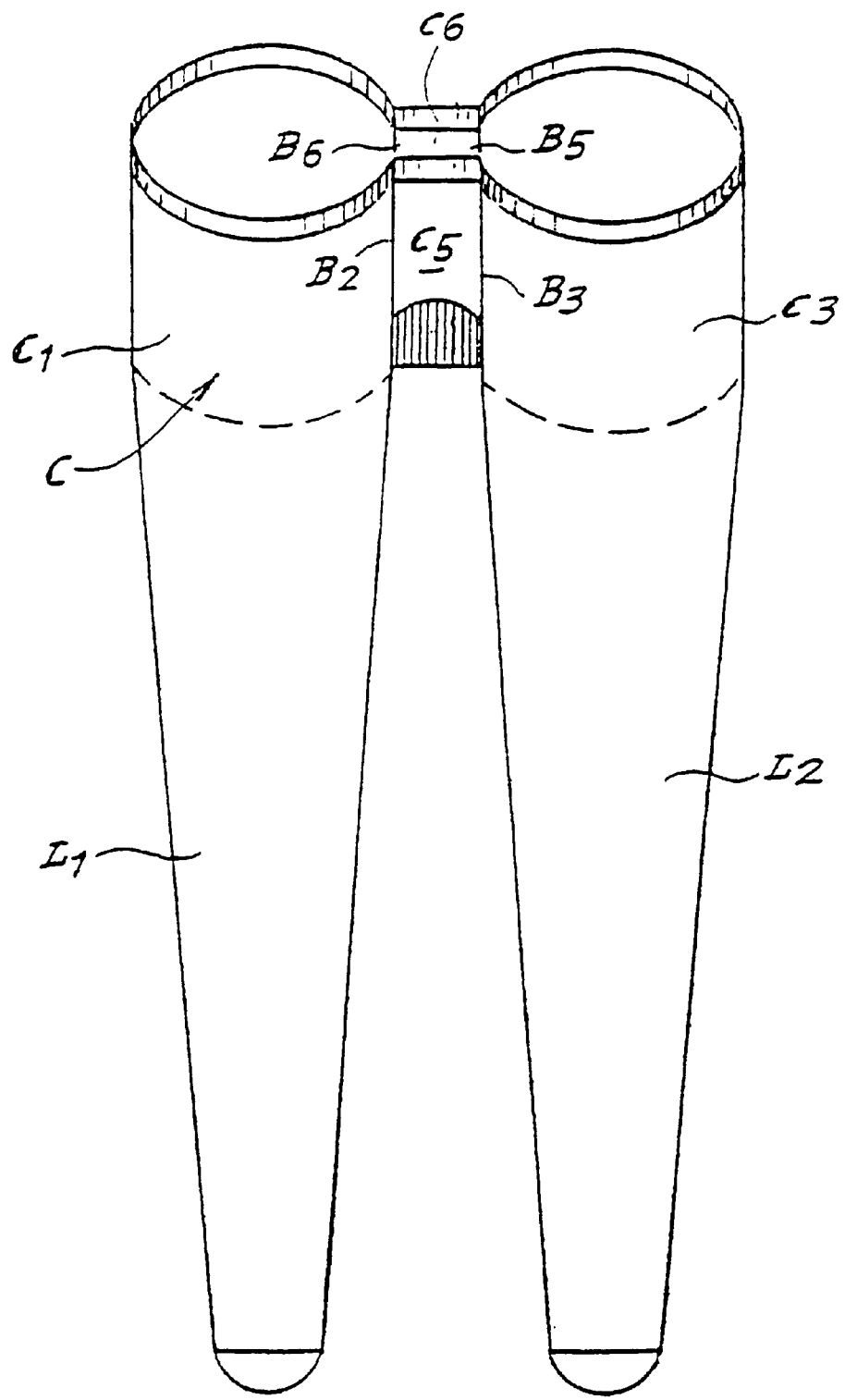
FIG. 36 shows schematically an article produced on the machine according to the invention.
Figure 37:
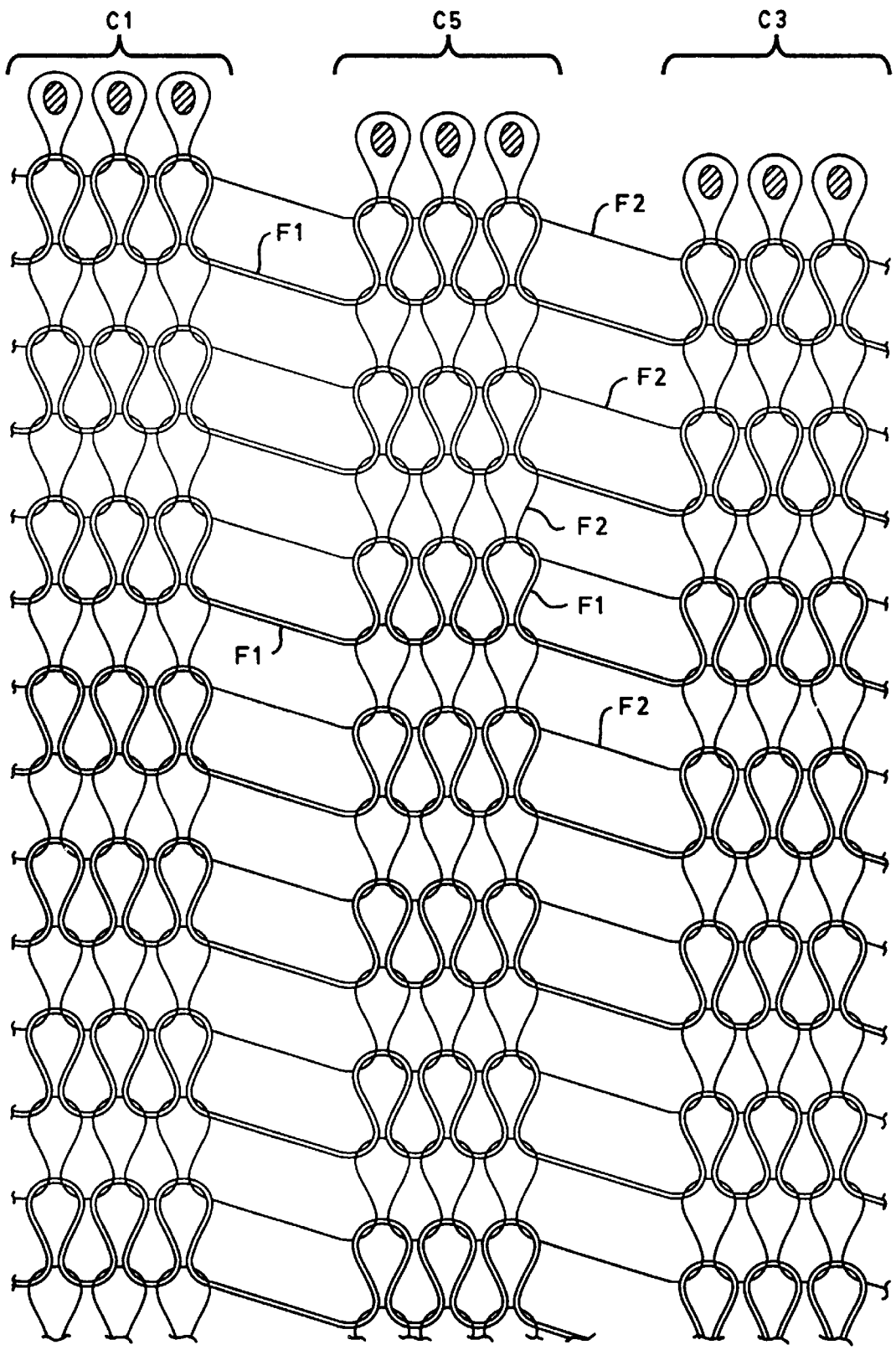
FIG. 37 shows the interlinking produced in passing between the rectilinear beds and the circular beds.

The article produced on the machine described herein has the structure shown schematically in FIG. 36: L1 and L2 are the legs knitted by the cylinders 501C, 503C while the rectilinear beds 511A, 511B are kept inactive. The letter C is a general reference for the body section of the article, which in turn is made up of four portions marked C1, C3, C5 and C6, these being produced by the needles of cylinder 501C, the needles of cylinder 503C and the needles of beds 511A and 511B, respectively. B2, B3, B5 and B6 denote the lines of junction generated in the passage between the rectilinear beds and the circular beds of cylinders 501C, 503C. These zones are shown in the diagram FIG. 37, where F1 and F2 are the two yarns from which the body section is knitted and C1, C3 and C5 again denote the body section portions as in FIG. 36. As can be seen in FIG. 37, the whole of the body section is formed from face fabric.

It should be understood that the drawing shows only an illustrative embodiment purely as a practical demonstration of the invention, the construction of which may vary as regards shapes and arrangements without thereby departing from the scope of the concept underlying said invention. The presence of any reference numerals in the appended claims is for the purpose of facilitating the reading of the claims with reference to the description and drawing, and does not limit the scope of protection represented by the claims.

What is claimed is:

1. Knitting machine for production of a garment with a body section and a pair of legs, the knitting machine comprising in combination:

two side units each having a fabric forming cylinder with a plurality of needles and needle operating elements, the cylinders being parallel with each other and close together;

and, in an intermediate position between said two cylinders, two rectilinear beds next to each other, each with their own needles and elements for operating the needles of said beds.

2. Method of producing a knitted garment comprising a body section and a pair of legs, in a single operation, the method being characterized by the following stages:

a) knitting the two legs of the garment simultaneously and in parallel, beginning with ends of the legs, on two fabric forming cylinders arranged next to each other;

b) knitting, on two rectilinear beds interposed between said cylinders, a body section closure zone, and completing said body section by combined activity of the cylinders.

3. A knitting machine for production of a garment, the machine comprising:

two fabric forming cylinder with a plurality of needles and needle operating elements, said two fabric forming cylinders being parallel with each other;

two rectilinear beds arranged adjacent each other and between said two fabric forming cylinders, said two rectilinear beds including a plurality of needles and elements for operating respective said needles.

4. Machine according to claim 1, in which said rectilinear beds are inclined relative to each other in a V configuration with a vertex of said V configuration being at a bottommost point of said V configuration.

5. Machine according to claim 1, in which said rectilinear beds are arranged parallel to each other.

6. Machine according to claim 1, comprising drive means that alternately produce a continuous, and reciprocating, rotation of the cylinders while keeping the operating elements of the cylinder needles stationary, or produce a reciprocating rotation of said needle operating elements while keeping the cylinders stationary.

7. Machine according to claim 6, in which, the needle operating elements are given reciprocating rotary motion, while the operating elements of the needles of the rectilinear beds move with reciprocating rectilinear motion.

8. Machine according to claim 1, in which each said cylinder has a plurality of yarn feeders able to move around a circular needle bed of the respective cylinder, the yarn feeders being independent of the operating elements of the cylinder needles.

9. Machine according to claim 8, in which at least some of said yarn feeders belonging to said cylinders are also able to move along the rectilinear beds.

10. Machine according to claim 1, in which each rectilinear bed has at least one yarn feeder able to move along that bed.

11. Machine according to claim 10, in which each yarn feeder belonging to the rectilinear beds is able to move independently of movements of the operating elements of the needles of said rectilinear beds.

12. Machine according to claim 1, in which for each cylinder there is a tubular element coaxial with that cylinder and positioned above it.

13. Machine according to claim 12, in which said tubular elements define respective longitudinal slots in an area facing the rectilinear beds.

14. Machine according to claim 12, in which said tubular elements extend at their lowest end down to a height approximately corresponding to an area where fabric is formed on the cylinders.

15. Machine according to claim 1, in which the rectilinear beds are able to pivot in order that they can move towards or away from each other.

16. Machine according to claim 8, comprising guide means with carriers able to travel along said guide means carrying the yarn feeders.

17. Machine according to claim 16, in which said guide means run parallel to a plane including axes of the two cylinders and perpendicularly to said axes, and in which each carrier is provided with an actuating element which moves its yarn feeder in a direction perpendicular to a direction of said guide means and perpendicular to the axes of the cylinders.

18. Machine according to claim 10, in which running along said rectilinear beds are rectilinear guides along which the yarn feeders belonging to the rectilinear beds travel.

19. Machine according to claim 8, in which the yarn feeders belonging to the cylinders are mounted on oscillating beams.

20. Machine according to claim 19, in which there are at least two pairs of said oscillating beams, each said pair comprising a first beam arranged on one side of the machine and a second beam arranged on an opposite side, the two beams of each pair being driven with a reciprocating motion synchronously and approximately 180° out of phase with each other, and the motion of the beams of a first pair is approximately 90° out of phase with the corresponding beams of a second pair.

21. Machine according to claim 19, in which each beam forms part of a four-bar chain.

22. Machine according to claim 19, in which each rectilinear bed has two supplies and in which said supplies are driven with a reciprocating motion approximately 180° out of phase with each other.

23. Machine according to claim 19, including a closed path about said two cylinders and along said rectilinear beds along which one or more said yarn feeders are moved.

24. Machine according to claim 23, comprising a continuous flexible element defining said closed path, situated on said flexible element are one or more yarn feeders.

25. Machine according to claim 23, in which above said two rectilinear beds and said two cylinders is a revolving member carrying a plurality of packages of yarn, said revolving member rotates so as to follow movements of the yarn feeders around said closed path.

26. Machine according to claim 23, in which said rectilinear beds are arranged in an inverted V, with a vertex of said inverted V being positioned uppermost in said inverted V.

27. Machine according to claim 23, comprising yarn pushing elements at junctions between the rectilinear beds and circular beds of the cylinders, said yarn pushing elements transfer yarn, during formation of the body section, from the rectilinear beds to the cylinders and vice versa.

28. Machine according to claim 23, comprising a pivoting suction pipe positioned above the rectilinear beds.

29. Machine according to claim 23, comprising actuator means for controlling movement of said yarn feeders around said closed path with a variable velocity, the velocity being reduced during passage of the yarn feeder along the rectilinear beds.

30. Machine according to claim 23, comprising, on each of said cylinders, a plurality of sinkers controlled by cam means situated on respective rings, via respective intermediate rocker arms that extend approximately in the direction of the axis of their cylinder.

31. Machine according to claim 23, in which the needles of the rectilinear beds slide in respective tricks arranged on a plane inclined from horizontal, and in which said needles have jacks sliding in tricks lying on an inclined plane forming with the horizontal a shallower angle than a plane containing the tricks in which said needles slide.

32. Machine according to claim 31, in which said jacks act on the needles via mechanical transmission elements.

33. Machine according to claim 32, in which said transmission elements comprise, for each needle, a rocker arm and a rod, said rod being operated by needle operating cams.

34. Method according to claim 2, characterized in that knitting of the legs begins with a formation of a closed toe.

35. Method according to claim 2, wherein said legs are produced with rotation of the cylinders, whereas during the formation of the body section said cylinders are kept stationary, and operating elements are driven with reciprocating motion.

36. Method according to claim 2, wherein the two legs are formed from two separate series of yarns, and during the formation of the body section one yarn from each series participates in formation of a body section portion on one of said rectilinear beds, and another yarn from each series participates in formation of a body section portion produced on another of said rectilinear beds.

37. Method according to claim 36, characterized in that each series of yarns forming one particular leg is divided into two groups of yarns, and during formation of the body section each group works on a portion of a particular circular bed of the associated cylinder.

38. Method according to claim 2, wherein each leg is formed from a separate series of yarns, and during formation of the body section two additional series of yarns are supplied one to one and one to another of the rectilinear beds so as to form intermediate portions of the body section.

39. Method according to claim 38, characterized in that each series of yarns forming the leg is divided into two groups of yarns, and during formation of the body section each group works on a portion of a particular circular bed of the associated cylinder.

40. Method according to claim 36, characterized by forming each leg with at least one pair of yarns and by forming the body section in four portions, two of said portions are produced on the rectilinear beds, each with at least one pair of yarns, and two of said portions are produced on the cylinders, each portion produced by the cylinders being divided into a front zone and a rear zone, and each zone being formed by at least one pair of yarns.

41. Method according to claim 36, wherein the two yarns of each pair of yarns have differing characteristics.

42. Method according to claim 2, characterized in that during knitting of the body section on said cylinders and rectilinear beds, yarn is supplied to the needles of the cylinders and of the rectilinear beds by means of one or more yarn feeders that are moved around a closed path about said cylinders and said beds.

43. Method according to claim 42, characterized in that during formation of the body section the fabric forming cylinders are stationary and the fabric is formed by rotating the respective needle operating elements.

44. Method according to claim 42, wherein during formation of the body section the yarn feeders move with continuous motion around said closed path.

* * * * *